United States Patent
Champaneria

(10) Patent No.: US 11,087,283 B2
(45) Date of Patent: Aug. 10, 2021

(54) METHOD AND SYSTEM FOR MANAGING, MATCHING, AND SOURCING EMPLOYMENT CANDIDATES IN A RECRUITMENT CAMPAIGN

(71) Applicant: ExpertHiring, LLC, Piscataway, NJ (US)

(72) Inventor: Paul Champaneria, Branchburg, NJ (US)

(73) Assignee: ExpertHiring, LLC, Piscataway, NJ (US)

( * ) Notice: Subject to any disclaimer, the term of this patent is extended or adjusted under 35 U.S.C. 154(b) by 181 days.

(21) Appl. No.: 16/392,962

(22) Filed: Apr. 24, 2019

(65) Prior Publication Data
US 2019/0251516 A1 Aug. 15, 2019

Related U.S. Application Data

(63) Continuation of application No. 15/967,971, filed on May 1, 2018, now Pat. No. 10,318,927, which is a
(Continued)

(51) Int. Cl.
*G06Q 10/10* (2012.01)
*G06N 5/00* (2006.01)
(Continued)

(52) U.S. Cl.
CPC ....... *G06Q 10/1053* (2013.01); *G06F 16/951* (2019.01); *G06F 40/295* (2020.01); *G06F 40/30* (2020.01); *G06N 5/003* (2013.01)

(58) Field of Classification Search
None
See application file for complete search history.

(56) References Cited

U.S. PATENT DOCUMENTS

| 7,457,764 B1 | 11/2008 | Bullock et al. |
| 7,783,486 B2 | 8/2010 | Rosser et al. |

(Continued)

FOREIGN PATENT DOCUMENTS

| CA | 2929140 A1 | 11/2016 |
| CN | 103390047 A | 11/2013 |

(Continued)

OTHER PUBLICATIONS

He, David, et al. "The Impact of Artificial Intelligence (AI) on the Financial Job Market." Boston Consulting Group, Mar. 2018. (Year: 2018).*

*Primary Examiner* — Andrew B Whitaker
(74) *Attorney, Agent, or Firm* — Maier & Maier, PLLC

(57) ABSTRACT

A method and system for automating some aspects of a recruiting process, which may implement rules permitting the processes of sourcing candidates, setting up job interviews, and responding to candidate questions to all be automated with a computer. An automated system may specifically be used for conducting a conversation with a candidate over one or more communications channels, which may include pre-interview vetting of the candidate and clarification of aspects of the candidate's provided information, and may include conducting an interview or some aspects thereof. It may also be understood that an automated system may, in addition to conversing with the candidate, be used to provide feedback or additional opportunities to the candidate.

19 Claims, 19 Drawing Sheets

Related U.S. Application Data continuation-in-part of application No. 15/651,370, filed on Jul. 17, 2017, now Pat. No. 10,318,926.

(60) Provisional application No. 62/541,888, filed on Aug. 7, 2017.

(51) Int. Cl.
*G06F 16/951* (2019.01)
*G06F 40/30* (2020.01)
*G06F 40/295* (2020.01)

(56) References Cited

U.S. PATENT DOCUMENTS

| | | | |
|---|---|---|---|
| 8,156,051 | B1 | 4/2012 | Shah et al. |
| 8,219,502 | B2 | 7/2012 | Gold et al. |
| 8,645,284 | B2 | 2/2014 | Nanda et al. |
| 8,738,739 | B2 | 5/2014 | Makar et al. |
| 8,818,926 | B2 | 8/2014 | Wallace |
| 9,183,183 | B2 | 11/2015 | Barve et al. |
| 9,369,410 | B2 | 6/2016 | Capper et al. |
| 9,715,496 | B1 | 7/2017 | Sapoznik et al. |
| 2001/0042000 | A1 | 11/2001 | Defoor, Jr. |
| 2006/0167834 | A1 | 7/2006 | Rubel, Jr. |
| 2007/0219849 | A1 | 9/2007 | Edwards et al. |
| 2009/0037541 | A1 | 2/2009 | Wilson |
| 2009/0245500 | A1 | 10/2009 | Wampler |
| 2011/0055098 | A1 | 3/2011 | Stewart |
| 2011/0078105 | A1 | 3/2011 | Wallace |
| 2011/0208665 | A1* | 8/2011 | Hirsch .............. G06Q 10/1053 705/321 |
| 2011/0213642 | A1 | 9/2011 | Makar et al. |
| 2011/0295759 | A1 | 12/2011 | Selvakummar et al. |
| 2012/0095835 | A1 | 4/2012 | Makar et al. |
| 2012/0185402 | A1 | 7/2012 | Lajoie et al. |
| 2012/0265770 | A1 | 10/2012 | Desjardins et al. |
| 2013/0187926 | A1 | 7/2013 | Silverstein et al. |
| 2013/0268451 | A1 | 10/2013 | Pendyala et al. |
| 2014/0122355 | A1 | 5/2014 | Hardtke et al. |
| 2014/0122618 | A1 | 5/2014 | Duan |
| 2014/0278682 | A1 | 9/2014 | Kennell et al. |
| 2014/0278683 | A1 | 9/2014 | Kennell et al. |
| 2014/0279050 | A1 | 9/2014 | Makar et al. |
| 2015/0006421 | A1 | 1/2015 | Pearson |
| 2015/0178371 | A1 | 6/2015 | Seth et al. |
| 2015/0227891 | A1 | 8/2015 | Cohen et al. |
| 2016/0085854 | A1 | 3/2016 | Blackford et al. |
| 2016/0092837 | A1 | 3/2016 | Panigrahi et al. |
| 2016/0132833 | A1 | 5/2016 | Obeid |
| 2016/0255034 | A1* | 9/2016 | Yuan .................... H04L 51/22 709/206 |
| 2016/0321614 | A1 | 11/2016 | Leslie |
| 2016/0330597 | A1 | 11/2016 | Kalkounis et al. |
| 2017/0017635 | A1 | 1/2017 | Leliwa et al. |
| 2017/0213190 | A1 | 7/2017 | Hazan |
| 2017/0270485 | A1 | 9/2017 | Meier |

FOREIGN PATENT DOCUMENTS

| | | |
|---|---|---|
| CN | 102194005 B | 1/2014 |
| CN | 105930367 A | 9/2016 |

* cited by examiner

96

961 Storing NLP Response and outbound context variables in DB

962 NLP response will be sent to respective recruiter for approval

963 Recruiter edits the message

964 Recruiter edits the message and save the edited message ← Yes

No

965 Recruiter clicks SEND button

966 System sends message to appropriate candidate communicated channel.

METHOD AND SYSTEM FOR MANAGING, MATCHING, AND SOURCING EMPLOYMENT CANDIDATES IN A RECRUITMENT CAMPAIGN

CLAIM OF PRIORITY

This application claims priority from U.S. patent application Ser. No. 15/967,971, filed on May 1, 2018, entitled "METHOD AND SYSTEM FOR MANAGING, MATCHING, AND SOURCING EMPLOYMENT CANDIDATES IN A RECRUITMENT CAMPAIGN," the entire contents of which are hereby incorporated by reference, which in turn claims priority from U.S. Provisional Patent Application No. 62/541,888, filed on Aug. 7, 2017, entitled "METHOD AND SYSTEM FOR MANAGING, MATCHING, AND SOURCING EMPLOYMENT CANDIDATES IN A RECRUITMENT CAMPAIGN," the entire contents of which are hereby incorporated by reference, and further claims priority (as a continuation-in-part) from U.S. patent application Ser. No. 15/651,370, filed on Jul. 17, 2017, entitled "METHOD AND SYSTEM FOR MANAGING, MATCHING, AND SOURCING EMPLOYMENT CANDIDATES IN A RECRUITMENT CAMPAIGN," the entire contents of which are hereby incorporated by reference.

BACKGROUND

Hiring and recruitment of candidates for a position of employment is generally a long, complex process. Generally, the process operates as follows. First, an HR department of a company or organization will identify that there is a vacancy in a particular position or identify that there is a need to create a new position. HR must then identify what the duties and responsibilities of the position will be, and must establish minimum requirements, preferred qualifications, and a recruitment strategy for the position.

Then, HR must develop a position description to be provided to the public. This typically must balance factors like accurately describing the duties and responsibilities of the job while preserving appropriate levels of secrecy about how the organization operates, ensuring that the position description ranks high in the search results of a number of search engines, ensuring that the position description promotes the company, and ensuring that the posting complies with labor law.

While some recruitment is often done in-house (usually through a jobs board operated by the organization, or through an in-house recruiter if the organization is sufficiently large and has sufficient turnover), the task of recruiting candidates for the position is sufficiently onerous and specialized that, most often, recruitment is contracted out to a recruiter or staffing agency. The recruiter will, based on the position description developed by the company, attempt to source a number of appropriate candidates for the position and ensure that the candidates are appropriately qualified.

The process of "sourcing" a candidate refers to the process of proactively searching for qualified job candidates for positions which are currently open or which are planned to be open. Sourcing thus requires collecting relevant data about qualified candidates, such as their names, titles, and job responsibilities. This is targeted at both candidates who are not actively looking for job opportunities (passive job seekers) and candidates who are actively looking for job opportunities (active job seekers). Both passive and active job seekers are most often targeted based on digital job boards, social media, and based on various forms of networking, such as through professional or alumni organizations.

Countless hours are typically spent by recruiters on both sourcing and qualifying candidates for job openings, meaning that this process can often be expensive, particularly for a company that contracts out its recruitment. The widespread adoption of digital job boards have meant that the volume of résumés and applications has increased significantly, making this task progressively more difficult.

SUMMARY

A method and system for automating some aspects of a recruiting process may be described. Such a method may operate to match résumés and job descriptions, and may initiate communications between a candidate and a recruiter once an appropriate match has been found. This may allow recruiters to focus on the highest level of vetting, and on aspects of the recruitment process such as promoting of the hiring company and salary negotiations.

According to an exemplary embodiment, a method, which may be performed by a system configured to implement the method, may start with receiving, on an automated recruitment system, a job description or plurality thereof. The method may next include parsing, with the automated recruitment system, the job description, the step of parsing the job description including identifying one or more job requirements of the job description (such as, for example, the job title, the skills and experience required and preferred, the education requirements, the day-to-day duties and expectations of the position, and so forth). In some exemplary embodiments, the job description may include, or may be paired along with, identifiers of one or more job requirements of the job description (which may, for example, ensure that the job description is more easily parsed). For example, according to an exemplary embodiment, a hiring manager may specifically provide the top three to top five skills or types/level of experience that is needed for the job, along with the job description; in some exemplary embodiments, skills, experience, or other such qualities that have been indicated by a hiring manager as being important may be given additional weight in a matching and scoring process, if desired. The method may next include generating, on the automated recruitment system, a first data point matrix, the data point matrix based on the one or more job requirements. The method may next include automatically posting, with the automated recruitment system, on a network, one or more posts comprising the job description. The method may next include automatically maintaining, with the automated recruitment system, the one or more posts, which may be continued over a period of time.

Next, the method may include, for a plurality of candidates, performing a step of receiving, on the automated system, a sourced résumé of a candidate in the plurality of candidates (which may be, for example, a formal résumé, or may be another source of candidate information such as a candidate social media profile), and parsing the sourced résumé, which may include identifying hiring information for the candidate; this hiring information may include any or all information relevant to the hiring of the candidate, such as the candidate's location, the candidate's desired salary, information related to past interactions with the candidate, and so forth. (In some exemplary embodiments, a "résumé" may be multiple items or sources of information, and the desired candidate information may be assembled from each of these items or sources of information. For example, in an exemplary embodiment, certain information such as name, contact information, candidate summary information, work history of a candidate with their present employer, the candidate's current job title, the candidate's start and end dates of employment, and the candidate's education information may be parsed from a formal résumé, and additional information from a jobs board or other source location may be combined with this formal résumé candidate information.) The method may next include generating, on the automated recruitment system, a second data point matrix, the data point matrix being based on the hiring information for the candidate; generating, with a semantic engine of the automated recruitment system (or an analogous system or other means), a candidate score for the candidate by matching the hiring information in the second data point matrix to the one or more job requirements in the first data point matrix; and automatically sending, with the automated recruitment system, a contact message to the candidate. This contact message may be, for example, a list of top reasons to work for the employer, a more extensive job description, a link to apply for a position, or any other contact message that may be desired. Finally, the method may include receiving, on the automated recruitment system, a response of the candidate; and evaluating, on the automated recruitment system, the response of the candidate to determine if the response of the candidate is an intent to apply, a rejection, or a question.

When the response of the candidate is an intent to apply, in some exemplary embodiments, the candidate may communicate such an intent to apply by clicking a link to apply. In some exemplary embodiments, this may provide the candidate with an opportunity to review and update the information on file for the candidate, as well as provide additional information or additional documents where appropriate (for example, in some exemplary embodiments, the candidate may provide an updated résumé or may provide additional information by filling out skills questions). The method may include adding the candidate to a curated list of candidates, and submitting the curated list of candidates to a hiring manager, recruiter, or similar party. When the response of the candidate is a rejection, the method may include ensuring that the candidate is not part of an active campaign, by, for example, removing the candidate from the campaign. (In some exemplary embodiments, the candidate may be asked why they are not interested before they are removed from the campaign, which may provide the candidate an opportunity to clarify or even retract their rejection; for example, in some exemplary embodiments, the candidate may be asked whether they are open to a new job right now, or whether they are simply interested in the position that was offered to them.) When the response of the candidate is a question, the method may perform at least one of automatically generating a response to the question (for example, through the use of an AI bot, or by determining if the question matches an entry in an auto-response database of the automated recruitment system and generating a response from the entry in the auto-response database) or sending a notification to an operator of the automated recruitment system indicating that the question cannot be automatically responded to. (In some exemplary embodiments, an auto-response database may access the candidate information and/or the job description information in addition to the auto-response database in order to generate a response specifically tailored to a particular job or a particular candidate. In other exemplary embodiments, where a system other than an auto-response database is used, the alternative system may likewise consider candidate information and job description information in order to generate a response specifically tailored to a particular job or a particular candidate.) Finally, once the campaign includes at least one candidate, the method may include submitting, with the automated recruitment system, the curated list of candidates, to an appropriate party (such as a hiring manager or recruiter); in an exemplary embodiment, this may be done immediately after a candidate has completed the application process or may be done in a batch of multiple candidates, as may be desired. In an exemplary embodiment, submission of the curated list of candidates may include submission of detailed information about the candidates in the campaign, such as the résumé of each candidate, details about the skills required for the job such as the number of required or suggested years of experience or the last year the skill was used, salary details, availability information for the candidate such as a date on which the candidate is available to start, and so forth.

In an exemplary embodiment, the method may further include performing the step of identifying, with a web-based or otherwise machine-based calendar system such as MICROSOFT OUTLOOK, a mutually acceptable time for scheduling an interview, and automatically scheduling an interview at the mutually acceptable time.

In an exemplary embodiment, the method may further include generating, from the one or more job requirements, one or more search strings for a job board search engine or other search engine; in some exemplary embodiments, a plurality of successive search strings may be provided, each of which has broader search parameters than the last search string in at least one way. In some exemplary embodiments, the combination or combinations of values, and the number of parameters, to be included in a search string may be determined manually, or may be determined automatically by the system based on settings such as the weight of importance assigned to one parameter or parameter value over another. In some exemplary embodiments, the generation of search strings may be performed before performing the other steps of the method or at an early stage of performing the steps of the method. This may enable manual sourcing to be performed more easily, alongside automatic sourcing. As such, the method may be able to incorporate candidate résumés from a plurality of sources, which may include, for example, résumés sourced from automated and manual job board searching, résumés submitted by candidates directly or through a job board, or résumés or other information retrieved from social media sites.

In an exemplary embodiment, the step of automatically posting one or more posts with the job description may further include the steps of automatically generating, from the job description, a base post; automatically formatting the base post into one or more site-specific posts, each of the site-specific posts having a format used by a specific website; and posting the site-specific posts on the specific websites. This may ensure that the information in each post is largely shared, but that differences (such as formatting differences) between multiple sites are taken into account.

In an exemplary embodiment, the method may further include identifying a website that does not permit at least one of automatic posting or automatic maintenance of posting; automatically generating a post to be made on the website, or an edit to be applied to a post on the website; and generating and sending a notification to an operator of the automated recruitment system. The notification may further include the post to be made on the website or the edit to be applied to the post on the website, to allow the operator (such as a recruiter) to make the post or make the edit quickly, after a brief review.

In an exemplary embodiment, the step of automatically maintaining, with the automated recruitment system, the one or more posts may constitute or may include at least one of updating the one or more posts to include new job description information, removing the one or more posts, or applying a visibility adjustment to the one or more posts.

In an exemplary embodiment, the plurality of candidates may include at least a primary group, the primary group being formed from candidates having a candidate score in excess of a primary score threshold. This plurality of candidates may further include a secondary group, the secondary group being formed from candidates having a candidate score in excess of a secondary score threshold but below the primary score threshold. In an embodiment, the method step of automatically sending, with the automated recruitment system, a contact message to the candidate, this message including an offer to apply for a position may be performed for each of the candidates in the primary group before being performed for any of the candidates in the secondary group.

In an exemplary embodiment, when the response of the candidate is a rejection, the candidate may be excluded from receiving at least one category of offer for at least one period of time. This may constitute excluding the candidate from at least one of offers in a particular industry segment, offers having a specific job title, offers having a specific job description, offers having a specific salary, offers having a specific job location, or other offers, as may be desired.

In an exemplary embodiment, when the response of the candidate is a question and not an intent to apply or a rejection, the method may include sending a further communication to the candidate requesting a second response.

According to an exemplary embodiment of an AI BOT or other automated recruitment system, an automated recruitment system may be provided which includes a natural language processing engine and a database including a plurality of intents of different types and a plurality of entities of different types, the plurality of intents and the plurality of entities configured into a plurality of conversation paths likewise stored in the database, each of the plurality of conversation paths including an expression of at least one intent about at least one entity. This system may be used to identify at least one job description, at least one job requirement for the job description, and at least one candidate having candidate résumé information associated therewith, based, for example, on the methods discussed elsewhere. This system may then be configured to initiate a conversation with the at least one candidate based on the plurality of conversation paths stored in the database, and process any necessary instructions (which may, for example, be associated with a first intent or first conversation path) that outputs a first message to the candidate, which may for example be a greeting (or a response to an unsolicited candidate communication, or some other message entirely). The system may then process second instructions and information associated with a candidate response message received from the candidate, and may identify one or more candidate response intents in the candidate response message, which may be mapped to a conversation path in the plurality of conversation paths (provided that they are similar enough to any given path).

The system may then process third instructions associated with the conversation path in the plurality of conversation paths, which may lead the system to, for example, a message to be provided in response to the candidate's response, such as a question, another question, or a clarification (such as a rephrasing of an initial question). The system may then send the candidate a recruiter message based on the third instructions, which may include this question.

In an exemplary embodiment, the first intent of the system to be used to generate an initial message may be a casual intent, which is a conversation opener in a first language. The system may then verify that a response of the candidate is actually in the first language, and either continue using that language or use a different language (or even different phrasing/regionalisms and the like) based on the candidate's response.

In an exemplary embodiment, the system may be configured to identify if a candidate response intent is a casual intent (conversation), a business intent (relevant to recruitment or known to be relevant to recruitment) or some other intent (such as an irrelevant question or a question that was not contemplated to be relevant to recruitment). This may include, for example, an indicator of frustration on the part of the candidate or dissatisfaction that they are speaking to an automated system. In an exemplary embodiment, in such circumstances, a recruiter or other minder may be notified immediately or the conversation may be switched to them.

In an exemplary embodiment, an automated recruitment system may be provided so that multiple recruiters or multiple candidates can have their own automated recruitment system instances associated with them. This may allow for, for example, some customization of settings or other advantages such as may be desired.

In an exemplary embodiment, conversations (including text conversations, speech conversations, and any others that may be contemplated) may be stored as a single ongoing conversation in the database. Certain conversations (such as, for example, video conversations that include both speech elements and non-speech elements which may be of importance) may be converted to text by a transcriber. Likewise, the system may include text-to-speech capabilities in order to conduct speech conversations.

According to an exemplary embodiment, a system may be configured to use all of its capabilities to attempt to contact candidates, and may proceed to use alternative communications methods according to some hierarchical logic if the first communications method does not work. For example, an email may be sent if an SMS text message receives no response, or vice-versa. The escalation hierarchy may include, for example, both text and speech methods such as may be desired.

According to an exemplary embodiment, the system may perform searching, including crawling, scraping, and parsing of searchable data, in order to bolster candidate résumé information beyond what has been provided by the candidate. This may include, for example, social media postings (of the candidate, a current or past employer, a reference of the candidate, or any other parties such as schools), corporate directory pages (or analogous directories like incoming students lists), benefits offered by previous or current employers (which may be sent to a source company in order to bolster a current job description), or corroborating information for some other candidate résumé information. (This may include, for example, candidate résumé information that the automated recruitment system has identified as deficient or potentially fraudulent, or which the automated recruitment system cannot identify.)

According to an exemplary embodiment, a system may also provide feedback to a candidate in the event that a problem can be identified with the candidate's candidate résumé information. For example, if a job title could be rephrased or if important information is missing (or had to be teased out of the candidate or dug up externally) a recommendation may be provided to the candidate to fix this.

According to an exemplary embodiment, if the candidate ends up rejecting the job, the system may try to place the candidate in another job (potentially in order to be awarded a finder's fee). According to an exemplary embodiment, the system may obtain one or more job requirements (for example, from past conversation with the candidate or by asking them directly upon rejection) and may then search for these job requirements (also taking into account the candidate's candidate résumé information). If close matches can be found (particularly on the database of a client or on a database that offers a finder's fee) this information may be provided to the candidate.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Figure 1:
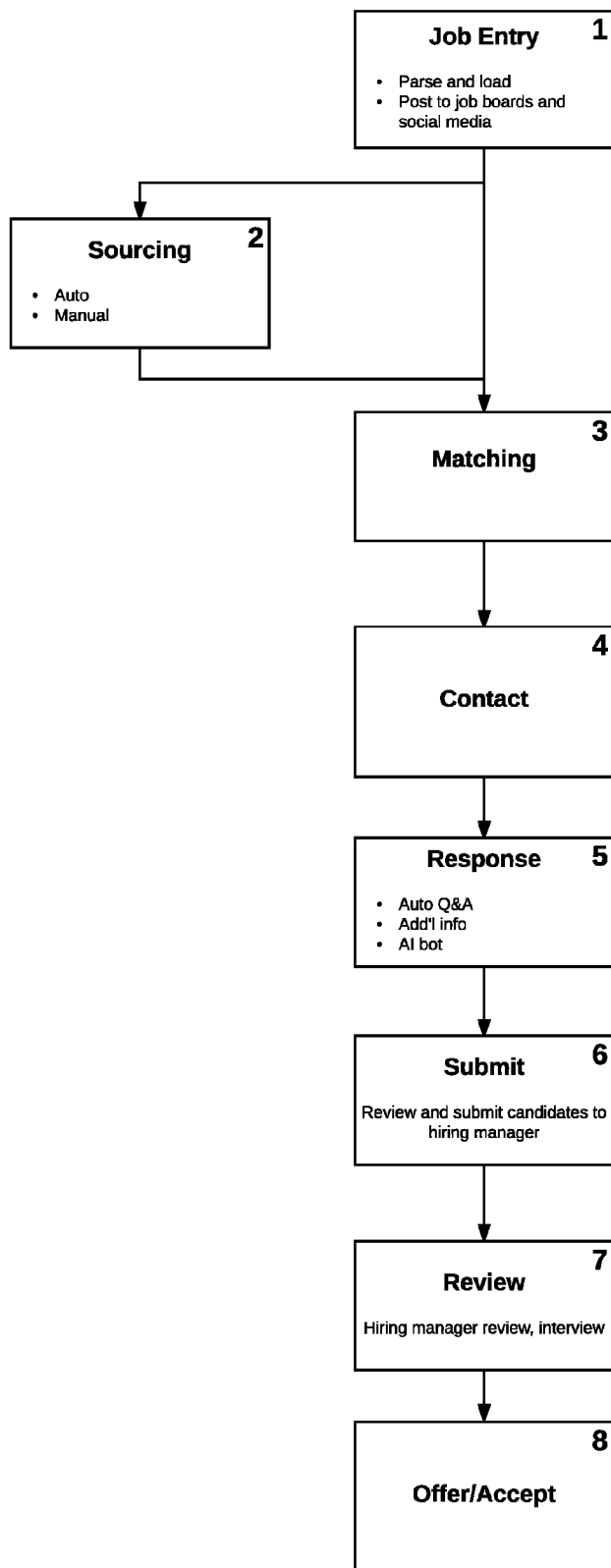
FIG. 1 is an exemplary embodiment of a flowchart depicting a method of automating a recruiting process.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation. Further, as used in the specification, the term "résumé" may be used to refer to all information that may be solicited from or provided by a candidate for an employment position, including a résumé document, but also including, for example, social media information of the candidate, information provided by the candidate in response to questionnaires, data collected from a personal web page of the candidate or an employment web page of the candidate, or any other information that may be relevant to the hiring of the candidate.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

According to an exemplary embodiment, and referring generally to the Figures, various exemplary implementations of a method and system for automating a recruiting process may be disclosed. Such a method and system may function to better match candidates with job openings, and may implement rules permitting the processes of vetting candidates and setting up job interviews to be automated with a computer. In particular, the method and system may make use of a method for providing a candidate with a score for a particular job opening. The method and system may then collect any other information that may be necessary, and may be configured to notify employers about one or more high-scoring candidates that have been found for a job opening. The method and system may further operate to maintain bi-directional communication until such time as the position has been filled.

Such a system for automating the process of selecting and vetting candidates for a position may have numerous advantages. In particular, the system may substantially increase recruiter productivity by automating the communication process between the recruiter, candidate, and hiring manager, and by providing automatic responses to common questions. The system may also significantly reduce the time and expense required to train a recruiter in a particular field, and may even allow other employees to take on the specialized task of recruitment, allowing employees in specialized departments (such as engineering or IT) to more closely vet recruited candidates with their own specialized knowledge.

Turning now to exemplary FIG. 1, FIG. 1 displays an exemplary embodiment of a flowchart depicting a method of automating a recruiting process. Such a method may include several steps, including a job entry step 1, a sourcing step 2, a matching step 3, a contact step 4, a response step 5, a submission step 6, a review step 7, and an offer and acceptance step 8. In an exemplary embodiment, these steps may be run sequentially, in parallel, or in some combination of the two; for example, according to an exemplary embodiment, a matching process 3 and a sourcing process 2 may be run simultaneously, such that the matching process 3 performs matching on résumés already in the system, while the sourcing process 2 performs sourcing on newly-added or newly-updated résumés.

Figure 2:
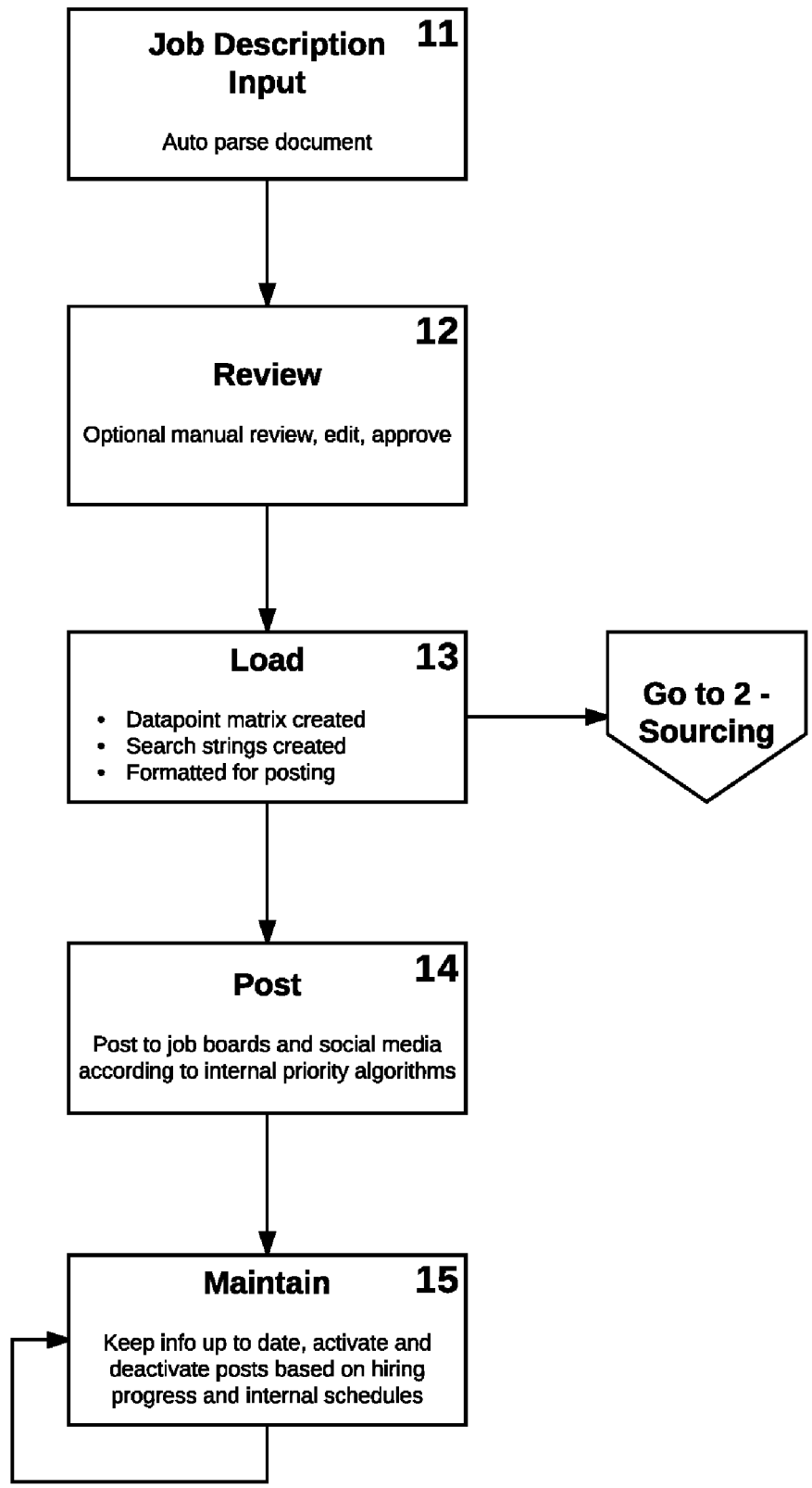
FIG. 2 is an exemplary embodiment of a flowchart depicting a method of performing a job entry step.

Turning briefly to exemplary FIG. 2, FIG. 2 displays, in more detail, an exemplary embodiment of a flowchart depicting a method of performing a job entry step 1. According to an exemplary embodiment, in a first step 11 of a job entry step 1, a job description may be input into the system. In some embodiments, the text of the job description, and any other information that has been provided by the hiring manager that may be outside of the job description, may be parsed by the system (for example, by a system configured to use natural language processing) and key points, concepts, and requirements of the job may be identified from the job description.

In a next step 12 of a job entry step 1, the information that had been automatically parsed from the job description in step 11 may be reviewed by a human operator, such as a recruiter. The recruiter may then elect to edit the information that had been produced in the automatic parsing step 11. In some exemplary embodiments, the recruiter may have to review and approve the information in order to continue with the job entry step 1; in other exemplary embodiments, the recruiter may have the option to do so.

In a next step 13 of a job entry step 1, the job description may be loaded into the system based on the parsing of step 11 (and optionally the manual review of step 12). A data point matrix may then be created in the system for subsequent matching of the information in the job description to information of one or more potential candidates for the position.

According to an exemplary embodiment, a data point matrix may be a data structure that may be represented by a multi-dimensional environment (that is, an environment having one or more axes) wherein each relevant piece of information in the data structure, i.e. each data point, can be represented by a point in the environment having a specific set of coordinates that define its position based on the relevancy of the information in the data point to the concepts or requirements that are represented by the axes or coordinate planes.

Various other representations of data may be constructed using the general framework of a data point matrix. For example, a data vector may be constructed within the data point matrix, which may be represented by a conceptual line that can be drawn through the locales of the greatest concentrations of data points in a data point matrix.

In some exemplary embodiments, a data point matrix (DPM), and/or a data vector (DV), which have been derived from a first entity may be compared to a DPM and/or DV that have been derived from a second entity, by using the first DPM or DV as a template to overlay onto the second DPM or DV. This may allow the relevancy of the first entity to the second entity to be evaluated. For example, according to an exemplary embodiment, a first DPM or DV may be a job description, and a second DPM or DV may be a résumé (or vice-versa). The job description and the résumé may thus be compared by overlaying the first DPM or DV over the second DPM or DV and examining the similarities.

In some exemplary embodiments, a system may make use of one or more alternative methods of matching information in the job description to information of one or more potential candidates for the position, in addition to the use of a data point matrix or instead of the use of a data point matrix. For example, according to some exemplary embodiments, a system may make use of, as a method of matching information in the job description to information of one or more potential candidates for the position: machine learning; one or more neural networks; multi-layer perceptrons; support vector machines; principal components analysis; Bayesian classifiers; Fisher discriminant analysis; linear discriminant analysis; maximum likelihood estimation; least squares estimation; logistic regressions; Gaussian mixture models; genetic algorithms; simulated annealing; decision trees; projective likelihood; k-nearest neighbor analysis; function discriminant analysis; predictive learning via rule ensembles; natural language processing, state machines; rule systems; probabilistic models; expectation-maximization; or hidden and maximum entropy Markov models. Other methods of matching information in the job description to information of one or more potential candidates for the position may be understood and may be used, as may be desired.

In an exemplary embodiment, the system may also generate, or may alternatively generate, one or more search strings for manual candidate searching, which may be used in, for example, a sourcing step 2. This search string may be or may include keywords targeted at identifying the candidate profiles that best match the job description. In some exemplary embodiments, a plurality of search strings may be generated, each of the search strings having broader search parameters than the search string previously used; in other exemplary embodiments, such search strings may be generated on demand if, for example, too few candidates are found using a narrower search string. In some exemplary embodiments, this gradual broadening may serve to limit the number of irrelevant résumés considered by the system, and help ensure that the résumés available to the system are as relevant as possible to the posting or at least to the search string generated based on the posting. In an exemplary embodiment, in each search string, the values used in the search string and the number of parameters used in the search string may be determined manually or automatically by the system, based on settings such as the weight of importance of one parameter or value over another parameter or value (or combination thereof).

According to an exemplary embodiment, the system may also handle formatting and submission of the job description for posting on one or more locations, such as on a job board or on a social media website. In some embodiments, formatting and submission of the job description may be tailored to the intended recipient or intended site on which the job description will be posted; for example, according to an exemplary embodiment, a more detailed version of the job description may be posted on a jobs board, and a less detailed version (that may refer applicants to another posting, such as the jobs board posting, if desired) may be posted on a social media website.

In a next step 14 of a job entry step 1, the system may automatically provide the posting to one or more job boards, social media resources, or other advertising resources, such as may be desired, so that the posting can be posted. Job boards may include, for example, DICE.COM or MONSTER.COM. Social media resources may include, for example, LINKEDIN.COM or FACEBOOK.COM. Other advertising resources may include, for example, GOOGLE ADS or other internet advertising services.

In an exemplary embodiment, posting may be performed automatically by the system on those job boards, social media resources, or other locations where automatic posting is permissible. In some exemplary embodiments, this automation process may include, for example, making requests to particular candidates to connect on social media websites, if desired. In an exemplary embodiment, posting may be performed manually on those job boards, social media resources, or other locations in which automatic posting is not permissible or is not well supported. In an exemplary embodiment, the system may have one or more priority algorithms that govern the priority with which it makes posts on particular resources. For example, according to an exemplary embodiment, a system may first post on a designated list of job boards, then post on social media, then purchase one or more ads from an ad service to advertise the posting to a wide market. The system may then generate one or more posts to be manually posted on one or more services, if desired, or may generate a list of one or more services on which posts must be manually written.

In a last step 15 of a job entry step 1, the system may function to maintain the postings that it has made. For example, according to an exemplary embodiment, the system may be configured to receive new job description information and may be configured to update the job descriptions that it has posted, or any other applicable job descriptions, in order to keep the job posting information up to date.

According to an exemplary embodiment, the system may also function to maintain what postings are visible. For example, in addition to making posts, it may be desired for the system to remove posts from one or more services, for example if a given position has been filled or if a sufficient number of apparently acceptable candidates has been found and the candidates are set to be interviewed. The system may also be configured to deactivate and/or reactivate posts, such that they are still stored on the service but are not visible when deactivated, and such that they are visible when reactivated. The system may also be configured to change the visibility of posts, if, for example, requirements change or the job posting has gone a long time without a sufficient number of applications being filed or without a sufficient number of high quality applications being filed. The system may also be configured to refresh the visibility of posts, where applicable; for example, on some services, posts may be displayed on the service in a ranked order based on the last activity that has taken place on the post, and it may be necessary to periodically bump or refresh the post in some way in order to enhance its visibility.

In some exemplary embodiments, some services may not support automatic maintenance of posts, just as some services may not support automatically making posts. In such embodiments, such maintenance may have to be performed manually instead. In an exemplary embodiment, the system may be configured to automatically generate a list of posts that cannot be automatically maintained and which have to be manually maintained. The system may also be configured to generate an indication of the type of maintenance (for example, modification of the post, activation of the post, deactivation of the post, or another kind of maintenance, as may be desired) that must be performed manually. In some embodiments, the system may be configured to provide an amended post that may be used as a guide for making the appropriate manual amendments to the post; for example, in an exemplary embodiment, when the system is provided with up-to-date information about the job posting, it may automatically generate amended posts for one or more services, the amended posts having the proper up-to-date information.

In an exemplary embodiment, maintenance of the posted job state and status on one or more external resources may be maintained automatically according to the priority algorithm. The priority algorithm may take into account factors such as, for example, the date of the original posting, the deadline by which it is desired to have hired a candidate for the position, the current hiring progress, other priorities and internal schedules or deadlines of the client, or any other considerations and conditions.

Figure 3:
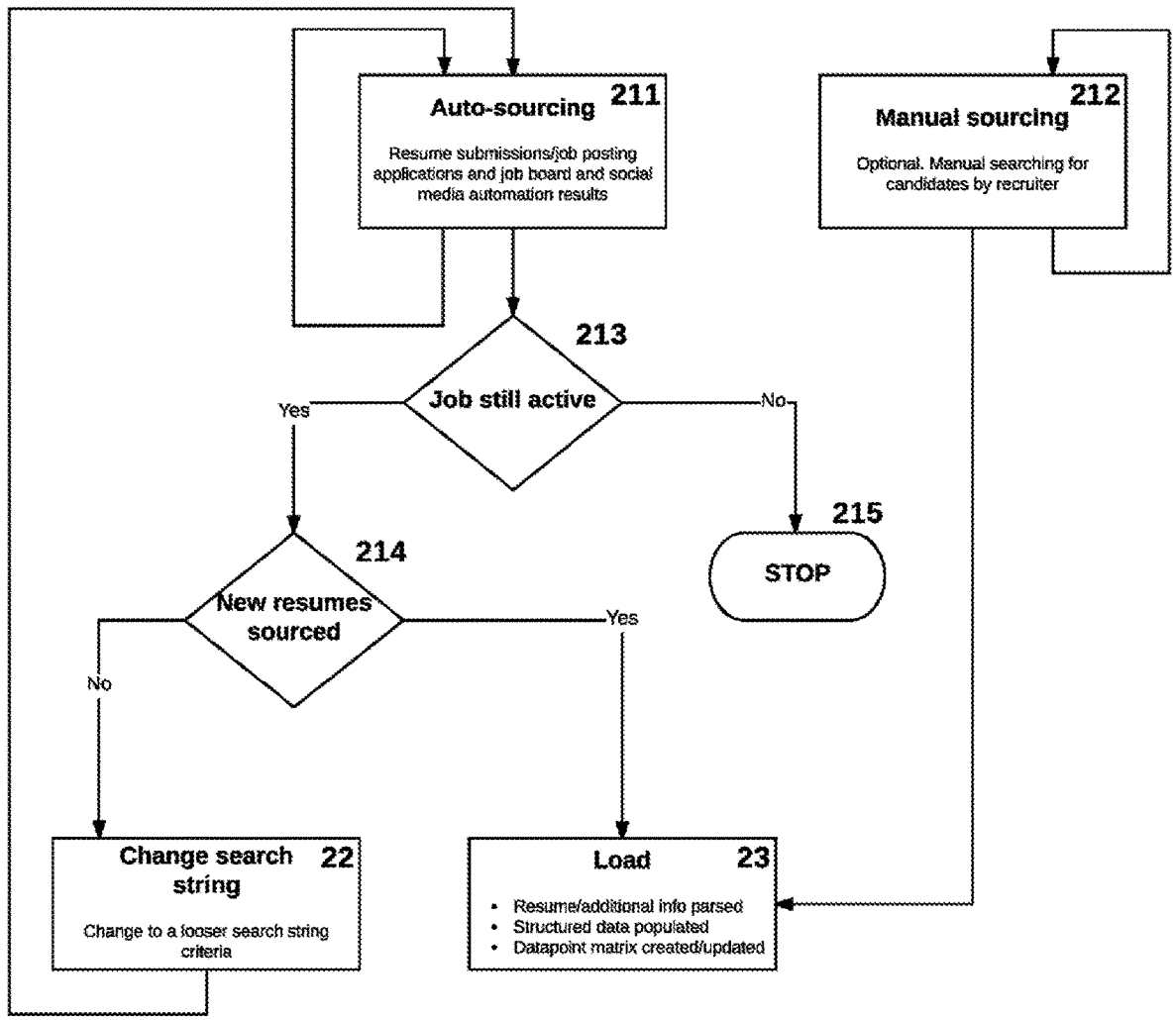
FIG. 3 is an exemplary embodiment of a flowchart depicting a method of performing a sourcing step.

Turning next to exemplary FIG. 3, FIG. 3 displays, in more detail, an exemplary embodiment of a flowchart depicting a method of performing a sourcing step 2. According to an exemplary embodiment, a system may receive inputs from automatic sourcing 211 and manual sourcing 212, and may in each case load résumés into the system in a loading step 23.

According to an exemplary embodiment, in an automatic sourcing step 211, candidates and résumés of candidates may be sourced automatically from job boards and from social media, as well as any other appropriate sources (such as, for example, résumés submitted by a candidate to an employment page of a company website, which may, for example, be forwarded to the recruiter for review). In a manual sourcing step 212, which may be optional in some exemplary embodiments, a recruiter may supplement automatic sourcing 211 by manually searching for candidates and performing traditional sourcing steps. In some exemplary embodiments, sourcing may be entirely optional; under some circumstances, sufficient numbers of résumés may already be on file to allow a desirable number of candidates to be retrieved from candidates already in the system, and as such it may not be necessary to source any additional candidates.

In an exemplary embodiment, automatic sourcing 211 may proceed as follows. In a first step, the system may determine whether the job that is to be automatically sourced for is still active 213. If the job is not still active 213, the system may stop performing the automatic sourcing 215. However, if the job is still active, the system may attempt to source a number of new résumés 214. If the system is able to source a desired number of new résumés 214, the information in the résumés, as well as any other accompanying information, may be passed to a loading step 23. If the system is not able to source a desired number of new résumés 214, the system may change the search string that it is using to perform automatic sourcing 22, such that it is using looser search string criteria. This may entail, for example, broadening the search parameters used in the search string; for example, in an exemplary embodiment, the system may search for a search string containing a plurality of desired skills and desired job titles, and each successively looser search string may have one fewer skill or job title. Other loosening parameters may include, for example, expanding the permissible distance between candidates and the job location (for example, from a radius of 50 miles to a radius of 100 miles; alternatively, a permissible distance could be eliminated entirely and candidates could be asked if they wish to relocate), expanding the permissible date range of the candidate's last activity on a job board or social media profile (for example, in a first case, candidates who have updated a job board posting or social media profile within the past two weeks may be identified as being the likeliest to be looking for a new job and may be selected, while in a second case, candidates who have updated a job board posting or social medial profile within the past month may be selected), Other methods of loosening the search string may also be envisioned. In some exemplary embodiments, the system may provide assistance with manual sourcing 212, which may be performed similarly; however, according to an exemplary embodiment, the system may merely create one or more exemplary search strings that a user can use to search one or more search engines, and may not automatically perform searching 211 with the search strings that it has generated.

In some exemplary embodiments, the system may be configured to generate search strings and perform searching 211 for tasks other than sourcing candidates. For example, according to an exemplary embodiment, the system may be able to look up any information that may be available on the web in order to improve candidate engagement, or limit the number of questions that have to be asked to the candidate if the candidate is considered to be a relatively close match for the position. For example, according to an exemplary embodiment, a job description requirement may require a candidate to have experience with database software, and the candidate's résumé may mention skills with particular software that have not been associated as "database software" by the AI BOT. (For example, the candidate's résumé may mention using GOOGLE database products, such as CLOUD SQL, CLOUD BIGTABLE, and CLOUD DATASTORE, that have been relatively recently released to the public, and these database products may not be recognized as such by the AI BOT.) The AI BOT may generate a search for software or other skills that it does not recognize in order to fill in the gaps in its knowledge, or may generate a search string that would allow a recruiter or technician to fill in these gaps in its knowledge and add the appropriate associations. This functionality may also be used to improve candidate engagement or otherwise support the hiring process in other ways. For example, in an exemplary embodiment, the AI BOT may search for a famous quotation that the candidate has displayed on their social media profile and comment on it, or may search for personal information or personal news provided on a candidate's social media profile and comment on it. For example, in an exemplary embodiment in which the candidate has just taken a trip to Jamaica and posted photographs on their social media page, the AI BOT may view these photographs and ask how the candidate's trip went. In another exemplary embodiment, the AI BOT may view a professional social media posting of a candidate (such as an article the candidate has posted on LINKEDIN) and may comment on it, for example in order to build rapport with the candidate. In another exemplary embodiment, the AI BOT may filter through junk data that the candidate has posted in an attempt to fool or filter out bots or uninformed recruiters; for example, if the candidate has posted nonsense words or nonexistent programming language certifications in order to see if a recruiter is technically savvy enough to comment on them, the AI BOT may identify these through searching, or if the candidate has used a form paragraph of keywords in order to artificially enhance the visibility of their résumé, the AI BOT may perform searching to identify this form paragraph or its source. In another exemplary embodiment, the AI BOT may perform vetting of a candidate through searching; for example, in an exemplary embodiment, the AI BOT may search corporate staff directory pages in order to verify that a candidate was employed at a corporation during a particular time. In another exemplary embodiment, the AI BOT may search social media posts for this information, and may for example search for the candidate on LINKEDIN in order to confirm that the candidate works for a particular company instead of or in addition to searching a corporate staff directory page. (In some exemplary embodiments, such searching may be performed in steps or tiers, such that a candidate who is found on a corporate staff directory page is considered to be confirmed, but a candidate who is not found on a corporate staff directory page or who is associated with a corporation that does not have a corporate staff directory page may be confirmed through social media instead if possible, and may alternatively be confirmed through some other method such as asking for specific references if the candidate does not have the requisite evidence of their employment on social media. In some exemplary embodiments, "evidence" confirming a candidate's employment at a particular company may not be limited to the candidate's own postings, and the AI BOT may also look for, for example, associations between the candidate and other employees at that company, such as other employees being friends of the candidate or making posts on the candidate's social media page.)

The AI BOT also may search for information other than candidate information, and may search based on information other than what has been posted by the candidate, in order to increase candidate engagement. According to an exemplary embodiment, the AI BOT may search an employer's website or certain parts of the employer's website in order to find information relevant to the candidate and which has been left out of the job description provided to the candidate; this information may then be used in order to supplement the information provided in the job description. In some exemplary embodiments, information searched for by the AI BOT may be information compiled by the company, for prospective new hires (such as an "About Us" page), for investors or potential clients, or for other parties such as may be desired, and the AI BOT may be configured to search for such compiled informational pages. In another exemplary embodiment, the AI BOT may be configured to perform more open-ended searching for matters that may be of interest to a candidate but which may not necessarily appear on a company's "About Us" page. For example, the AI BOT may search for company benefit information, such as stock option offerings. In another exemplary embodiment, the AI BOT may search external sites, such as external review sites like GLASSDOOR.COM, or external salary comparison sites such as SALARY.COM, in order to improve the engagement of the candidate and improve their interest in a position or company. For example, in one exemplary embodiment, the AI BOT may search GLASSDOOR.COM in order to retrieve favorable reviews of a company, which may then be provided to the candidate. In another exemplary embodiment, the AI BOT may search SALARY.COM or call SALARY.COM's API in order to get information on what candidates with similar experience to the position being hired for are making (or may do the same for the candidate's current position in order to persuade them that they are underpaid in their current position, making them more likely to change jobs). In another exemplary embodiment, the AI BOT may check trending news information about a company, or trending social media information related to a company, and may share any exciting or favorable information.

According to an exemplary embodiment, an AI BOT, in addition to searching for company benefit information such as stock option offerings to the extent that this information may be available on a company website, may attempt to construct such information from available data or from information available on other sites or from other records. Such information may then be provided along with a job description, for example in the form of an explicit list of benefits of working at the company that can be provided in the job description. This may be done, for example, in order to promote an increased response rate, which may be observed to be as high as 300% higher than the response rate of a job description that does not recite such benefits.

According to another exemplary embodiment, an AI BOT may similarly retrieve positive information about a company from any potential sources, including from a hiring manager or other company representative and including from company reviews (such as may be posted on GLASSDOOR.COM), as well as from other sources such as other company reviews on other pages, company social media sites, news articles published about the company or press releases about the company, other social media postings about the company (such as information about the company that is trending on a social media site) or any other sources of positive information. (In some exemplary embodiments, it may likewise be desirable to retrieve negative information so that the negative information can be addressed if asked about by the candidate; in some exemplary embodiments, the negative information may be retrieved along with, for example, articles or postings from PR specialists addressing the issue.) In some exemplary embodiments, an AI BOT may be configured to perform any or all of the crawling, scraping, or parsing that may be required, while in other exemplary embodiments an AI BOT may communicate with another system in order to conduct some or all aspects of the searches. For example, in an exemplary embodiment, an AI BOT may call an API or execute a backend process in order to perform a crawling, scraping, and/or parsing step, and perform the remaining steps itself.

In some exemplary embodiments, the AI BOT may perform multiple steps simultaneously, or may, when performing one crawling, scraping, and parsingprocess, allocate information that has been crawled, scraped, and parsed to a result of another process based on the content of the information. For example, according to one exemplary embodiment, after material has been crawled and scraped, an AI BOT may parse a company's employee reviews on GLASSDOOR.COM for positive feedback in order to compile a list of positive reviews for the company, and may determine from the positive feedback in the reviews that the employer offers one or more benefits. The benefits described in the reviews may then be added to an explicit list of benefits of working at the company, for example directly or following proper verification (for example, a certain number of reviews may need to describe the benefit in order for the AI BOT to consider the benefit to have been verified as one actually offered by the company, or the reviews may need to have been made within a certain time in order to provide verification that the company still offers the benefit in question.) In another exemplary embodiment, an AI BOT may parse social media comments, such as the comments on a company's LINKEDIN profile or the comments that have been shared with the company's TWITTER profile, for positive feedback, and may determine one or more benefits from this positive feedback. According to an exemplary embodiment, once an AI BOT has determined one or more potential benefits (from a company's career site, or from any other accessible website, such as may be desired), these benefits may then be suggested to the hiring manager for potential selection or approval, if desired. In some exemplary embodiments, an AI BOT may also be configured to look at other postings, such as job postings by competitors, for benefits, and may determine if these benefits are also offered by the hiring manager's company. For example, in some exemplary embodiments, the AI BOT may generate one or more questions for a hiring manager about whether the hiring manager's company offers those benefits as a matter of routine or would consider offering them; in another exemplary embodiment, the AI BOT may suggest these benefits to the hiring manager for potential selection, for example in the form of a checkable list where the hiring manager can check or uncheck certain benefits.

According to an exemplary embodiment, an initial search string generated for use in either an automatic sourcing process 211 or a manual sourcing process 212 may include, for example, all of the skills and job requirements that were mentioned in the job description or otherwise provided by a hiring manager. The initial search string may further include, for example, one or more job titles that match the job description. For example, an initial search string for a software engineering position for a company with a code-base largely in a particular language might include the title "senior software engineer," optionally may be further refined by adding the language proficiency desired by the company directly to the title (for example, "senior Python engineer"), and may include a list of skills such as proficiency in the Python language. During a loosening process, optionally, more than one job title could be added; for example, according to an exemplary embodiment in which an initial title used in an initial search string was "senior Python engineer," the additional titles "senior engineer" and "senior developer" could be added. During a loosening process, skills could also be removed, either instead of adding titles or in addition to adding titles; as such, looser search strings may progressively have more job titles and fewer skills. Skills may also be made optional; for example, for a particular position, it may be most desirable that a candidate for a senior developer position have proficiency in both the Python and Java languages, but acceptable if they have proficiency in either one, and as such a first search string may be generated requiring each of these skills and a second search string may be generated requiring one skill or the other.

In an exemplary embodiment, sourcing, whether automatic 211 or manual 212, may constitute active searching for candidates that match the general criteria for the job opening, as well as accepting submissions and applications from interested candidates via any of the commonly available communication channels, which may include (but which may not be limited to) a Web portal, email, a telephone (including, for example, mobile, landline, and SIP phones), fax/facsimile, SMS text messaging, social media posts or notifications, push notifications, device-based messaging such as VIBER or WHATSAPP, or any other method of communication. In particular, a method of communication that lends itself to automation may be employed in an auto-sourcing step 211, while a method of communication employed in a manual sourcing step 212 may not have to be (and may include, for example, methods like face-to-face networking).

According to some exemplary embodiments where a telephone or other voice-based method of communication is used (or if any other non-text method of communication is used; for example, it may be contemplated to use the system to conduct a video interview of a deaf candidate who knows sign language, or may be contemplated to use the system to receive portfolio materials from a graphic designer candidate that may be incorporated as part of the conversation with the candidate), the system may be configured to load in data interpreted from text, such as, for example, the name of the candidate and the job that the candidate is referring to. This may mean that, for example, if the candidate picks up the phone and calls the recruiter by looking at the number on an incoming SMS text message, the candidate may be referred to an AI BOT that will know this information or other information (such as previous questions asked by the candidate, previous communications with the candidate, and so forth) and will be able to have a conversation with the candidate. In some exemplary embodiments, the same rules as are used for a text-based conversation may be used, or a variation of these rules may be adapted for the telephone conversation, such as may be desired. In some exemplary embodiments, the voice-based conversation or other non-text conversation may be transcribed and stored in the database during or after the conversation; in some exemplary embodiments, the real-time transcription and storage of the conversation and real-time text-to-speech generation may allow the same logic as would be used for a text-based conversation to be used with the added steps of the conversation being recorded in textual form and then output in text-to-speech form.

For example, according to an exemplary embodiment, if a candidate should call a number associated with an AI BOT, for example by reading the number off of an SMS text message or other similar message, or through placing a call through an app that allows such calling (such as SKYPE or FACEBOOK MESSENGER), the AI BOT may respond as follows. "Hi Jim! I'm guessing that you are calling about the job opportunity I emailed/texted you about?" The AI BOT may then wait for a response from the candidate, and may then reply to that response, such as, for example, with "Great! Do you have any questions I can answer for you, or would like me to give you more information on the company or job description?" In some exemplary embodiments, the AI BOT may also be proactive about placing outbound calls to candidates, for example if an email or SMS-based inquiry is not responded to within a certain period of time; for example, an AI BOT may be configured to place a call to the candidate and say "Hi Bill, this is Brian. I was calling about a job opportunity that you might be interested in. Is this a good time to talk?"

In some exemplary embodiments, this may extend to having multiple AI BOTs or multiple instances or personas of the AI BOT. This may ensure that, when the AI BOT converses with a candidate, the "from" number does not need to be the same for all candidate text communications, which may better facilitate two-way communications. This may also simplify the process of transferring the conversation to a live recruiter.

For example, according to an exemplary embodiment, each of the recruiters of a recruitment agency may be paired with one or more AI BOT personas, which may each have different voices or personalities or any other variances that may be desired. According to one exemplary embodiment, each of these voices, personalities, or other attributes of the AI BOT persona may be based on the attributes of the recruiter in order to ease any transition that needs to be made between the AI BOT and the live recruiter, if such is desired. So, for example, if a recruitment agency has 30 recruiters, according to an exemplary embodiment, 30 instances of the AI BOT may be generated, each having a different name (which may be, for example, the name of a recruiter, or may be another name, such that the bot can be represented as the recruiter's assistant or staff member), each having a different telephone number, each having a different email address, and each having any other different information. This may help to individualize a communication with a particular candidate, or individualize a particular offer made to a particular candidate; for example, in an exemplary embodiment, a candidate who is approached more than once by the same recruiting agency may have different AI BOT personas that communicate with them each time, if this is desired. Alternatively, it may ensure that the same AI BOT personality communicates with the same candidates each time, but that this AI BOT personality does not necessarily communicate with every candidate, in order to give the candidate the impression that they have been partnered with a particular recruiter. In some exemplary embodiments, candidates may be paired with certain AI BOT personalities based on some criteria, such as feedback provided by the candidates or candidate demographic information.

In some exemplary embodiments, it may be desired to have separate instances of the AI BOT for different communications media. For example, according to an exemplary embodiment, an AI BOT instance or persona may have a specific phone number or email address, and a separate instance of the AI BOT may be used for other services, such as FACEBOOK MESSENGER, WHATSAPP, or SLACK, or any other services that may be desired. In some exemplary embodiments, a separate instance of the AI BOT may exist for all AI BOT instances—for example, such that, for each recruiter, there may be both a standard bot and a WHATSAPP/FACEBOOK MESSENGER bot—while in other exemplary embodiments just one AI BOT may exist for each alternative service, such as may be desired.

In an exemplary embodiment, automatic sourcing may be performed on those job boards, social media resources, and other resources that allow automation, and manual sourcing may be performed on those job boards, social media resources, and other resources that do not allow automation. In some embodiments, manual sourcing may also be performed, to a limited degree, on those job boards and other resources that do allow automation, in order to confirm the results of the automated process, if desired.

In both automatic 211 and manual 212 sourcing, each sourced candidate may be associated, within the system, with the job that they are being sourced for. In some exemplary embodiments, candidates may be sourced to particular jobs or may be simultaneously sourced to more than one job, as desired.

In a loading step 23 of a sourcing step 2, a résumé (including a CV/résumé document or any other information) of a sourced candidate or of more than one sourced candidate may be input into the system, and may be parsed. In an exemplary embodiment, the system may, in a parsing step, identify one or more concepts in the résumé, contact information of the candidate, the experience of the candidate, and any other relevant key points that may be applicable to the hiring of the candidate. The parsed data may then be structured and stored in a database.

In an exemplary embodiment, a data-point matrix may then be created for each résumé. According to an exemplary embodiment, a data-point matrix may be created for each résumé for each subsequent matching and ranking of that résumé. In some exemplary embodiments, a data-point matrix may already exist for a particular résumé (for example, if the sourced résumé is an update of a previously-provided résumé for a particular candidate); in such exemplary embodiments, the data-point matrix may already exist in some form and may be updated rather than created.

Figure 4:
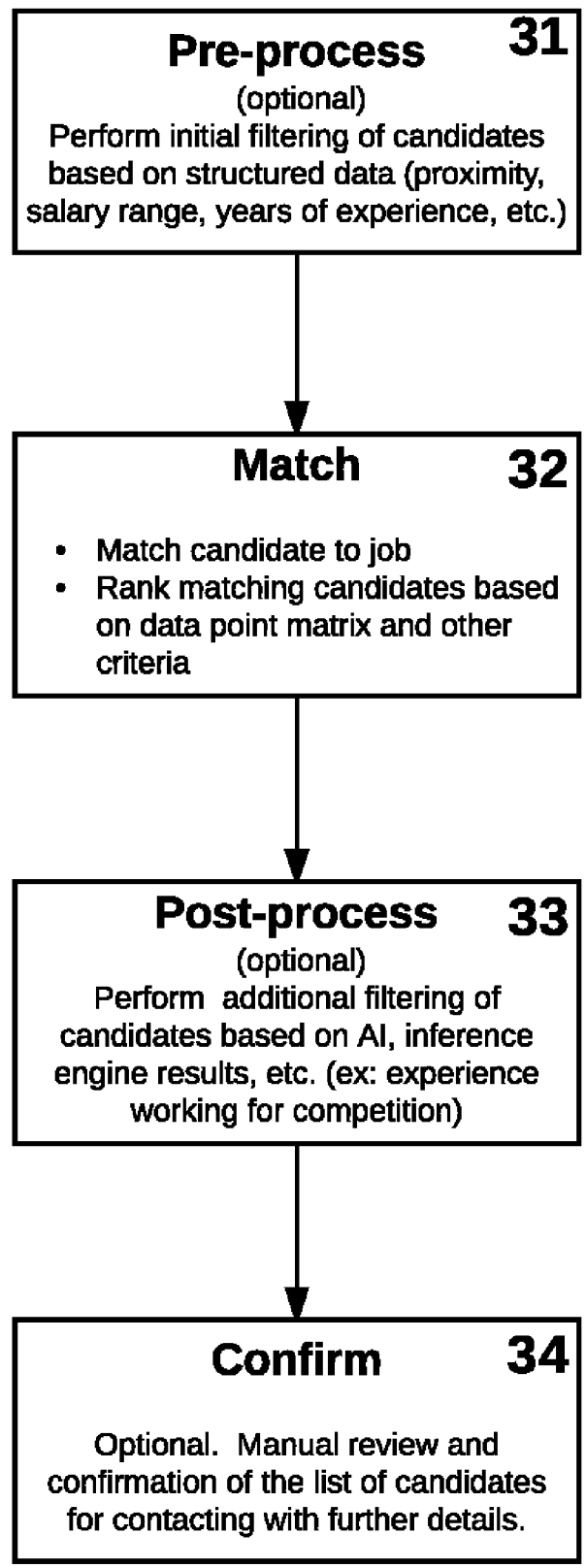
FIG. 4 is an exemplary embodiment of a flowchart depicting a method of performing a matching step.

Turning now to exemplary FIG. 4, FIG. 4 displays an exemplary embodiment of a matching step 3. In a matching step 3, the system may attempt to match job candidates to jobs. This step may include, for example, a pre-processing step 31, a core matching step 32, a post-processing step 33, and a confirmation step 34. In an exemplary embodiment, each of the steps apart from the core matching step may be optional; for example, in some exemplary embodiments, these steps may be enabled or disabled based on the candidate search to be performed, or may be enabled or disabled for a particular system. Further, in an exemplary embodiment, the criteria used by each of the pre-processing step 31, core matching step 32, post-processing step 33, and confirmation step 34 may be weighed in order to ensure the best possible matches, and may be dynamically adjusted (in terms of weight and in terms of which criteria are actually applied) in order to loosen or tighten the focus of a search.

In an exemplary embodiment, a matching method 3 may be triggered following a sourcing step 2. However, in an exemplary embodiment, matching 3 may be a continuous process, which happens alongside a sourcing step 2, such that matching 3 is performed on newly sourced résumés as they are sourced. For example, according to an exemplary embodiment, a matching step 3 may be triggered by the addition of a new résumé by a user of a jobs board or other source location, an updated résumé being provided by the user of a jobs board or other source location, the addition of a new job on a jobs board or other source location (such as, for example, via email or by the use of an Applicant Tracking System (ATS)) by an employer, an update to a job description being provided on a jobs board or other source location by an employer, or any other addition or alteration to a résumé or a job description on a jobs board or other source location. In some exemplary embodiments, a matching step 3 may also be performed again if a review step 7 is reached and the hiring manager rejects some or all of the candidates that have been provided to the hiring manager; for example, according to an exemplary embodiment, matching 3 may be performed when a rejection is received, or may be performed when feedback is received from the hiring manager (for example, one or more reasons as to why a candidate was rejected for an interview), which may be done in order to encourage the hiring manager to provide feedback. Finally, in an exemplary embodiment, matching 3 may be triggered before a sourcing step 2; for example, according to an exemplary embodiment, existing candidates having existing candidate profiles stored in a database may be matched 3 before other candidates are sourced in a sourcing step 2. In some exemplary embodiments, a system may be configured to perform matching 3 either before, during, or after sourcing 2; for example, in an exemplary embodiment, a system may assemble a database of candidates for a first position by performing sourcing 2 and then matching 3, and may then match 3 the same database of candidates to a similar second position before performing additional sourcing 2. A system may likewise perform matching 3 for a particular position before, during, and/or after sourcing 2; for example, according to an exemplary embodiment, a new position to be filled may be provided by a hiring manager, and a matching 3 process may begin immediately using the existing candidate profiles stored in the database. Sourcing 2 may then be performed, and as new résumés come in (from sourcing 2 for this position or sourcing 2 for another similar or related position) the matching 3 process may run again on these candidates. (Likewise, the matching 3 process may run again when updated data is received on existing candidate profiles.)

According to an exemplary embodiment, a system may be configured to automatically receive notifications of a user having added their résumé or having updated their résumé, or a job description being created or edited; for example, such a system may be tied into the operations software of a jobs board or source location. In an exemplary embodiment, a system may be configured to automatically perform searches for users having added a résumé or edited a résumé, or employers having added or edited a job description. In an exemplary embodiment, a system may exhibit different behaviors for users who are part of active campaigns (i.e. users who are considered to be candidates for at least one job) and users who are not; for example, in an exemplary embodiment, users who have been identified as being candidates may be monitored more closely, if desired.

In an exemplary embodiment, the conversion of résumé data and job description data into data point matrices, or data sets (such as data vectors) on a data point matrix, may be used to store both all of the data entities contained by the system and all of the relationships between the data entities contained by the system. This may allow all résumés to be cross-referenced with all job descriptions (or may allow a substantial number of résumés to be cross-referenced with a substantial number of job descriptions) with relative ease. As such, in the event that the system fails to match a specific résumé to a specific job, it may be able to repeat a matching step 3 in order to match and suggest other job opportunities that may better suit the candidate, and may be able to repeat a matching step 3 in order to suggest a given candidate to hiring managers having other open positions to the one being presently matched.

In a pre-processing step 31, the system may perform initial filtering of candidates based on some criteria. This criteria may include, for example, any or all types of available structured data, such as proximity, salary range, years of experience (such as, for example, years of experience in general or years of experience with a specific skill), or any other available data. For example, it may be desired to, as part of a pre-processing step, sort out all candidates who are not within a 50-mile radius (or within an estimated 1-hour drive) of a job site. In another example, it may be desired to filter out all candidates having a salary known to be in excess or significantly in excess than a salary of a position being offered (or who can be estimated to have a salary in excess of the position being offered based on their job title).

The system may then perform a core matching step 32, in which the system may attempt to match candidates to jobs. In an exemplary embodiment, the system may perform a search for candidates using a semantic matching engine; in an alternative embodiment, the system may perform a search for candidates using any other searching method or searching tool, instead of or in addition to a semantic engine. The semantic engine may be a natural language processor capable of inferring meaning relevant to a particular subject from literal statements in a quasi-analog manner, often by analyzing the context of a literal statement and how the statement relates to other words or statements. The semantic engine may be or may include an artificial intelligence (AI), machine learning software, natural language processing software, or comparable software or hardware, such as may be desired. The résumés of searched candidates may be scored based on their match to one or more elements extracted from the job description, which may include one or more key points, concepts, or requirements that are outlined in the job description.

According to an exemplary embodiment, as part of the matching step 32, the résumé of a candidate may be matched to more than one job. For example, in an exemplary embodiment, a data point matrix may include multiple data sets, such as data vectors, which each represent the requirements of a job. This may mean that, even if the system fails to match the candidate to one particular job, the system may be able to match the candidate to a different job based on the data set of the second job and its similarity to the data point matrix of the résumé.

In an exemplary embodiment, as part of the matching step 32, searching (using a semantic engine or otherwise) may be performed on those résumés sourced for the job in question. In another exemplary embodiment, searching may be performed on all candidate résumés that exist in the system, with résumés that have been sourced specifically for the job in question being given a higher priority in the search, if desired. In another exemplary embodiment, searching may by default consider all résumés, but may exclude résumés in cases where the candidate associated with the résumé has selected an option to strictly associate the résumé with a particular job (for example, if the candidate has selected an option not to be considered for other jobs). In another exemplary embodiment, searching may by default consider only those résumés sourced for the job in question, but may include résumés in cases where the candidate associated with the résumé has selected an option to allow the consideration of the résumé for any applicable job or for a broader set of applicable jobs.

In an exemplary embodiment, résumés may be scored by a semantic engine utilizing machine learning concepts. The semantic engine may apply weight to certain requirements, which may be specified by a hiring organization or recruiter or may be derived from the job description. For example, these requirements may include (but may not be limited to) a title search (i.e. a search of job titles), the date on which the résumé was last updated, particular skills (or synonyms of those skills) that may be listed in the résumé, a number of required years of experience in a particular field, a number of required years of experience in a particular industry, a number of years of experience associated with a skill or with a particular set of skills, employment continuity, salary history, salary requirements, geographical proximity, social footprint (for example, the connections of the user on one or more social media websites), activity of social media (for example, the postings of the user on one or more social media websites), willingness to relocate, and any additional requirements that have been provided by the hiring company or which have been deemed relevant to the process. In an exemplary embodiment, some or all of these criteria may be given different levels of weights from one another. In an exemplary embodiment, particular criteria may be mutually exclusively given weight, or may weigh against each other; for example, if a candidate is found who is geographically proximate to a hiring company, it may not matter that the candidate is willing to relocate, and the willingness of the candidate to relocate may not be scored or may be given different weight.

The semantic engine may then determine which candidates have the highest scores, and may select candidates accordingly. For example, in an exemplary embodiment, a semantic engine may rank candidates based on the data point matrix scores of the candidates in each of the above areas (or in each of the above areas that are actually considered) and based on any other criteria, as desired. The semantic engine may then use the ranked list of candidates to select one or more candidates to progress to a next stage of hiring; for example, in an exemplary embodiment, the semantic engine may take the top X most highly ranked candidates.

In an exemplary embodiment, to facilitate searching (using a sematic engine or otherwise) during a matching step 32, the search functionality of the system may be configured to be iterative in nature and may broaden with subsequent iterations, similar to the automatic sourcing search 211 performed in the previous step 2. For example, in an exemplary embodiment, if the system performs a search for candidates that score above a pre-set primary threshold, and is unable to identify a particular prerequisite number of candidates for the position which score above that threshold, the system may perform a new search with looser search criteria, such as a pre-set secondary threshold or an automatically calculated secondary threshold. In an exemplary embodiment, the system may be configured to continue this until the prerequisite number is identified; in another exemplary embodiment, the system may terminate the searches after a specified number of times or after reaching a specific threshold.

In an exemplary embodiment, the system may be configured to loosen or deprioritize particular search criteria first. For example, according to an exemplary embodiment, the system may be configured to first loosen search criteria based on the considerations of geographical proximity, skill set, years of experience, salary requirements, or any other specifications that might be provided by the hiring company. In an exemplary embodiment, loosening of search criteria may be performed in pre-configured steps (i.e. using a pre-set secondary threshold); for example, if a search is initially performed of candidates within a 20-mile radius, the next pre-set secondary threshold may be candidates within a 50-mile radius, and the one after that may be candidates within a 100-mile radius.

In an exemplary embodiment, candidates may be grouped into a first group, a second group, or any number of other groups based on the relevance of the candidates to the job description, which may be determined by the search results. For example, according to an exemplary embodiment, candidates meeting a primary score threshold may be grouped into a first group, candidates meeting a secondary score threshold but not a primary score threshold may be grouped into a second group, and so on and so forth.

According to an exemplary embodiment, a post-processing step 33 may be performed in order to perform additional filtering of candidates that have been selected as part of a matching step 32. In some exemplary embodiments, a post-processing step 33 may perform filtering by the use of an AI bot, by the use of inference engine results, and so forth. (According to an exemplary embodiment, an inference engine may be incorporated into the system, which may be used to facilitate post-processing filtering as well as other inferences, such as, for example, inferences about what the intent of the candidate is or is likely to be, that may be useful for post-processing 33.) In some exemplary embodiments, a post-processing step 33 may filter based on any criteria, including criteria that have been considered previously or new criteria used only in post-processing filtering.

In an exemplary embodiment, an optional post-processing step 33 may filter candidates based on positive criteria that positively distinguishes the candidate seeking employment over other candidates, negative criteria that is detrimental to the candidate seeking employment, neutral criteria, or criteria that can be or is more than one of the above. For example, in an exemplary embodiment, a candidate may be filtered based on the candidate's experience working for a firm that competes with the firm that has the job opening. This may be considered to be a positive criterion (the candidate may have insight into the workings of the competitor) and the candidate may be filtered for that reason; conversely, it may be considered to be a negative criterion (the candidate may be subject to an undesirable post-employment agreement with the competitor) and the candidate may be filtered for that reason. In some exemplary embodiments, a post-processing step 33 may remove filtered candidates or may change the group into which a filtered candidate may be placed, as may be desired.

Lastly, according to an exemplary embodiment, an optional confirmation step 34 of a matching step 3 may be performed after a post-processing step 33 or after a matching step 32 if a post-processing step is not performed. In a confirmation step 34, depending on the configuration of the system, a final list of matching candidates may be provided by the system, for example to a recruiter and/or to the hiring company, in order to permit manual review and confirmation of the final list by either or both of the recruiter and the hiring company. In an exemplary embodiment, this step may take place prior to initiating contact with the candidates. In an exemplary embodiment, the system may be configured to automatically initiate contact with the candidates once they have been identified, but may not receive authorization to do so until the confirmation step 34 is completed.

Figure 5:
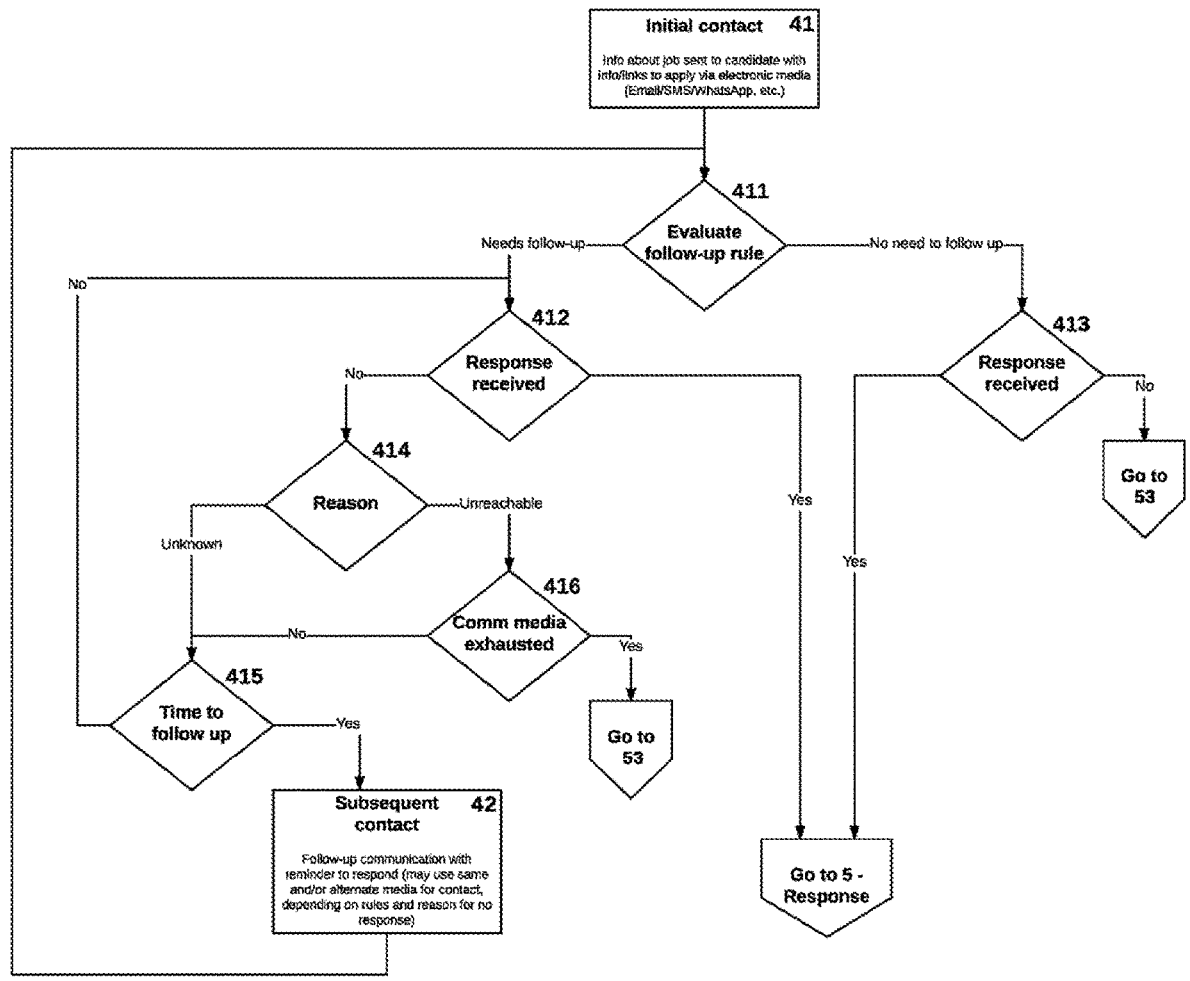
FIG. 5 is an exemplary embodiment of a flowchart depicting a method of performing a contact step.

According to an exemplary embodiment, after a confirmation step 34 is completed (if it is desired to perform one) or after the matching step 3 is completed, the system may perform a contact step 4. This may be shown in, for example, exemplary FIG. 5. According to exemplary FIG. 5, in a matching step 4, the system may automatically initiate a communication campaign to the one or more candidates identified by the search.

The system may first perform an initial contact step 41, in which information about the job is sent to a candidate, along with a link enabling the candidate to apply for the job, via some form of electronic media or otherwise. After an initial contact 41 has been sent, the system may then evaluate a follow-up rule 411, in order to determine whether the system has a need to follow up on the initial contact. For example, according to an exemplary embodiment, the system may determine that it has a need to perform additional follow-up communications if the candidate is a high-priority candidate who appears to be particularly suited for a position, if there are few other candidates being considered for the position, or if the system has otherwise been instructed to perform follow-up via a follow-up rule 411. In an exemplary embodiment, the system may determine that it does not have a need to perform additional follow-up communications if the candidate is a lower-priority candidate or if the system has otherwise been instructed not to perform follow-up via a follow-up rule.

According to an exemplary embodiment, the follow-up rule 411 may be configured to induce the system to send reminders to the candidate when the candidate has not responded to an inquiry, or when the candidate has responded to an inquiry but further information is necessary. For example, according to an exemplary embodiment, a system may determine that it is necessary to get an updated résumé from a particular candidate, and the system may have received an email communication from the candidate promising that the candidate will send the updated résumé later in the day. The next day, the system may determine that it has not received the updated résumé, and may send a communication to the candidate reminding the candidate to provide the updated résumé.

According to an exemplary embodiment, a follow-up rule 411 may incorporate a predefined timeframe for follow-up or one or more other checks in order to ensure that conversations do not become "stuck in limbo." For example, according to an exemplary embodiment, a response time of 24 hours may be predefined, or some other response time may be predefined, after which the system will consider the candidate not to have responded to the inquiry. In some exemplary embodiments, this response time may take into account weekends and holidays, or may take into account information that the system can determine about the candidate's current job (for example, if the candidate is currently working at a position in the federal government, the system may consider federal holidays like President's Day that may be assumed to be normal work days for other candidates) or about the candidate's cultural background (for example, a candidate that is a first-generation Chinese immigrant may be considered likely to have made plans for Chinese New Year/Spring Festival, and this may be treated as a holiday for that particular candidate). Other factors may also be considered; for example, a time frame in which the candidate is to be considered nonresponsive may be adjusted up or down manually by a recruiter or may be adjusted up or down based on stated preferences of the candidate (or based on historical response times of the candidate). According to an exemplary embodiment, a period of time after which the candidate will be considered nonresponsive may be dynamically adjusted based on the conversation medium that the candidate is using or has last used; for example, according to an exemplary embodiment, if the candidate is using a text messaging communication channel, this may have a much shorter window for response (where the candidate may be considered "away" after a very short period of time, such as ten minutes), and if the candidate is using a voice communication channel such as a telephone connection, the candidate may have a longer period of time (such as several days) to make a return call. Other factors which may affect a time after which the candidate may be considered nonresponsive include the priority of the candidate (a high-priority candidate that appears to be particularly well-suited to a job may be sent follow-up messages more frequently), the priority of the job (if the position is one that must be hired for more urgently, each candidate may be sent follow-up messages more frequently), a number of candidates submitted for the job (for example, in one exemplary embodiment, a large number of candidates may mean that each individual candidate is less important to pursue, and follow-up messages may be sent less frequently; in another exemplary embodiment, it may be important to ensure that no one single candidate holds up matters, and follow-up messages may be sent more frequently), or any other criteria such as may be desired.

For example, according to one exemplary embodiment of a follow-up rule, the system may first send a message to a candidate as part of a particular recruitment campaign for a particular job. For example, a first campaign message (which in such an exemplary embodiment may be sent initially via email) regarding an AWS architect position may be sent to a particular candidate, along with appropriate introductory content which may vary based on, for example, previous communications with the candidate if any, or what source the candidate's information came from. (For example, a candidate that has been previously communicated with may be told "Hey [candidate], reaching out again . . . " while a candidate that has not been previously communicated with may be told "Hi [candidate], this could be your dream job . . . .") The candidate may then reply to the email, saying "This looks like a great opportunity; what is the target salary for this position?" and thereby signaling interest in the position. This may, in some exemplary embodiments, initiate the application of a follow-up rule 411, which may in some exemplary embodiments not otherwise have been applied (if the candidate did not reply to the initial posting, this may be taken as a complete lack of interest). According to an exemplary embodiment, the candidate may be responded to with "Glad to hear it! The target salary range for this position is $130 k to $150 k, depending on experience. Does this meet your salary expectations?" At that point, the candidate may not reply for a period of time, for example 24 hours. The candidate may then be sent a follow-up message stating "Hey [candidate], I'm just checking in to see if $130 k to $150 k composition for the AWS architect position fits with your expectations. If not, could you tell me what you'd be looking for in an AWS architect position?" If the candidate still does not respond, the system may send additional follow-up messages, which may for example be sent after a longer period of time (such as a week, if the first message is sent after 24 hours) or any other period of time such as may be desired. For example, the candidate may be messaged with "Hey [candidate], I thought I'd send one last message. If you are not interested in this tole, there are 7 other AWS architect positions in your area that I think would be a good fit for you. Are you interested in learning more about them?" No response after this point may then "end" the conversation and move the candidate out of the campaign for this specific position, though in some exemplary embodiments the candidate may have a longer period of time to enter themselves into consideration for some of the other positions advertised to the candidate, if desired. This may ensure that the candidate is cycled out of consideration for a specific campaign and that the initial conversation with the candidate is ended, which may ensure that the system has a good idea of how many candidates have shown interest in the position and are realistically in play for the position. If there are not enough, then the system may be able to source additional candidates or may elect to reach out to candidates that scored lower in the matching process. If the candidate then response for one of the other jobs, the system can then develop the candidate's interest in the other job and engage in a new conversation about that job (which may incorporate any details known about the candidate from the old conversation, and which may be a retargeting of the old conversation if desired) which may allow a fee to be collected for the new job or may allow additional data points to be collected that might be useful in the future.

In an exemplary embodiment, the follow-up rule 411 may also be configured to induce the system to rephrase its inquiries between the initial communication with the candidate and one or more follow-up communications provided to the candidate. For example, according to an exemplary embodiment, an AI BOT may ask a candidate a first question about a specific skill listed on the candidate's résumé, such as, for example, the candidate's skill with artificial neural networks. The candidate may not respond to the question, which may prompt the AI BOT to ask the same question to the candidate after a given period of time has passed, with the question optionally being rephrased if this is desired. For example, the system may first ask the question "Do you have experience with artificial neural networks?" and may ask in a second question "I believe you do have experience with artificial neural networks because 'cognitive science-based machine learning' is listed in the skills section of your résumé, but can you confirm that this is true?" If there is still no response, the AI BOT may be configured to skip this question and move onto a later one, optionally providing this question again after a number of other questions have been asked, such as at the end of a process.

If there is no need for a follow-up communication established by a follow-up rule 411, then the system may determine whether a response has been received 413. This may be done, for example, periodically, when every new communication is received, or otherwise, as may be desired. If a response is received, the system may proceed to step 5, a response step, which may be indicated in exemplary FIG. 6. If no response is received and some criteria is met (for example, if no response has been received for a designated period of time, or if no response is received by the time a certain number of other candidates have responded, or if no response has been received for a certain period of time after at least one other candidate has responded, or otherwise, as may be desired) the system may proceed to a step of removing the candidate 53.

If there is a need for follow-up communication established by a follow-up rule 411, then the system may likewise determine whether a response has been received 413. This may be done for example, periodically, when every new communication is received, or otherwise, as may be desired, using similar logic to the "no need for follow-up communication" case or using different logic (for example, the "need for follow-up communication" case may use a shorter time period, if desired). If a response is received, the system may likewise proceed to step 5.

However, if no response is received, then the system may consider whether executing a follow-up response is necessary. In a first step, when no response has been received, the system may attempt to determine the reason as to why no response has been received 414. For example, the system may be configured to determine whether no response has been received for the reason 414 that the candidate is unreachable by the candidate's posted contact information; for example, an attempt to make a phone call to the candidate may result in a message that the call cannot be completed as dialed, an attempt to send an email communication to the candidate may result in a bounce message, or an attempt to send a physical letter to the candidate may result in a "return to sender" notification. In such a case, when the communication media that is accessible to the system has been exhausted 416 and it does not appear that the candidate has been successfully contacted, the candidate may be removed from consideration 53. However, if other communication media are identified that have not been exhausted, the candidate may be contacted by said communication media.

The system may also conclude that it is not able to identify a specific reason as to why the candidate has not responded 414. In such a case, the system may determine that a follow-up communication should be drafted 415. According to an exemplary embodiment, upon making such a determination, the system may initiate a subsequent contact 42. In some exemplary embodiments, the subsequent contact 42 may be a follow-up communication that indicates its status as a follow-up communication, and provides a reminder to respond. The system may make use of the same media initially used to make contact or may make use of alternate media to make contact, such as may be desired; this may be based on, for example, the rules of the system, the reason for no response if one can be determined, the candidate's expressed preferences if any have been expressed (for example, the candidate's profile on a job search website may indicate a preference to be contacted by email) or any other logic such as may be desired. In an exemplary embodiment, the messages that may be sent may be tailored to the communications medium used to send the messages; for example, according to an embodiment where a text message and an email are sent to a candidate simultaneously, a text message communication may be a short message containing only essential details (or may even be a notification that an email was sent) and an email communication may be a more detailed communication, as may be desired. Messages sent via the same or a different communications medium may be sent sequentially or simultaneously, as may be desired.

Once a follow-up communication has been sent in a subsequent contact step 42, the system may proceed back to near the start of the method 4. For example, the system may then be configured to determine whether future follow-up is necessary based on a follow-up rule 411; for example, in some cases, it may be desirable to send only one follow-up communication to a candidate, whereas in other cases it may be desirable to send more than one follow-up communication to a candidate.

The system may perform similar steps for every candidate or for more than one candidate, and may proceed through a list of candidates in some order. For example, in an exemplary embodiment, the system may proceed by residency group affiliation or otherwise may proceed by rank; for example, in an exemplary embodiment, a system may contact candidates who scored above the primary score threshold first (in any order) and may contact candidates who scored above the secondary score threshold next (in any order). In another exemplary embodiment, the system may proceed in any order.

According to an exemplary embodiment, the system may, as part of the communication campaign, send a variety of types of information to candidates. This information may include, for example, periodic updates about the status of their application to the position, reminders about what next steps the candidate needs to take or reminders about future appointments (or any other applicable reminders), requests for further information from the candidate, or any other communications, as may be desired.

In an exemplary embodiment, the system may make use of one or more varieties of channels of communication, which may be used on their own or in any combination. These may include (but may not be limited to) a Web portal, email, a telephone (including, for example, mobile, landline, and SIP phones), fax/facsimile, SMS text messaging, social media posts or notifications, push notifications, device-based messaging such as VIBER, FACEBOOK MESSENGER or WHATSAPP, or any other method of communication.

According to an exemplary embodiment, the system may be configured to treat each campaign directed at a particular candidate as containing a single thread of communication with the candidate, regardless of whether the same communications medium or a different communications medium has been used in order to contact the candidate in the past. For example, according to an exemplary embodiment, a particular candidate may be initially contacted by telephone, may be sent a follow-up message via email, and may be engaged in subsequent dialogue via SMS text messaging; each of these communications may be combined into a single thread of communications for the candidate, with the system being able to draw on previous communications with the candidate from each of these different sources. In some exemplary embodiments, the system may be configured to send communication requests via first one channel and then another; for example, in an exemplary embodiment, communications requests may be sent first via a "lower-priority" channel such as email where it may not be expected that the candidate will read the communication for several hours, and then may be sent via a "higher-priority" channel such as SMS where the candidate is more likely to be alerted immediately to the communication. For example, according to an exemplary embodiment, the system may, when attempting to alert a candidate of something (such as that the candidate is being requested to indicate their interview availability for the next day) first send a message by email, and then, when the candidate has not responded in a specific period of time (such as a three-hour period) the system may then be configured to send an SMS text message to confirm whether the candidate is available for the interview. If the candidate still does not respond within a certain time period, the system may be configured to place a telephone call to the candidate.

According to an exemplary embodiment, the system, in the contact step 4 and during the execution of the communication campaign, may begin a communication campaign by notifying the candidates of the job opening that matches their résumé, and providing instructions for applying for the position. In another exemplary embodiment, the communication campaign may begin at a later step, if, for example, the candidate already has an application on file for the position or for a similar position, or if the candidate has already expressed an intent to apply.

In an exemplary embodiment, the system may use the rank or relevancy group affiliation of a candidate to determine information other than the order in which candidates should be contacted. For example, according to an exemplary embodiment, the nature of the communication may be dependent on the relevancy group that the candidate is in; for example, a candidate might be "strongly encouraged" to apply for a position to which their résumé is highly relevant (i.e. the candidate has a high relevance score) while the candidate might be provided with the position in a list of potentially interesting positions if their résumé is less relevant (i.e. the candidate has a lower relevance score). The frequency of communication with a particular candidate, the content of the communications, and the choice of communication channels used may also depend on the relevance score of the candidate. In an exemplary embodiment, the system may dynamically adapt the nature of communication, frequency, content, and choice of communication channels based on the progress of bi-directional communication with the candidate; for example, a candidate may be initially contacted by e-mail, and then may be sent an SMS text message or may be called (for example, by an automated calling system) in a later stage in order to set up an interview time (or if the candidate expresses a preference for being contacted by telephone, or if they do not respond to the e-mail within a particular amount of time).

In an exemplary embodiment, the system may continue to perform a communication campaign with a candidate until one of the following conditions is met. First, the communication campaign may stop if the candidate is hired for the position. Second, the communication campaign may stop if the candidate elects to stop receiving further information about the job opening. Third, the communication campaign may stop if the system has been unsuccessful in contacting the candidate; for example, if the candidate has provided an email address and a phone number, and does not respond to communications with either the email address or the phone number, the communication campaign may stop after a certain number of communications have been made. The communication campaign may also stop if a "bounce notice" or other indication of a failed communication is received; for example, if an email receives a hard bounce, or if a notification is provided that an SMS text message did not go through due to having a bad number (or due to the candidate providing a landline number instead of a cell number). Finally, the communication campaign may stop if the position is filled, cancelled, or closed, with the system optionally providing notice of this in a final communication to the candidate. The communication campaign may be affected based on the candidate's response, for example the candidate's open or click rate for messages sent by some form of electronic communication, including but not limited to email, SMS, text chats, social media, or some other method, or the call status of communications with the candidate, or other such responses, if desired.

In an exemplary embodiment, the system may be configured to make use of a semi-automated predictive dialer system for initiating phone calls to one or more candidates. According to an exemplary embodiment, the dialer system may initiate calls to a list of candidates, which may be performed sequentially in some order or may be performed according to other logic, as desired. The dialer system may then determine whether the call has been successfully completed and whether the party at the other end of the line is a live person. When the dialer system determines that the party on the other end of the line is a live person, the dialer system may bridge the call to a recruiter, who may then complete the conversation with the candidate. On the other hand, when the dialer system determines that it has not connected to a live person at the other end of the line (for example, if a voicemail service or answering machine is reached) the dialer system may be configured to leave a message, terminate the call, and move on to the next candidate on its list. In some embodiments, some amount of calls may be performed simultaneously rather than sequentially; for example, the dialer system may be paired with more than one recruiter, and may attempt simultaneous or overlapping calls until all recruiters are in a conversation with a candidate.

Figure 6:
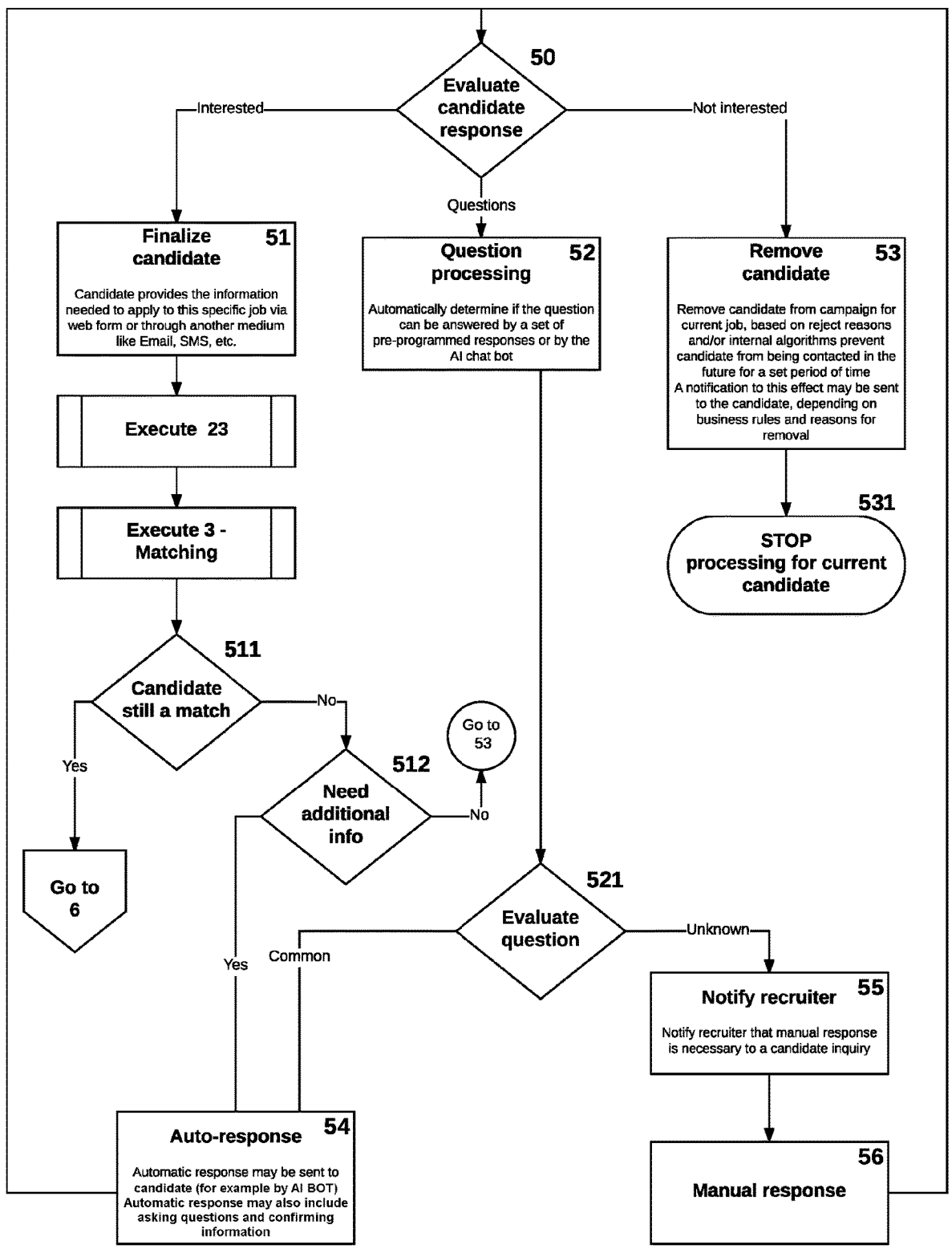
FIG. 6 is an exemplary embodiment of a flowchart depicting a method of performing a response step.

Turning now to exemplary FIG. 6, FIG. 6 displays an exemplary embodiment of a flowchart depicting a method of performing a response step 5. In an exemplary embodiment, a communication campaign system may be configured to be bi-directional, such that it can respond to questions and requests for information posed by one or more of the candidates under consideration.

When a candidate has been contacted by some communication channel, and when the candidate responds by some communication channel (which may or may not be the same communication channel as was used to initially contact the candidate, if desired; for example, the candidate may initially be contacted by email and may elect to respond to the contact by calling a telephone number provided in the email) the system may be configured to handle and respond to the candidate's response 50. For example, in an exemplary embodiment, the system may determine from the candidate's response (for example, by parsing an email of the candidate, or otherwise analyzing their response) whether the candidate has responded to the initial contact message provided by the system by accepting an offer provided in the contact message (such as, for example, an offer to apply for a position), by rejecting an offer provided in the contact message (for example, by sending a message declining an offer to apply for a position), or by asking a question or requesting more information.

In some exemplary embodiments, a candidate may also have multiple different responses, such as an acceptance of an offer to apply for a position and a question, or a series of questions. For example, the candidate may express that they are interested in applying for the position, and ask a question about how soon they are likely to be contacted about an interview if they make it past the application stage. In other exemplary embodiments, a candidate may make a single statement or may otherwise provide a single response that has multiple intents.

For example, in some exemplary embodiments, candidates may provide responses that are similar to the following: "Are they willing to pay for relocation? I live in Portage, Mich. Salary range? Is it a permanent role?" or "What is the salary? Is this a perm position? How much time travelling? Hours? How big is the company?" or "It sounds interesting. Do you offer a relocation program? What's the salary?" In such cases, the natural language processing engine or other parsing utility may parse each of these questions or statements separately, and the questions or statements may be analyzed as a whole or individually in order to determine what kind of response should be formulated (and whether, for example, statements provided by the candidate answer any of the questions that would otherwise be asked of the candidate in the response).

For example, in the first statement, the system may parse the information that the candidate has a question of whether the company is willing to pay for relocation, may parse the information that the candidate has provided a statement that they live in Portage, Mich., may parse the information that the candidate has a question as to what the salary range of the position is, and may parse the information that the candidate has a question as to whether the position is intended to be a permanent one. The first question parsed by the system, whether the company is willing to pay for relocation, may under other circumstances prompt a response question to be provided by the system, asking where the candidate lives (so that, for example, it can be determined from a company relocation policy or from analysis of a company relocation budget whether the company would be willing to pay for relocation). However, in this case, a later statement provided by the candidate answers the question that would be asked by the system and provides this detail, so the system may not ask this question to the candidate.

In some exemplary embodiments, the NLP layer or other parsing engine of the system may be provided with a service that breaks up multiple intents and questions and sends them to the NLP layer one at a time. For example, it may be desirable to send each question separately to the NLP layer, such that the NLP layer is first asked a) Are they willing to pay for relocation?, next asked b) I live in Portage, Mich. Salary range?, and finally asked c) Is it a permanent role? The system may interpret each of these requests individually, and may answer, "Yes there is a relocation package, HR will provide you all the details during the interview. The salary range is $80-$110 k, depends on experience. Yes, this is a permanent role." In some exemplary embodiments, the system may then consider each of these responses in the context of what information had been most recently provided by the candidate; for example, if the salary range for the Portage, Mich. area is on the lower end of the listed salary range, the system may revise its salary estimate to $80-90 k, depending on experience, before sending the response to the candidate.

If the response of the candidate is to indicate interest in a position or an offer, the system may be configured to take action to finalize the candidate 51. In an exemplary embodiment, should the system receive a communication from the candidate indicating that the candidate is interested in the position, the system may send a request for any other remaining required information to the candidate. According to an exemplary embodiment, if interested in the job, the candidate may click on a link provided by the system and may then provide the remaining required information or other information that may be necessary or useful to a hiring decision.

According to an exemplary embodiment, the candidate may be taken to a page containing all of the information that they have already provided, as well as all of the information that is necessary, optional, or requested; on the page, the information that the candidate has already provided or which is otherwise available may be pre-filled, while the other sections of the page may be left blank. In an exemplary embodiment, the candidate may thus be provided with an opportunity to update any or all of the information that they have previously provided, or may be provided with an opportunity to correct erroneous information that has been taken from elsewhere. For example, in an exemplary embodiment, the candidate may be provided with the opportunity to update their résumé, their contact details, their salary requirements, or any other information. Candidates may also be provided with the opportunity to expand upon information that they have provided or which has been retrieved from a candidate profile or elsewhere. For example, a candidate may be able to optionally provide information on the key skills for the position, such as the numbers of years of experience typically required for the position, the last year the candidate used those skills, and/or a description of how the skill was last used. (According to another exemplary embodiment, rather than being directed to a web site and solicited for the additional information via a web form, the candidate may instead be solicited for the additional information through another medium, such as email, SMS, or another such medium as may be desired.)

In some exemplary embodiments, additional screening questions may be added during this step. For example, according to an exemplary embodiment, a candidate may add a new skill or new work experience to a web form when they are directed to it, indicating that the candidate has developed a new skill or new work experience; the candidate may then be further screened based on this new skill or new position, and may, for example, be asked further questions about the new skill or work experience.

In an exemplary embodiment, once a step of finalizing the candidate 51 has been completed, the system may perform a step of loading the candidate's information 23. The step of loading the candidate's information may be similar to, or may use the same logic as, the step of loading and parsing the candidate's résumé information previously executed in method step 2. If the candidate has provided additional information, for example if the candidate has provided additional information other than as a direct response to a question of a web form, this additional information may be parsed. For example, if the candidate has provided additional information in the form of a response to an open-ended question or has provided an email or SMS response rather than a web form response (or has sent a communication via any other communications medium, such as via a telephone call) this information may be parsed and populated in the database. The structured data may then be populated into the data point matrix previously used for the candidate (or, in some circumstances, into a new data point matrix) in order to update the candidate's data point matrix. This may ensure that the candidate's information is completely up to date, and that, if it has been a significant period of time since the candidate's résumé was initially received and the candidate has accumulated new skills or work experience, that the candidate's new skills or work experience (or other changes to their résumé) are adequately reflected in the data-point matrix.

Once a step of loading information 23 has been performed, the system may perform a step of matching the candidate to one or more positions, which may be done using the matching method of step 3 or may be done using another matching method. The matching method may include a core substep of matching 32, in which the candidate is matched to a job based on the data point matrix and other criteria, and may include one or more other optional steps such as a post-proces sing step. For example, when the candidate has provided additional information, the candidate's additional information may be filtered based on one or more items of interest for a pre-processing step, such as the candidate's experience working for a competitor; if the candidate's responses indicate that they now have experience working for a competitor when they did not have such experience before, then the candidate may be filtered based on that new experience.

In an exemplary embodiment, a matching method 3 may be triggered by the addition of a new résumé by the candidate to a source location (such as a jobs board) or by updates to a résumé being provided by the candidate to the source location. In some exemplary embodiments, the system may automatically receive notifications of the candidate having updated their résumé; in other exemplary embodiments, the system may be configured to periodically search for candidates that are already part of the campaign, or which otherwise have already been searched, in order to determine if they have recently updated a résumé.

Likewise, in some exemplary embodiments, a matching method 3 may be triggered by the addition of a new job description or changes being made to an existing job description. For example, in the event that a job description is changed, a candidate that has not made any changes to their résumé and who is considered to be relevant to the original job description may still need to be evaluated in order to determine whether or not the candidate matches the new job description.

Following a matching step 3, it may be determined whether the candidate is still a match for the position 511 based on the new information that the candidate has provided. For example, in one exemplary embodiment, a matching step 3 may be configured to filter out candidates who have worked for a competitor, based on the expectation that those candidates may be subject to a non-compete agreement or other burdensome employment agreement. A candidate may provide new information indicating that they are now working for a competitor, indicating that they now may be subject to being filtered out when they would not have been filtered out based on their previous disclosure. (Alternatively, a candidate may indicate that they have moved away from the general vicinity of a position, or may indicate that they have recently accepted a higher-paying position, or may otherwise indicate their unsuitability as a match.)

If it is determined, based on the candidate's new disclosure, that the candidate is still suitable as a match 511, then the system may proceed to a submission step 6, which may be depicted in FIG. 1. For example, in a submission step 6, the candidate may be added to a curated list of candidates for submission to a hiring manager, or may be submitted to the recruiter for manual approval and addition to a curated list of candidates for submission to a hiring manager, as may be desired.

However, if it is determined, based on the candidate's new disclosure, that they are no longer suitable as a match 511, or if it is determined that there is some uncertainty as to whether the candidate is suitable as a match 511, the system may attempt to resolve the uncertainty, and may determine that it needs additional information and what information it needs 512. If it is determined that the candidate is unsuitable based on what they have disclosed, the system may proceed to a removal step 53. However, if it is unclear whether the candidate is suitable or not, then an auto-response 54 may be generated and may be sent to the candidate requesting more information.

If the response of the candidate is to express disinterest in or reject an opportunity, the system may be configured to take action to remove the candidate from consideration 53. According to an exemplary embodiment, the system may take action to remove the candidate from a campaign for a current job, and may take action to ensure that the candidate is not communicated with again about the current job, or is not communicated with again about the current job for at least a period of time (which may, for example, be preselected or may be selected by the candidate). According to another exemplary embodiment, the candidate may be excluded from other communication (such as communication about other related jobs), or even all communication, for a set, unlimited, or indeterminate period of time (for example, until the candidate re-initiates contact or logs back into a service) not just from communication related to a particular job. However, in some exemplary embodiments, a notification communication may be sent to the candidate indicating that they will be excluded from other communications in the future, if this is desired. The system may then stop the processing for the current candidate 531.

In an exemplary embodiment, the system may be configured to consider the candidate's reasons for rejecting the offer, should any be provided. The system may also be configured to attempt to automatically determine a candidate's reasons for rejecting an offer if no reason is provided. In some embodiments, the candidate's reasons for rejecting the offer may be provided to the recruiter or the hiring manager (which may allow for improvement of the recruitment process, the job description, or any other areas that may be improved). In an exemplary embodiment, the candidate may not be contacted for a period of time that is based on the rejection reasons, or may be derived from the rejection or rejection reasons by an internal algorithm. For example, if the candidate rejects the opportunity based on "too many communications" or "too many irrelevant communications," the period of time in which the candidate may not be contacted may be lower and may be imposed merely so that the candidate is not harassed by a high volume of communications, whereas if the candidate rejects the opportunity based on no longer being interested in employment in a certain field, the candidate may not be contacted about opportunities in that field for an indefinite period of time. The candidate may also be excluded from being contacted about specific types of offers; for example, according to an exemplary embodiment, the candidate may be marked for exclusion from particular industry segments (whether for a period of time or permanently), may be marked for exclusion from specific job titles or job descriptions, or may be marked for exclusion from any other type of offer based on any other criteria.

Finally, if the response of the candidate is to ask a question about the offer, or to request more information about the offer or anything related to the offer, the system may be configured to execute a question processing step 52. In the question processing step 52, the system may determine whether a question can be answered by a set of pre-programmed responses, and if so provide one of the pre-programmed responses. In an exemplary embodiment, pre-programmed responses may be dynamic rather than static; for example, according to an exemplary embodiment of a question processing step 52, a pre-programmed response may be initially selected having incomplete or placeholder data, and may be customized based on reading information that has been provided as part of a job description or as part of a candidate profile.

If the question cannot be answered by a set of pre-programmed responses, in an exemplary embodiment, the system may determine whether the question can be answered by an AI chat bot. In an exemplary embodiment, an AI bot may be used in addition to the canned question and response sequences of the pre-programmed responses in order to mimic the experience of a human dialogue with the candidate. This may be used for a variety of ends; for example, according to an exemplary embodiment, a conversational AI bot may be used in order to correct the candidate's misconceptions and provide arguments intended to change the candidate's mind if it appears the candidate is considering rejecting an offer for a particular position, or even if the candidate has already rejected an offer for a particular position but appears to have done so (or even potentially may have done so) based on a misconception or misunderstanding. In an exemplary embodiment, a conversational AI bot may be provided that includes some degree of learning behavior, such that the AI bot can be self-teaching over the course of a communications campaign with a particular candidate or over the course of many communications campaigns with many different candidates.

If neither the pre-programmed responses nor the AI chat bot is able to resolve a question of the candidate, then, according to an exemplary embodiment, the system may take other action. For example, according to an exemplary embodiment, the system may be configured to evaluate the question 521, provide an automatic response to the candidate 54 if one can be provided, and notify the recruiter if an automatic response cannot be provided and a manual response is necessary for a candidate inquiry 55. The recruiter may then provide a manual response 56. In some exemplary embodiments, the AI BOT may also be configured to solicit a manual response 56 from a recruiter or transfer communications to the recruiter (for example transferring a call to the recruiter) whenever an intent is not recognized or whenever some specific intent is recognized. For example, if the candidate is recognized as being frustrated with the AI BOT program, and loudly asks "Am I talking to a ROBOT??!!," the AI BOT may automatically transfer the call to a recruiter, and may, for example, indicate this to the candidate (such as by stating "I'm sorry, let me transfer you to my supervisor"). The conversation can then be passed back to the AI BOT whenever desired.

In an exemplary embodiment, the system may include a common question and answer database. According to the exemplary embodiment, when a candidate asks a question that exists in the common question and answer database, or requests information that can be found in the form of an answer in the common question and answer database, the system may be configured to answer the question automatically. According to an exemplary embodiment, the system may be configured to automatically maintain and update this common question and answer database; for example, according to an exemplary embodiment, the system may include a self-teaching algorithm (such as a machine learning algorithm or AI) in order to improve the quality of the automated responses and expand the list of common questions and answers stored in the common question and answer database.

According to another exemplary embodiment, the system may combine a knowledge base and a decision-making process in a structure other than a common question-and-answer database. (In some exemplary embodiments, the two may be combined or connected; for example, an application programming interface (API) may be used to read and update data from the question-and-answer database or from any other database such as may be desired.) For example, according to an exemplary embodiment, a map of a conversation process may be constructed such that a conversation process may be structured around the AI BOT selecting a proper path in the conversation process map, and if necessary deviating from the conversation process map when certain criteria are met (for example, if no path has been constructed for a given topic and no information is available, if two or more paths are equally likely and the AI BOT cannot decide between two or more paths, if all paths are below a certain likelihood threshold and no path can be selectable, or if the AI BOT's conversation flow is otherwise obstructed).

In certain embodiments, such a system, or an analogous system, may be constructed by analyzing a large number of conversations between recruiters and candidates in order to map out a sizeable percentage of anticipated conversation paths. For example, according to an exemplary embodiment, a threshold score or percentage of the number of paths identified in the conversations (such as, for example, 80%, 90%, 95%, and so forth) may be mapped out, and may be used as the basis for the creation of intents and entities within the natural language processing of the AI BOT.

According to an exemplary embodiment, a NLP engine may be used in addition to the AI BOT in order to perform this task, such that the AI BOT communicates with a separate NLP engine (for example, via an API). According to another exemplary embodiment, a NLP engine may be directly combined with an AI BOT in order to perform this task. Other variations of an AI BOT-NLP engine structure may also be contemplated and implemented as desired. For example, according to an exemplary embodiment, the IBM WATSON CONVERSATION natural language processing system may be used in order to provide one or both functionalities. According to another exemplary embodiment, another NLP as a service program may be used in order to provide this functionality; for example, the MICROSOFT LUIS.AI natural language processing system, the FACEBOOK WIT.AI natural language processing system, the GOOGLE API.AI natural language processing system, or another such service may be used such as may be desired. In some exemplary embodiments, such a natural language processing system may include, for example, a NLP service (which may have been pre-trained on existing data sets or which may be further trained on received data sets, such as may be desired), a NLP application software development kit (SDK) providing tools by which applications may be created for the NLP system, a platform on which the code may be hosted, and a platform by which the NLP service may be connected with one or more channels. (According to an exemplary embodiment, initial training of an NLP service may be done in a supervised manner, such that for a first period of time, responses may be subject to approval by a human recruiter. For example, if the human recruiter feels that the responses of the NLP service are not correct, because the NLP did not interpret a particular intent properly, the recruiter may be provided with an interface through which they can change the intent. Once they have done so, the new intent will be sent to the NLP for an updated response, which at the same time may function to train the NLP in real time. If the candidate response does not fall into a defined intent, the human recruiter may have the ability to write a custom response from scratch, which may in some circumstances also be sent to the NLP, or may be sent to an administrator of the NLP in order to determine whether it makes sense to add a new intent that had not been previously thought of. This first period of time may be, for example, a certain number of weeks or months, such as three months, may be until a certain overall accuracy rate is achieved, such as 90%, 95%, or 99%, or may be based on some other criteria, and may, for example, be dependent on the overall volume of the system (for example, a system handling millions of responses may be expected to be trained up much more quickly than a system handling hundreds of responses). Such a configuration may also be enabled and disabled as necessary, for example if the overall accuracy of a trained NLP system starts to drop off due to some change in circumstances.)

To provide some explanation of the creation of intents and entities within the natural language processing of the AI BOT, according to some exemplary embodiments of a NLP engine, a NLP engine may act to determine intents, which may be the intentions of the end user, and entities, which may correspond to metadata about the intents or about certain intents in a set of multiple different potential types of intents. For example, according to an exemplary embodiment, a NLP chatbot may be configured to receive "casual intents," intents related to conversational small talk, "business intents," intents related to the conversational purpose of the chatbot, and "other intents," which cannot be classified as either casual intents or business intents. "Casual intents" may be, for example, openers or closers of a conversation like "Hello" and "Goodbye," and may for example be provided in any form or in any language. In some exemplary embodiments, an AI BOT may derive certain information from the casual intents provided by a user, such as the user's preferred communication language, and may adapt accordingly; for example, if the AI BOT performs an initial greeting in English, and the user provides a response in broken English or a foreign language, the AI BOT may switch to a different communications language if one is available or may prompt the user to select a different communications language. "Business intents" may be, for example, intents which directly map to the business of the AI BOT or which are known or likely to map to the business of the bot, which in this case may be the business of recruitment, and which may generally be discussed in more detail in other sections. "Other intents" which are not related to conversational topics and which are not directly related to recruitment (or which were not anticipated to be a business intent or which have not been encountered before as a business intent) may under some circumstances be received as well, and may under some circumstances trigger the manual intervention of a recruiter. Because "other intents" may be some mixture of unanticipated or unusual questions (for example, "I am an amateur theater performer; are there any theaters of note near the job site? This would affect my relocation decision"), candidates potentially trying to fool the bot in order to determine if they are conversing with a human recruiter or bot (for example, "Could you type 'I'm not a bot' to prove you're not a bot?"), or nonsense questions intended to fool a potential bot and prompt the intervention of a human recruiter (for example, "Qwertyuiop?" or "Do colorless green ideas sleep furiously?"), recruiters may be notified on some or all instances of an "other intent" being detected, optionally with some filtering criteria being applied. (For example, according to an exemplary embodiment, a recruiter may be notified on every instance of an "other intent" being detected, or may be notified if the "other intent" meets certain criteria, such as being formed from recognized words in the recruiter's language.)

For example, according to an exemplary embodiment, a path-based system for an AI BOT that is constructed around a map of a conversation process (such as is described above) may operate as follows. A candidate may first ask the AI BOT, "Hey, this opportunity sounds great; who is the client?" This may equate to an intent configured as #RequestInfoClient (which may be a business intent), for which the entity may be the #Client. This may trigger the AI BOT to retrieve information about the client, and provide it in the form of an answer to the candidate. In some exemplary embodiments, the NLP system may resolve the candidate's question as being an intent to #RequestInfoClient about #Client and may treat the request as being equivalent to alternative requests for the same information or similar information by the candidate; for example, according to an exemplary embodiment, the candidate may ask "Is this opening for Home Depot?" or may ask "What's the name of the client?" or may ask "Client?" In an exemplary embodiment, each may be identified as an expression of the same intent about the same entity, and may likewise trigger #RequestInfoClient, about the #Client. (Certain questions may be resolved to other intents or may be resolved to multiple intents; for example, according to an exemplary embodiment in which the candidate asks "Is this opening for Home Depot?" the AI BOT may resolve this to be an intent to #RequestInfoClient about the current #Client as well as an intent to request information about jobs available for Home Depot, if any are available.)

According to an exemplary embodiment, the candidate may then diverge from the path set forth above, such as by providing information that contradicts the information available to the AI BOT or which signals an "other intent." For example, according to an exemplary embodiment, the candidate may indicate that they are at an address B, whereas their provided information may have indicated that they are at an address A. The AI BOT may, in some exemplary embodiments, have been previously configured to make use of a conversation flow that is to some extent based on the candidate's residence at address A, and may reconfigure conversation flows on the fly and provide any necessary supplemental material once the candidate indicates that they are at address B, instead. For example, according to an exemplary embodiment, the AI BOT may call an API (such an internal API or an external API) in order to conduct external searches for further information, or in order to perform some activity that it may need to do on the fly, such as calling a GOOGLE MAPS API in order to get a commute distance from the candidate's Address B instead of Address A (and potentially recompute the candidate's eligibility for certain jobs based on distance requirements of the job or the job searching algorithm, or the distance preferences of the candidate, such as may be desired).

According to an exemplary embodiment, a self-teaching algorithm, such as an AI program, may go beyond improving the quality of automated responses, and may, if desired, proactively ask questions to one or more candidates. (For the purposes of this document, a self-teaching algorithm, such as an AI program, may be referred to as an "AI bot" or "AI BOT;" however, it may be contemplated that any other self-teaching algorithms not characterized as an "AI bot" may be used instead of, or in addition to, the AI bot, alone or in some kind of combination.) For example, according to an exemplary embodiment, the system may be configured to ask about the candidate's experience, desire for a job change, interest in the position, or the like, such as may be desired. In an exemplary embodiment, this behavior may be performed as part of an automatic response step 54; for example, according to an exemplary embodiment, an AI bot or other self-teaching algorithm may be used to not only send automatic responses to candidates, but may also be used to proactively ask questions to candidates and confirm any candidate information that needs to be confirmed, such as may be desired. In an exemplary embodiment, the AI bot may determine questions to ask to the candidate based on reading and interpreting the candidate profile, and may be configured to automatically submit these questions to the candidate. In some exemplary embodiments, this task may be performed completely automatically such that a reviewer is not needed for any step of the process; in other exemplary embodiments, it may instead be desired to submit one or more of the questions to a reviewer, such as a recruiter or hiring manager, for review before they are submitted. This may ensure that the role of the recruiter can be minimized after a candidate is sourced, as the recruiter will not need to devote any effort (or will at the very least need to devote substantially less effort) to asking questions, confirming information, and updating the database.

In an exemplary embodiment, an AI bot may be configured to look up any data that may be on file for a particular candidate or which otherwise may be available for a particular candidate. For example, according to an exemplary embodiment, an AI bot may be configured to look up a social media profile of a candidate in order to confirm details provided by the candidate, or in order to better craft specific questions about the candidate's experience.

For example, according to an exemplary embodiment, an AI bot may read the work history of the candidate, and may determine that the candidate, Venkat, has worked with Jenkins-based automation servers at a previous place of work, Cerner Corporation. The AI bot may then generate a question such as, "Venkat—I see that you have worked with Jenkins deployment automation at Cerner. How many years did you work with Jenkins? And can you tell me a bit more about your experience with it?"

In some exemplary embodiments, the AI bot may be configured to make inferences based on available information, or to seek out information that may be useful to develop other questions. For example, in an exemplary embodiment, the work history of the candidate may show previous work at Cerner, and the candidate may state that they have experience with Jenkins. The AI bot may then generate a question such as "Venkat—I see that you have experience with Jenkins deployment information. Was that at Cerner?" and may then ask the above question when it is confirmed that the candidate did gain this experience at Cerner.

In an exemplary embodiment, the AI bot may be configured to ask a question multiple times if it does not receive a response. The AI bot may alternatively be configured to inquire about another skill or otherwise move onto the next question if it does not receive a response; in some exemplary embodiments, it may be configured to move on immediately, may be configured to ask the question a set number of times before moving on, or otherwise may be configured as desired.

When the AI bot receives a response, it may be configured to automatically update a candidate profile record. The AI bot may further be configured to reevaluate the candidate, for example periodically or after each response; in an exemplary embodiment, based on the candidate's responses to questions, the AI bot may be configured to reject the candidate and opt the candidate out of the campaign, and may further be configured to inform the candidate of this. For example, in an exemplary embodiment, an AI bot may be configured to inform the candidate that the experience they have does not align with the job, that the recruiter's files have been updated based on the candidate's responses, and that the recruiter will reach out when they identify another job that matches the skills or experience of the candidate or aligns with the answers that the candidate has provided to the questions.

According to an exemplary embodiment, the AI bot may, in addition to or instead of updating a candidate profile record in response to updated information from a candidate, provide feedback to the candidate about the updated information that has been provided. For example, according to an exemplary embodiment, a conversational AI BOT may be configured to periodically review the original résumé of a candidate, the original job description, and updated information that has been provided by the candidate in response to questions, and may make one or more suggestions to the candidate (such as, for example, during the course of regular conversation or as separate feedback) as to what the candidate should update on their résumé in order to increase the candidate's chances of scoring an interview for a comparable position or a similar position should they need to do so in the future. (In some exemplary embodiments, this may be done, for example, if some predefined criteria are met, such as if there is a large gap between a matching score corresponding to the candidate's original résumé and a matching score corresponding to the candidate's updated candidate profile record. In other exemplary embodiments, it may be offered to certain candidates, such as candidates below a certain score threshold, or candidates that did not finish in a top range of finalists for a position such as the top three or top five candidates for a position. Other implementations may also be contemplated, as desired.)

For example, according to an exemplary embodiment, the system may compare the job titles that the candidate originally used in their résumé to the requirements of the job description, or to job responsibilities gleaned from further conversation with the candidate, and may offer advice to the candidate as to how to make the job titles better match the job requirements of the job description or otherwise enhance the candidate's chances of scoring an interview. For example, in one exemplary embodiment, if a hiring manager is looking for a .NET developer, the system may prioritize candidates that show that they have the relevant experience in the .NET technology stack, and this may be indicated to the candidate. For example, if the candidate has their current title listed as "software developer," the AI BOT may suggest updating the candidate's title (for their applications for the current position or in general) to "Software Developer/.NET Developer" or simply to ".NET Developer."

In addition, the AI BOT may make suggestions as to additional information that it may be valuable for the candidate to add to other sections of their résumé, such as the skills or experience sections; for example, the AI BOT may base such recommendations on the job description, the conversation that has been conducted with the candidate, previous interviews that have been conducted with other candidates or the résumés of previous candidates that have been considered or interviewed, company information, information about the hiring manager, industry news information, or any other information that may be accessible to the AI BOT. For example, according to an exemplary embodiment, if past candidates that were selected for an interview had certain skills or experience listed in their résumés, the AI BOT may ask the candidate in the course of conversation whether the candidate has those skills, and, if so, may not only update the candidate's profile record but may inform the candidate that it would be a good idea to update their résumé to reflect those skills, or may request an updated résumé from the candidate reflecting those skills before continuing or before finalizing the candidate. According to another exemplary embodiment, the AI BOT may directly make the changes to the candidate's résumé, and may provide the résumé for the candidate's review and approval before continuing or before finalizing the candidate. It may be contemplated that, in certain scenarios, the candidate may approve the changes, may ask the AI BOT to make modifications (either by directly providing alternative language for the AI BOT to substitute or otherwise by indicating a preference for alternative language), or may directly make changes to the résumé document that may then be sent to the AI BOT, or some combination thereof, such as may be desired.

According to an exemplary embodiment, the AI BOT may be configured to make or suggest certain changes apart from those intended to better structure the candidate's résumé for a particular job description. For example, according to some exemplary embodiments, the AI BOT may be configured to review a candidate's résumé for formatting issues and may in some circumstances be configured to reformat the résumé into a different format (or may make suggestions to improve the readability or machine-readability of the résumé) or may be configured to suggest extraneous content that is not favored by most employers be removed from the résumé (such as, for example, irrelevant, excessively basic, or otherwise troublesome skills or experience, or extraneous sections such as personal headshot photographs of the candidate included on the résumé itself).

In some exemplary embodiments, the system may be configured to continue a conversation indefinitely or ensure that the conversation persists indefinitely, in order to ensure that all questions asked by the candidate can be processed 52 and can be processed accurately and in the context of other questions asked by the candidate. In some other exemplary embodiments, a set period of time for which the system may persist a conversation may be defined, after which the conversation may be terminated or may be terminated if not refreshed within a set period. In some exemplary embodiments, the behavior of the system when electing whether or not to maintain a conversation and for how long may be defined by or may affect the follow-up rule 411 of step 4 or a similar rule.

For example, according to one exemplary embodiment, conversation dialogue with a candidate may be persisted to unlimited levels, and the system may make use of a framework that allows the context of the conversation to be kept indefinitely; this may be done by, for example, grouping any and all communications with a particular candidate as one conversation having a particular ConversationID, with each separate avenue of communication with the candidate that has been used so far defining a separate thread. The system may further be configured to store intent information and entity information for each of the conversations, and in some exemplary embodiments for each separate thread.

For example, according to an exemplary embodiment, the system may engage in an exchange similar to the following, which may be done by email or through any other method of communication, or set of methods of communication such as email and SMS. In a first communication, a candidate may send an email to an AI BOT stating that "I am interested in this opportunity, but I am concerned about the commute. Is there a chance to work remote or even partially remote? (Message Sent Friday 5:02 PM)." In a second communication, the AI BOT may respond to the candidate that "There is an option for working remote for a few days a week after an initial training period of a month or two. (Message sent Friday 5:05 PM)." In a third communication, the candidate may send another email to the AI BOT inquiring "What's the salary range for the position? (Monday 10:04 AM)."

According to an exemplary embodiment, after this third communication is sent, the system may take into account the previous communications that have been received from and sent to the candidate in question in order to formulate a reply. This means that, for example, the AI BOT will retain the knowledge that the candidate wants to work remote at least partially, despite the fact that it took a reasonably long time for the candidate to ask another question to the AI BOT via email. This is in contrast to current chatbot frameworks that may be in use in the market, which may typically cause a conversation session to expire after a period of time, often around an hour but sometimes as little as five minutes.

According to an exemplary embodiment wherein the AI BOT is configured to persist the conversation for an indefinite period of time until completed, the AI BOT may include further logic to determine when a given conversation is over. This may ensure that every conversation ever initiated is not needlessly persisted indefinitely. For example, an AI BOT may be configured to terminate a conversation after a number of definitive "no" responses or a request from the candidate not to be contacted again.

In an exemplary embodiment, an AI bot may be configured to ask about inconsistencies or apparent inconsistencies in information that has been provided by the candidate, or about inconsistencies or apparent inconsistencies between information that has been provided by the candidate and the job description. For example, according to an exemplary embodiment, a particular candidate may apply for a job having a requirement of a bachelor's degree in Computer Science, or an equivalent thereof. The candidate may supply a résumé without any completed higher education. This may prompt a conversation similar to the following:

AI BOT: "This job requires a Bachelors in Computer Science. I did not see any education in your résumé. I also looked at your LinkedIN Profile and did not see education listed. Do you have a bachelors' degree?" CANDIDATE: "I am in the process of getting a degree from Devry. Will that be acceptable?" AI BOT: "That's a great question. I will check with the hiring manager and get back to you. In the mean time I'd like to ask you a few questions about your experience."

In an exemplary embodiment, an AI BOT may be configured to ask questions about subject matter other than skills, experience, and related matters. For example, according to an exemplary embodiment, the candidate's willingness to relocate for a position may be a key factor in hiring for the position. The AI BOT may thus be configured to inquire about a candidate's willingness to move, in order to try to develop the candidate's reasons for moving in more detail. For example, according to an exemplary embodiment, an AI BOT may proactively ask a candidate "Can you tell me a bit more about why you are looking to make a move now?" The AI BOT may then develop one or more responses based on the candidate's response.

In an exemplary embodiment, AI BOT may make use of a dialogue approach in order to ensure that the candidate has properly understood aspects of the position or has properly communicated their own information. For example, in an exemplary embodiment, a candidate may supply a résumé to a position showing that they live approximately 60 miles from a job location. Under such circumstances, according to an exemplary embodiment, an AI BOT may proactively ask the candidate about the candidate's current address. Then, if the candidate confirms that their current address is the current address they provided on their résumé and they live 60 miles from the job location, an AI BOT may be configured to confirm that the candidate understands that the job location is reasonably far away, and may in some circumstances inquire about whether the candidate has any intention of relocating or any willingness to relocate for the position. This may prompt a conversation similar to the following:

AI BOT: "Are you still residing at 101 Main Street, Pittsburgh?" CANDIDATE: "Yes." AI BOT: "Got it. It looks like your commute would be 60 miles and Google Maps says it's about 90 minutes during rush hours. Does that work for you?" CANDIDATE: "I plan to relocate if hired." AI BOT: "Got it."

In an exemplary embodiment, an AI BOT may also be utilized in order to investigate or explore any specific job requirements that the candidate has articulated. For example, according to an exemplary embodiment, a candidate may be asked to provide a desired proximity or a desired salary range for a position at the same time as the candidate is asked to submit their résumé. In the event that a close match between the candidate and a particular position is found, or in the event that the closest matches between the candidate and a position are positions that fall closely outside of the candidate's requirements, the candidate may be asked about the close match or the closest available matches.

For example, according to an exemplary embodiment, a candidate may be asked about a desired salary range and may provide a desired salary of at least $80,000 per year, or a desired salary range of at least $80-85,000. However, a close match may be found between the candidate and a position that pays slightly less than this minimum salary range but has other benefits; for example, the position may have a good health plan or may allow the candidate to save on travel costs by working from home. This may prompt a conversation similar to the following:

AI BOT: "My file says you are looking to make $80-85 k per year. Are you open to a position that's 100% work from home that pays $70-$75 k?" CANDIDATE: "No, I really need to be at $80-$85 k." AI BOT: "I will check with the hiring manager to see if we can submit you above the range. In the meantime, I'd like to ask you a few questions about your experience."

Once the candidate has had a question or request for information answered, or has submitted requested information to the AI BOT, it may be understood that the candidate may have additional questions or requests for information, and may be understood that the candidate may have to provide an acceptance or rejection. The system may thus restart a response step 5, and may evaluate the next candidate response.

In some exemplary embodiments, the response step 5 may be configured or may be configurable to run multiple times on the same candidate communication. For example, it may be envisioned that a candidate may provide an email response in which they express interest in an opportunity, but ask a number of questions about the company in preparation for an interview. The system may be configured to both finalize the candidate 51 and execute one or more question processing steps 52.

In some exemplary embodiments, the response step 5 may be configured to prioritize one type of responsive action over another in some cases. For example, in some exemplary embodiments, the candidate may reject an opportunity and may provide an explanation for why they did so that is based on a misconception or based on incorrect information. The system may execute a question processing step 52 and may give the candidate the opportunity to reconsider their rejection before removing the candidate 53.

Finally, when any type of candidate response is received, and before, after, or during any action—including the step of finalizing a candidate 51, the step of question processing 52, or the step of removing a candidate 53—the system may be configured to automatically evaluate any information provided by the candidate in their response. The system may then be configured to determine whether the information provided by the candidate should be added to one or more records of the candidate, and may then be configured to update the candidate record or records within the system as appropriate.

Further, during a response step 5, a candidate may be provided with the opportunity to update one or more details not directly related to finalization, such as, for example, their contact information or preferred contact information, or any other relevant information, as may be desired.

In an exemplary embodiment, at any stage of the process, a candidate may be requested, by the system, to provide information in a form that may be more easily parsed by the system. For example, according to an exemplary embodiment, a candidate may be provided with a web form that allows them the option to expand upon or clarify their experience in one or more skills that might be required for a position. This list of skills may be provided at the same time that the job description is input into the system, which may be done manually (e.g. through the provision of a skills list, separate from the job description, by the hiring company) or may be done through parsing of the job description by the system. In an exemplary embodiment, the candidate may be specifically requested to identify the number of years of experience that they have associated with each of the skills in the skills list, the most recent year the skill was used, the positions that the skill was used at, a description of how the skill was used, and/or any other information that may be applicable; alternatively, such identifications may be optional.

Additionally, in some exemplary embodiments, the candidate may be requested to provide (or may optionally be requested to provide) answers to additional qualifying or screening questions, as previously discussed. Such questions may be, for example, clarification questions about the candidate's experience, or may be any other appropriate questions, as may be desired. In some embodiments, these questions may be provided as a part of the process of vetting the candidate for the position, and the candidate may be disqualified from applying for the position based on the answers that the candidate provides, or based on a lack of response or lack of appropriate response from the candidate.

In a next step, which may be a submission step 6 (as shown in FIG. 1), the results of a recruitment campaign may be assembled. According to an exemplary embodiment, once one or more completed and vetted applications have been generated by the system, the completed and vetted applications may be submitted to the recruiter and/or to the hiring manager. In an exemplary embodiment, in a submission step, the completed and vetted applications may be communicated to the recruiter by any of the communication channels previously described, the recruiter may have the option to review the completed and vetted applications and make any necessary changes or take any other necessary steps (such as, for example, requesting more information from the candidate), and the recruiter may then submit the completed and vetted applications to the hiring manager. In some other exemplary embodiments, the AI BOT program may automatically submit the completed applications to the hiring manager, along with any revisions that may be necessary; for example, according to an exemplary embodiment, an AI BOT may be configured to submit one or more candidates to the hiring manager, and may also be configured to reformat the candidate's résumé so that the aesthetic structure of the résumé or the language used in the résumé (or any other attributes) are more appealing to the hiring manager or more consistent with guidelines or rules set forth by the hiring manager. The AI BOT may be configured to perform these automated activities or any other automated activities, such as may be desired.

Figure 7:
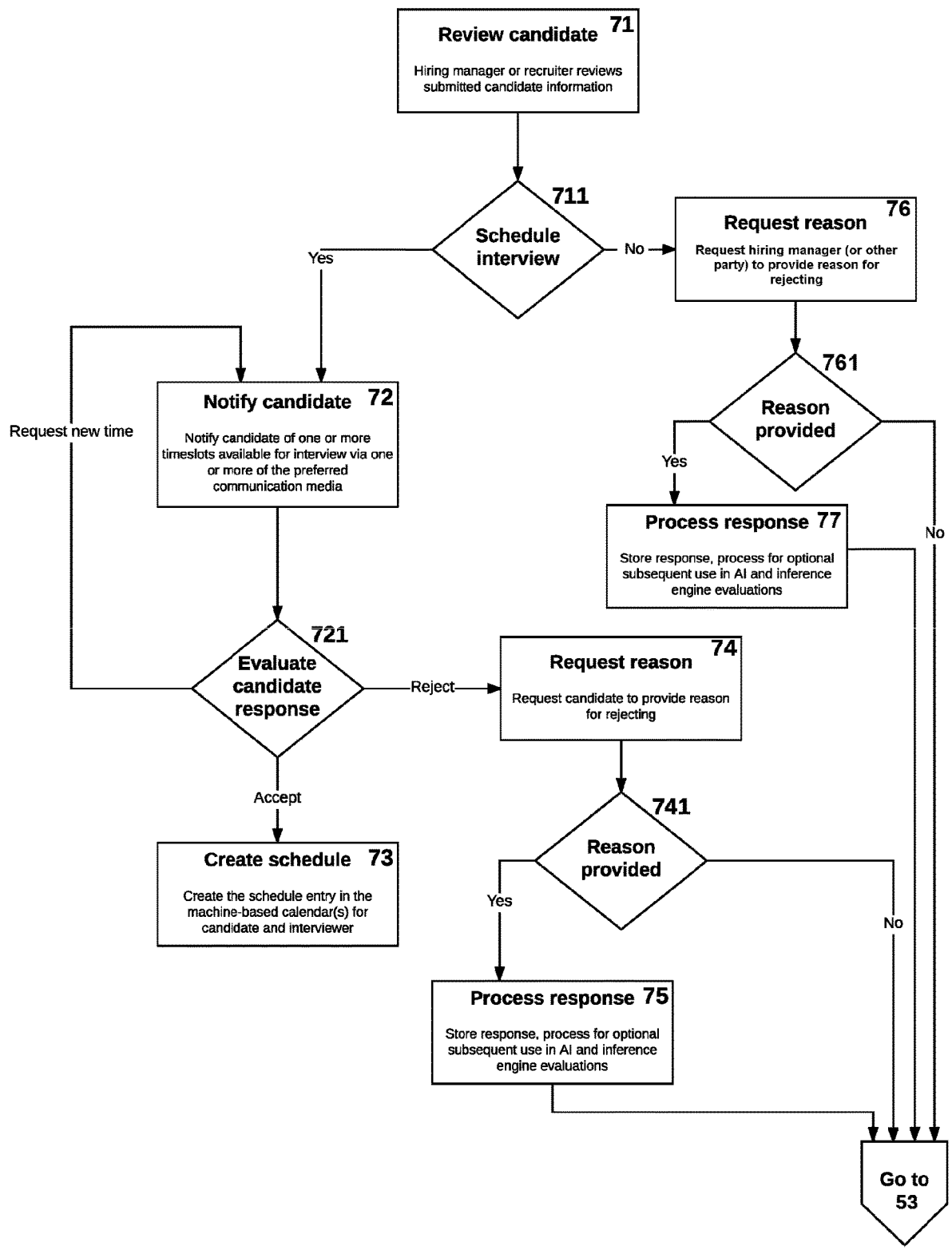
FIG. 7 is an exemplary embodiment of a flowchart depicting a method of performing a review step.

The hiring manager, or any other appropriate party, may then undertake a review step 7. In a review step, a hiring manager may review the completed and vetted applications and make any necessary changes or take any other necessary steps (such as, for example, requesting more information from the candidate) and may then undertake to schedule an interview with the candidate. In an exemplary embodiment, the hiring manager may confirm or deny that the candidate will receive an interview via any of the channels listed above, such as any of the communication channels that may be used by the candidate to apply for the position. In an exemplary embodiment, the hiring manager may specifically make use of the communication channel that the candidate used initially to apply for the position, and may, for example, place a telephone call if the candidate placed a telephone call initially. This may be shown in more detail in exemplary FIG. 7.

According to an exemplary embodiment, in a first part of a review step 7, once a list of candidates has been submitted to a hiring manager, the hiring manager, or another similarly-situated party such as a recruiter, may review the submitted candidate information 71. In an exemplary embodiment, the steps of the method may be performed by the hiring manager or recruiter and therefore there may be no need for an intermediate review process or a submission process 6. However, in other exemplary embodiments, these may be broken up among different parties, as may be desired.

In a next part of a review step 7, it may be determined whether one or more interviews should be scheduled with the candidate 711. If, based on the review of the hiring manager, recruiter, or other similarly-situated party, the candidate warrants an interview, one or more interviews may be arranged with the candidate in order to further evaluate the candidate. According to an exemplary embodiment, if the candidate does not warrant an interview, the candidate may be removed in a removal step 53. However, if the candidate is determined to warrant an interview, one or more schedulable times for an interview may be selected 711.

According to an exemplary embodiment, optionally, if a hiring manager, recruiter, or other similarly-situated party performing manual review determines that the candidate does not warrant an interview and is to be removed in a removal step 53, the system may request a reason 76 as to why the candidate does not warrant an interview or as to what other reasoning the hiring manager or other party used in order to determine that the candidate should be rejected. If the hiring manager or other party provides a reason 761 after one is requested 76, the reason that they used may be stored and processed 77 in order to improve the functionality of the automated system. For example, this response 77 may be used in subsequent evaluations performed by the AI bot or the inference engine. This response 77 may also trigger a new matching and/or sourcing step, if such is desired.

In some exemplary embodiments, the hiring manager may further clarify the job description before the new matching and sourcing step is triggered, or the new matching and sourcing step may otherwise be based on new information that has been provided by the hiring manager. For example, according to an exemplary embodiment, a hiring manager may reject a submitted candidate and provide the reason of "this candidate does not have enough inside sales experience," or "I am looking for someone with AWS cloud migration experience," or "candidates need to have 5 years of controls engineering using Rockwell," when this information was not mentioned in the job description. This feedback information may be incorporated as new skill requirements when the matching and sourcing step is run again.

Once the response has been processed 77, or if no response is provided by the hiring manager or other party in response to the request 761 (for example, after a set amount of time has passed after an initial request to provide a reason 76 is provided to the hiring manager) the candidate may be removed in a removal step 53. Alternatively, in an exemplary embodiment, the candidate may be removed immediately 53 and the hiring manager or other such party may have a certain time window in which they can provide explanation for this removal.

The candidate may then be notified of one or more timeslots at which an interview may take place 72, via one or more of the preferred communication media that has been used to contact the candidate or via one or more other forms of media. In an exemplary embodiment, a candidate may have more than one option for how the interview can be conducted, and may have different timeslots open for each; for example, the candidate may have the option to interview at different offices which each have different schedules and different interview times, or the candidate may have the option to interview in person in a first set of timeslots or by phone or video chat in a second set of timeslots. In an exemplary embodiment, these timeslots may be exclusive to the candidate, or may be shared among other candidates; according to an exemplary embodiment wherein these timeslots are shared among other candidates (and are, for example, first-come-first-served), the candidate may be notified if some or all of the listed timeslots have been filled by other candidates.

A response may then be solicited from the candidate, and the candidate's response 721 may be evaluated. A candidate's response may be, for example, an acceptance of the offer to interview at a particular time, a rejection of the offer to interview at a particular time (which may include, for example, an extended period of nonresponse, which may be treated as a rejection), or a request for a new time from the candidate.

According to an exemplary embodiment, when a candidate has accepted an offer to perform an interview at a particular time, a schedule may be created 73. In an exemplary embodiment, a schedule entry may be created in a machine-based calendar or multiple machine-based calendars (such as a MICROSOFT OUTLOOK calendar) for either or both of the candidate and the interviewer. For example, according to an exemplary embodiment, a candidate may be emailed a calendar entry that may be integrated, from their email inbox, into a calendar.

According to an exemplary embodiment, a candidate may request a new time for an interview. According to an exemplary embodiment, this may result in a repeat of one or more of the previous steps. For example, one or more timeslots previously reserved to another candidate may be freed in a schedule of a hiring manager or recruiter, or one or more timeslots previously reserved to events other than conducting interviews may be freed. The candidate may then be notified about the new timeslots 72 and a response from the candidate may be solicited.

According to an exemplary embodiment, a candidate may reject an offer to interview at a particular time. According to an exemplary embodiment, the candidate may only be provided with the option to do this after the candidate has already indicated a level of interest in the opportunity; as such, according to an exemplary embodiment, the candidate may be asked why they have declined the opportunity to interview 74. In an exemplary embodiment, a request for a reason why the candidate has declined an interview may include one or more preselected options (such as the candidate having received a more promising interview or offer elsewhere, or the candidate having changed personal circumstances resulting in them no longer being able to pursues that position) or may include an open-ended response option.

In an exemplary embodiment, when the candidate has provided a response 741, the response may be stored and may be processed 75 in order to improve the process. The response of the candidate may optionally be used by an AI bot or by an inference engine in order to improve future evaluations of candidates. For example, if many candidates are declining interviews because there is too much time taken between the first steps and the last steps of the method, the responses of the candidates may be stored and may be used to show that the speed of the process needs to be improved. In either case, when the candidate has or has not provided a response, the candidate may be removed in a removal step 53.

Candidates may also be requested to provide scheduling information. In an exemplary embodiment, it may be desirable to try to schedule an interview with the candidate immediately after the candidate has been identified as acceptable and approved by a hiring manager. In such an embodiment, the candidate may be requested to provide a date and time, a set of dates and times, or a timeframe window in which they can be available for an interview. In some embodiments, candidates may be solicited for scheduling information for different types of interviews, such as, for example, in-person interviews, video-chat interviews, or phone interviews or interviewed conducted by SMS/Text or some other type of platform each of which the candidate may have different levels of availability for. In some exemplary embodiments, the candidate may be given lower priority or may be disqualified from applying for the position based on their availability for an interview; for example, if the candidate would not be able to attend an in-person interview for a long period of time, they may not be considered for a position that demands immediate consideration of the candidates.

According to an exemplary embodiment, interview scheduling information, as well as any other information that may have to do with setting dates and times for events, may be handled by a web-based or machine-based calendar system. In an exemplary embodiment, any party involved in the process, such as the candidate, the recruiter, the hiring manager, a department manager involved with the hiring process, or any other party, may be able to propose, accept, reject, and/or modify entries in the calendar system. Such parties may also be able to directly create, edit, and delete events in the calendar system, may be able to invite participants, may be able to specify participation requirements, or may have any other functionality available to them, as desired. Alternatively, in some embodiments, some parties may have freer access and other parties may have more restricted access to the calendar system; for example, in an exemplary embodiment, a candidate may be able to propose a date and time for an event, but only the hiring manager may be able to approve a proposed date and time for the event. In an exemplary embodiment, the parties that have access to the calendar system may have such functionality available to them throughout the hiring process, or only at specific times during the hiring process, as desired.

As discussed briefly, a system may be configured to handle and respond to a number of types of response, over a number of different communication channels, which may be provided by a candidate. In some embodiments, candidates may be able to apply for a position or schedule or accept an interview using any communication method over any acceptable communication channel. This may include, for example, calling the recruiter, sending a message to the recruiter requesting a call back at a particular time, visiting a web form either directly (e.g. by searching) or by a provided hyperlink, replying to an email or sending an email to a recruiter or to an email address of the system, replying to a posting on a job board, replying using SMS or another form of text messaging, or any other acceptable communication method, as may be desired.

In an exemplary embodiment, once one or more interviews have been completed, an offer step 8 may be performed. Such a step may be shown in more detail in exemplary FIG. 8.

According to an exemplary embodiment, in a first part of an offer step 8, an interview result may be evaluated 80. The candidate may be considered to have passed or have failed the interview, or may be considered to be borderline and an additional interview may be conducted.

If the candidate is considered to have failed the job interview, this information may be provided to the system, and the system may request a reason 83 from the interviewer or other reviewer as to why the candidate failed or was otherwise rejected. In some exemplary embodiments, this may be used for the purpose of conducting statistical analysis on the one or more candidates for the position, on one or more candidates considered to have been improperly selected by the system, or any other statistical analysis that may be considered to be useful. In some exemplary embodiments, the reasons 83 provided by the interviewer may be used to further train the AI employed in previous steps, such as step 52.

Once a reason has been provided, or if a reason is provided 831, the response may be stored and may be processed for use in subsequent AI BOT and/or inference engine evaluations 84. The system may then proceed to a step of removing the candidate 53.

If the candidate is considered to have passed the job interview, this information may be provided to the system, and the system may be configured to automatically generate and send an offer to the candidate via one or more of the preferred communication media 81. In an exemplary embodiment, the response of the candidate may then be evaluated 811. In an exemplary embodiment, this response may be considered to be an acceptance, a rejection, or a counteroffer.

In an exemplary embodiment wherein the candidate accepts the job offer, the system may mark the position as having been filled 82. In an exemplary embodiment, once the position has been filled, the system, or the hiring manager or any other party, may then notify the other candidates that the position has been filled and confirmed. The system may then stop all campaigns for the position and stop the hiring process for the position 821.

In an exemplary embodiment wherein the candidate presents a counteroffer, in an exemplary embodiment, the system may direct the counteroffer to the hiring manager. In some exemplary embodiments, a counteroffer may be handled similarly to an acceptance or similarly to a rejection. In one exemplary embodiment, the position may preliminarily be marked as filled while the negotiation is being conducted; in another exemplary embodiment, the system may solicit other acceptable candidates in order to attempt to find a candidate that accepts the offer without modification. In still other exemplary embodiments, anything other than an acceptance may be counted as a rejection.

In an exemplary embodiment wherein the candidate rejects the job offer, a reason may be requested from the candidate as to why the job offer was rejected 83. In an exemplary embodiment, such a reason may be used to better train an AI bot used in previous steps. In an alternative exemplary embodiment, such a reason may be evaluated by a hiring manager and read in order to see if the candidate had intended to provide a counteroffer or otherwise expressed continued interest in the position. The system may also be configured to evaluate whether the candidate had intended to provide a counteroffer or otherwise expressed continued interest in the position, and may be configured to contact a hiring manager if it discovers either.

According to an exemplary embodiment, if a response from a candidate is a rejection 83, the AI BOT may be configured to try to place the candidate in another open position. For example, according to an exemplary embodiment, if a candidate indicates that they are not interested in a position for some reason, the AI BOT may continue a conversation with the candidate and may ask them what types of positions they are looking for. For example, the AI BOT may ask the candidate to provide information on desired location, desired job title, desired salary range, and any other information that the candidate may provide. (This may include, for example, information indicating that the candidate wishes to enter a different field entirely, such as an indicating that they wish to move from programming to finance.) In some exemplary embodiments, the AI BOT may then check to see if any open jobs available to it match the candidate's requirements. (This may be, for example, jobs offered by one of the AI BOT's clients if the AI BOT is configured to function on a client-subscription model, or may be jobs offered within a field if the AI BOT is configured to run on a field-specific model for greater conversational efficiency; in such an exemplary embodiment, if the candidate wants to enter a different field, another AI BOT governing the different field may be invoked. Other configurations may also be possible.)

According to an exemplary embodiment, if an AI BOT does not locate any open jobs that match the candidate's requirements, the AI BOT may then proceed to perform one or more searches on one or more job sites, and may generate a curated list of jobs from the one or more job sites. This list may, for example, be provided in ranked order based on the similarity of the job to the candidate's stated requirements, or may be based on some other order such as may be desired. For example, in some cases, such as in cases where the AI BOT is operated by a company that also owns a search service, the results of that search service may be prioritized; in cases where a finder's fee can be charged to the job board for referring a candidate, finder's fee positions may be prioritized; in other cases, other logic may be used. This list may then be provided to the candidate and feedback from the candidate may be solicited. The candidate may, in some cases, refine their requirements after reviewing the openings list; in some exemplary embodiments, the AI BOT may then be configured to perform the process again with the refined requirements, if desired.

According to an exemplary embodiment, the AI BOT may further be configured to submit a résumé or application directly to a job board on behalf of a candidate, or may prepare such a résumé or application for the candidate to submit, which may help make the process frictionless. This may ensure that the AI BOT is capable of performing every aspect or most aspects of a job search, ensuring that the AI BOT can function as a starting point for a job search and ensuring that candidates go to the AI BOT first when they are looking for a job.

For example, instead of searching on sites like INDEED or LINKEDIN, it may be contemplated that candidates can send an email or other message to the AI BOT on whatever channel is most convenient for them, and state something like "Hey, I am looking for a new gig, what opportunities are out there that fit my needs?" The AI BOT may then respond to the candidate based on past conversations, such as, "Hey Chris, how's it going? Based on our last conversation, you were looking for a Sales Position with a staffing company in the NYC area, with a minimum salary of $120k. Has anything changed?"

The AI BOT may further be configured to use such ongoing conversations as the basis for proactively sending updates to particular candidates, on new jobs that meet the candidate's needs or on training or other education that may help to improve a candidate's résumé and focus it more heavily toward the kind of positions that they are searching for. In some exemplary embodiments, this may be performed, for example, in real time, or in specified intervals based on the candidate's preferences. In some exemplary embodiments, the periodic updates that the AI BOT is sending to the candidate may in turn be used to better focus the updates or otherwise collect information about the candidate; for example, the links that the candidate clicks on may be used in order to determine if the candidate is still in the market for a new job, or may be used to gain further intelligence on the types of jobs that the candidate is looking for. In some exemplary embodiments, job descriptions may be provided with summary information like "AI Developer, Princeton N.J., Bank of America, $150k" in the first few lines of the job description, with a link to the full description. (In some exemplary embodiments, the summary information associated with job descriptions may be varied in order to collect further intelligence about what aspects of the job are most important to the candidate; if the candidate is more likely to click on jobs that offer certain benefits, such as childcare or telecommuting, these may be highlighted, and if the candidate is more likely to click on jobs that are in a certain location, such as a certain area of Princeton N.J., these may be highlighted.)

Once a response has been solicited 83, if the reason is provided 831, it may be processed 84. The system may then proceed back to a step of removing the candidate 53.

Figure 8:
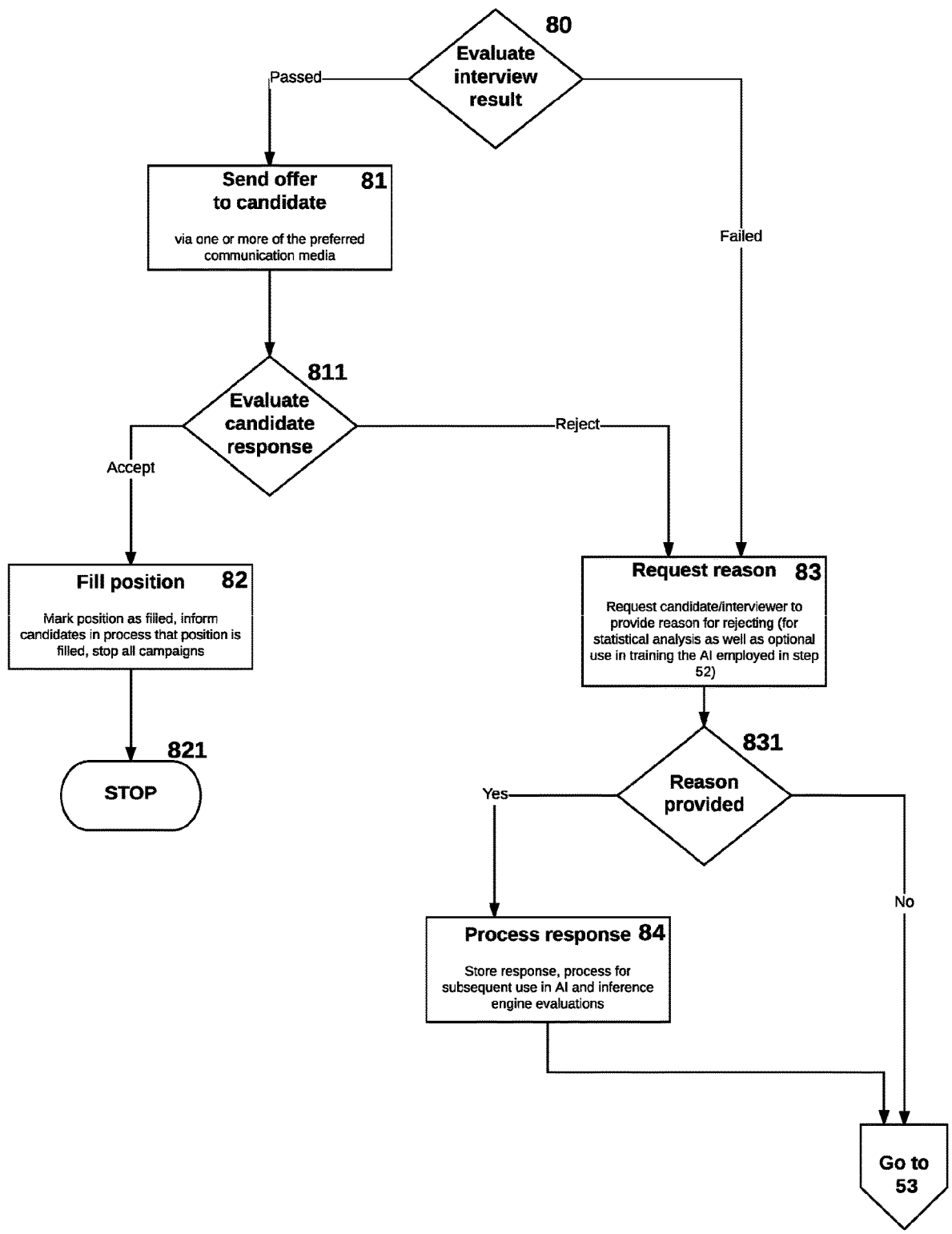
FIG. 8 is an exemplary embodiment of a flowchart depicting a method of performing an offer and acceptance step.

In some exemplary embodiments, it may also be desired to have the AI BOT complete all or part of an interview procedure, in addition to performing a review step 7 before an interview and evaluating an interview result in an offer step such as is shown in FIG. 8. For example, in an exemplary embodiment, an AI BOT may complete a first part of an interview procedure or a first interview, which may include, for example, basic question-and-answer portions for the candidate (for example, the candidate may be asked about a time they demonstrated a particular skill) and a human recruiter may complete the second part of an interview procedure or a second interview, either alongside or instead of the AI BOT.

For example, according to an exemplary embodiment, a hiring manager may start by selecting one or more submitted candidates that it may be desired to have interviewed by the AI BOT. In some exemplary embodiments, this may be done by another party, for example by a recruiter, before results are delivered to the hiring manager, in order to refine the results that are provided to the hiring manager, or in order to provide more detail about the candidates to the hiring manager and allow a more informed decision to be made. In some exemplary embodiments, this may be done to any selection of candidates or to all candidates; for example, in an exemplary embodiment, all candidates may have to go through a pre-screening interview with an AI BOT or may have to go through a first interview with an AI BOT in order to go forward.

In an exemplary embodiment, an AI BOT may be provided for an interview at any time when the candidates is available to do the interview, and no scheduling may be required. In some exemplary embodiments, the candidate may be informed that they have been selected to proceed to a next step wherein they can complete an interview with the AI BOT in order to determine if they can advance further, and may be provided with a link to start the interview at any time. In other exemplary embodiments, the candidate may be requested to interview at a specific time (such as at a mutually agreeable time worked out with the candidate beforehand), or at one of a set of specific times, in order to promote engagement with the candidate by making the candidate feel like they are interviewing with a human, or in order to allow a human recruiter to take over the interview should they desired to do so. In some exemplary embodiments, it may be desired to stagger the AI BOT interviews with candidates, such that, of hundreds of candidates receiving interviews, only a fraction of the candidates are engaging in interviews at any one time; in some exemplary embodiments, the AI BOT may be configured to simultaneously interview all of the candidates (or a sizeable fraction of the candidates such as hundreds of candidates) at the same time.

In some exemplary embodiments, the candidate may be able to break up the interview across multiple sessions, such that the candidate can stop the interview process and continue the interview process later in the day, or even the next day. In some exemplary embodiments, the candidate may not be able to complete the interview in multiple sessions, and it may instead be required for the candidate to complete the interview in a single session. In some exemplary embodiments, the interview may expire after a certain time period has passed; for example, according to one exemplary embodiment, the interview may be available for a certain number of hours or for a certain number of days after the candidate has clicked the link to begin the interview, after which the interview may terminate. In some exemplary embodiments, the candidate may then be able to restart a new interview session from the beginning, if it is desired to permit them to do so. In some exemplary embodiments, the interview availability may terminate at a certain specific time or deadline for all candidates. In some exemplary embodiments, there may be different requirements for different interviews, or for different interview questions; for example, according to an exemplary embodiment, a time limit may be provided for one or more questions, which may be set for all questions, for a set of questions, or for each specific question. For example, in an exemplary embodiment, a candidate may be asked general questions in an interview and may have unlimited time (or a significant amount of time) to answer those general questions, but may also be asked to solve one or more problems and may have a limited amount of time to provide their solution, in order to ensure that the candidate can solve problems quickly.

In some exemplary embodiments, interviews may be provided though any appropriate medium. For example, according to some exemplary embodiments, interviews may be conducted via email, SMS, FACEBOOK MESSENGER, web page text chat, a mobile app, WHATSAPP, telephone, or through any other medium or plurality of media such as may be desired. In some exemplary embodiments, the candidate may be able to choose a medium or may be able to choose from a limited set of communications media, as may be desired. In some exemplary embodiments, certain interview or interview questions may be limited to a certain communications medium; for example, in an exemplary embodiment, the AI BOT may request that the candidate write example code or pseudocode on a whiteboard in response to a prompt, and the candidate may be required to do this via video chat so it can be verified that it is really the candidate that is writing this code. (Alternatively, the candidate may be required to provide these responses via text chat so that the AI BOT can more easily interpret them.) In some exemplary embodiments, the AI BOT may have certain functionality when some communications media are used that may not be used when other communications media are used; for example, according to an exemplary embodiment, when the candidate conducts an interview via video chat, the AI BOT or another AI Engine may look for certain mannerisms or other visual cues of the candidate, and may only look for keywords when the candidate conducts an interview via text. (In some exemplary embodiments, it may be required that the candidate conduct an interview via a certain communications medium in order to enable the functionality, as may be desired.)

According to one exemplary embodiment, the AI BOT may conduct interviews based on a list of interview questions that have been provided by the hiring manager. In some exemplary embodiments, if the AI BOT is not provided with questions or if the AI BOT asks all of its questions without completing the interview, the AI BOT may be configured to select from one or more questions in a repository, or may be configured to create questions on the fly for the candidate. In some exemplary embodiments, questions may be created based on reading the job description and the candidate's profile, which may include, for example, some or all of the information that has been collected during the recruiting process. In an exemplary embodiment, the AI BOT may access questions in a repository or may otherwise access preset questions that are based on, for example, industry or job title; these may be generated based on, for example, previous interview questions that have been added to the repository after meeting certain criteria (such as, for example, being asked in a certain number of previous interviews) or may be generated based on other compiled data, such as data that might be found on the web.

In some exemplary embodiments, interview questions may be asked one at a time until a satisfactory answer is provided by the candidate. In some exemplary embodiments, if the candidate does not satisfactorily answer the question, the AI BOT may ask the question in a different way, or the question may be skipped and asked again at a later point, such as may be desired.

In some exemplary embodiments, each question to be asked, or some of the questions to be asked, may be based on a previously-asked question or may be based on a received answer. For example, according to an exemplary embodiment, the AI BOT might ask a follow up question or change the questions asked based on a response from a previous question, if desired. In another exemplary embodiment, the AI BOT may decide to omit one or more of the questions, or may otherwise reduce the number of questions to be asked. In one example, this may be done if it is determined early on in the interview that a candidate is not a good fit and it is desired to end the interview early. In another example, this may be done if the AI BOT determines that the candidate is losing interest in the position or is otherwise disinterested; in such a case, according to an exemplary embodiment, the AI BOT may skip one or more questions or may ask additional questions relating to the interest level of the candidate. The AI BOT may also change the order of questions based on the response of a candidate, such as may be desired.

According to an exemplary embodiment, the AI BOT may solicit additional information from the candidate in the interview. For example, according to an exemplary embodiment, the AI BOT might ask the candidate to send samples of work, for example source code, a design portfolio, or the like. The AI BOT may also solicit references from the candidate, such as may be desired. In some exemplary embodiments, at the end of the interview, the full transcript of the interview may be made available to the recruiter or hiring manager for review; in an exemplary embodiment, the additional information may be sent along with an interview transcript to the hiring manager.

According to an exemplary embodiment, the AI BOT may be configured to respond to questions asked by the candidate in the interview in the event that the candidate asks questions in the interview. In an exemplary embodiment, the AI BOT may answer the questions and may make use of a machine learning algorithm in order to improve the responses provided to successive candidates. In another exemplary embodiment, one or more questions may be provided to a human recruiter to answer, such as, for example, if the AI BOT is not able to answer the question.

In an exemplary embodiment, the AI BOT may go beyond asking the candidate to solve a problem with pseudocode or the like, and may ask the candidate to take a formal coding test or assessment. In some exemplary embodiments, the test or assessment may be scheduled ahead of time based on the availability of the candidate, if advance scheduling is required.

According to an exemplary embodiment, once the interview has been completed, a transcript of the interview may be prepared. In some exemplary embodiments, the transcript may be provided to a hiring manager and the hiring manager may make the decision as to whether or not to bring in the candidate for a second interview, such as, for example, an in-person interview. In some exemplary embodiments, the transcript of the interview may be fed into an AI engine for analysis instead of or in addition to providing it to the hiring manager. In some exemplary embodiments, the AI Engine may then determine whether the candidate is to be brought in for a second round of interviews. For example, according to an exemplary embodiment, the AI Engine may look at other candidates that have been hired or interviewed for a similar role at this company, and/or may look at other candidates that have been hired or have been interviewed for similar roles at other companies, and may compare the transcript to the performance of those other candidates. In some exemplary embodiments, this comparison may use, for example, text analytics, sentiment analysis, or a comparison of the data point matrix of the interview transcript with the data point matrix of candidates that have been hired for a similar role. In such exemplary embodiments, or in other exemplary embodiments, a data point matrix may be created for all interview transcripts.

Turning now to exemplary FIGS. 9 to 12, FIGS. 9 to 12 may depict, between them, multiple potential exemplary embodiments of a method of operation of an AI BOT. Looking first at FIG. 9, a relevant portion of a process of operating an AI BOT may be initiated by adding a candidate to a job 90. The AI BOT may then engage in conversation with that candidate in order to more fully develop the candidate's profile and resume, vet the candidate, and in some exemplary embodiments either prepare a recommendation regarding the candidate or outright generate a decision and a message to the candidate based on the AI BOT's determination.

Figure 9:
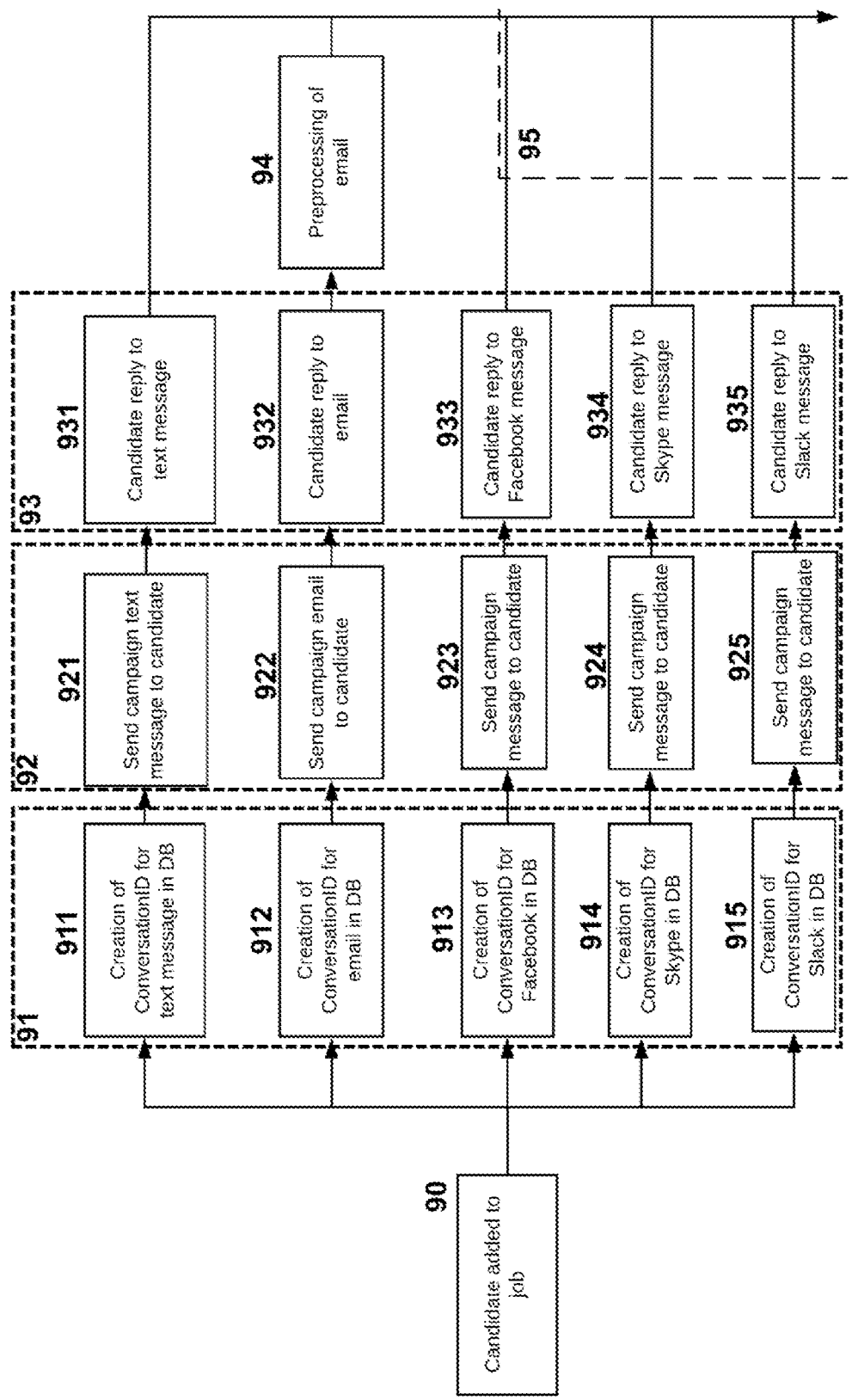
FIG. 9 is an exemplary embodiment of a flowchart depicting a method of operating a conversational AI BOT program and sending and receiving messages from a candidate.
Figure 10:
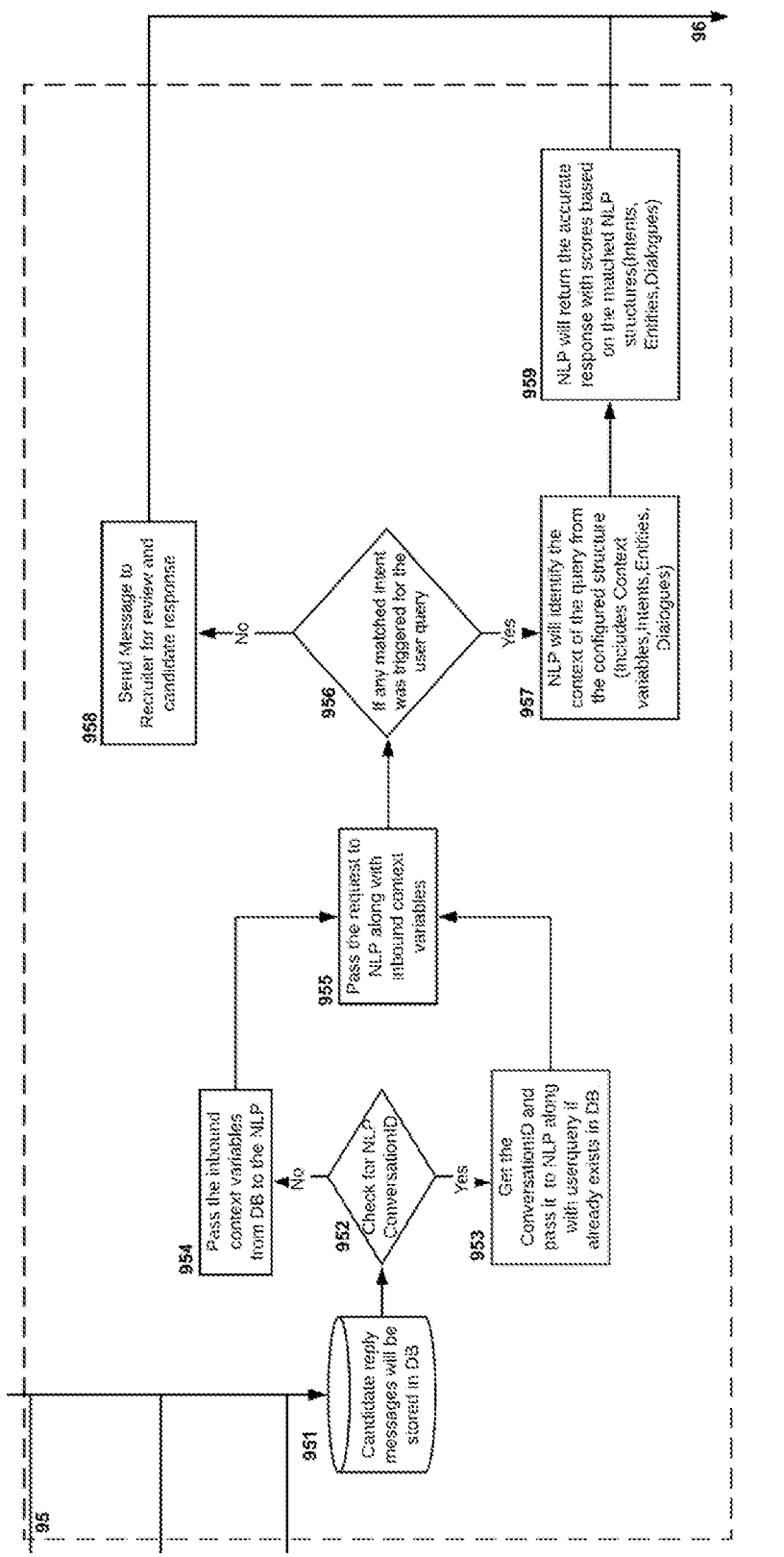
FIG. 10 is an exemplary embodiment of a flowchart depicting a method of operating a conversational AI BOT program and sending and receiving messages from a candidate.

As shown in exemplary FIG. 9, once a candidate has been added to a job 90, the AI BOT may dedicate space to creating a conversation to the candidate, and may create a ConversationID 91. According to an exemplary embodiment, different forms of ConversationID 91 may be created for any or all of a variety of conversation types, such as a ConversationID for text message communications with the candidate 911, a ConversationID for email communications with the candidate 912, a ConversationID for communications with the candidate over a social media platform 913 (which may in this case be represented by the FACEBOOK social media platform 913, but may of course be other social media platforms such as LINKEDIN or GOOGLE PLUS, or even more "casual" social media platforms such as WHATSAPP or SNAPCHAT), a ConversationID for communications with the candidate over an audio service 914 (which may in this case be a Voice over Internet Protocol (VoIP) service such as SKYPE, or may be any other service which offers this functionality such as telephone calling), or a ConversationID for any other services 915 (which may in this case be represented by communications via a communications suite such as SLACK, but may also extend to any other communications that may be contemplated). Other variants of ConversationIDs 91 other than those listed here may be contemplated, and likewise it may be contemplated to associate different data with different ConversationIDs 91 in different exemplary embodiments of a system; for example, it may be contemplated that both automated conversations conducted over SKYPE and live person-to-person conducted over SKYPE may be consolidated under the same ConversationID 914. It may also be contemplated to classify similar types of data together; for example, SKYPE conversation data may be classified into an audio ConversationID 914 along with a recording of an in-person interview conducted previously for that candidate, which may also be provided in the form of audio data. Ultimately, in some exemplary embodiments, each of the different ConversationIDs 911, 912, 913, 914, and 915 may be consolidated into one ConversationID 91, or may be used as the ConversationID 91 even if multiple communication methods are to be used. (For example, an initially created ConversationID may be used in order to designate a preferred communication method for a particular candidate, such that if the initial creation of a ConversationID is an email ConversationID 912, the system will attempt to communicate with the candidate via email before it attempts to communicate with the candidate through other communication methods. In some exemplary embodiments, a parent ConversationID 91 may store a variety of created method-specific ConversationIDs 911, 912, 913, 914, 915 in order to store the communication methods that have been designated as valid thus far; for example, a candidate may have a phone number, an email address, and so forth listed on their resume or otherwise made available, but the system may only use a first communication method 911 until the candidate then tries to use a second 912, and may only then move to using the second communication method 912.

In a next step, an AI BOT may send a campaign message 92 to the candidate. In an exemplary embodiment, this campaign message 92 may be sent over a communication channel that has been associated with a created ConversationID 91; for example, in a first exemplary embodiment, when a ConversationID has been created for a text messaging protocol 911, a campaign text message 921 may be sent to the candidate. This may likewise be the case for campaign emails 922 to be sent to the candidate, campaign social media messages 923 to be sent to the candidate, or any other campaign messages 924, 925 to be sent to the candidate.

In a next step, the candidate may send back a reply 93 to the campaign message. In an exemplary embodiment, the candidate's reply may be via the same communication channel as the campaign message 92; for example, a candidate reply to a text message 921 may itself be via text message 931. In another exemplary embodiment, a candidate reply to a text message 921 may be via some other protocol entirely. In some exemplary embodiments, the candidate reply 93 may result in the creation of a new ConversationID 91, if desired.

In a next step, preprocessing steps may be performed 94 for one or more of the communications methods, such as may be desired. For example, according to an exemplary embodiment, an email communication may be preprocessed 94. Alternatively, non-text communications (such as voice or video conversations) may be preprocessed at this stage if desired.

In an exemplary embodiment, the system may then move on to a processing service 95, such as may be desired. This may be shown in more detail in exemplary FIG. 10. In a first step of the processing service of the AI BOT, the candidate reply messages may be stored in a database 951, which may be performed in a uniform fashion for all candidate reply messages or may be stored in the original forms in which they were received (or, alternatively, in one of several forms based on how they are received, such as if it is desired to force a single audio format and single text format to be used but is also desired to keep the original audio files for reference should it be necessary to check the accuracy of a speech-to-text transcription program).

The AI BOT may then check for whether the candidate has a NLP ConversationID associated therewith 952. If the candidate is found to have a NLP ConversationID associated with them, the ConversationID may be retrieved and passed to a natural language processing engine, along with one or more user queries identified in the candidate's message, provided that it already exists in the database 953. If the candidate is not found to have a NLP ConversationID, the inbound context variables may be passed from the database to the NLP engine 954. In either approach, whether the inbound context variables are passed to the NLP or the ConversationID is passed to the NLP in order to allow it to identify any information associated with the candidate, the request may be passed to the NLP along with the inbound context variables 955.

In a next step, the AI BOT may attempt to match one or more intents to the user query, and may determine whether it has been possible to do this 956. If the user query can be matched to an intent 956, the system may determine, once the matched intend is triggered for the user query 956, the context of the query from the configured structure using the NLP engine. In an exemplary embodiment, an NLP engine may examine the context variables, the intents, the entities, or the dialogues that have led up to the communication or which are present within it 957. Following this step, the NLP may then return a response, which may be scored based on the matched NLP structures, such as intents, entities, and overall dialogues 959. According to some exemplary embodiments, one response may be prepared based on the potential response that has the highest score; in other exemplary embodiments, it may even be contemplated that multiple responses may be prepared based on scores meeting a certain threshold or being within a certain threshold score of one another. (For example, if a first potential response and a second potential response would have different meanings but have scores that are very similar to one another, it may be contemplated that both the first potential response and the second potential response may be provided to a recruiter or hiring manager for review.) If no intent is matched, then the message may be sent to the recruiter for review and so that the recruiter can come up with a candidate response 958, which may then be used to train the AI BOT.

Figure 11:
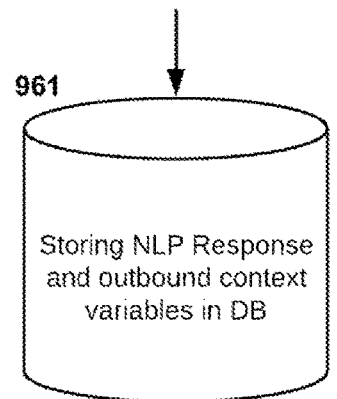
FIG. 11 is an exemplary embodiment of a flowchart depicting a method of operating a conversational AI BOT program and sending and receiving messages from a candidate.
Figure 11:
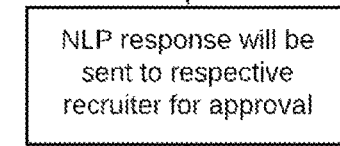
Figure 11:
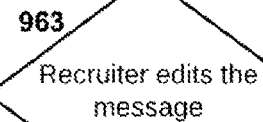
Figure 12:
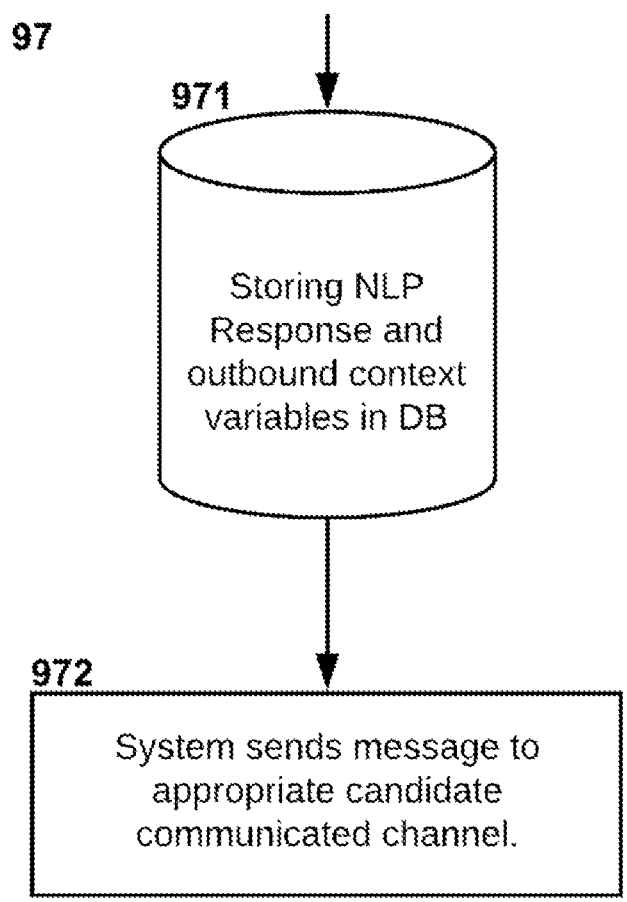
FIG. 12 is an exemplary embodiment of a flowchart depicting a method of operating a conversational AI BOT program and sending and receiving messages from a candidate.

Once this message has been formulated, the system may continue to a next step 96, as shown in FIG. 11, or may alternatively continue to a variant next step 97, as shown in FIG. 12, depending on the exemplary embodiment. Other variants may also be contemplated, such as a mix of the next step 96 and the next step 97 which incorporates aspects of each, if this is desired.

Looking first at the variant shown in FIG. 11, according to an exemplary embodiment, it may be contemplated to have a recruiter, hiring manager, technician, or other party oversee the training of the AI BOT, and as such a manual message approval process 96 may be contemplated. In the manual message approval process 96, a first step may include storing the natural language response and the outbound context variables in the database 961 for later reference. The proposed response may then be sent to an appropriate party, such as a recruiter, for approval 962. The recruiter may then have the opportunity to edit the message, and may make any necessary edits 963. If the recruiter opts to edit the message, they may do so and may then save the edited message 964. This may then bring them back to the "send" screen, just as if they had made no edits at all; they may then have the ability to send the message 965. In some exemplary embodiments, the sending of the message 965 may be done through an AI BOT interface that does not require the recruiter to interact with the messaging service at all; alternatively, the AI BOT may launch and optionally populate the messaging service with the message to be sent. Once the instruction to send the message 965 has been received, the system may cause the message to be sent to the candidate, such as via an appropriate candidate communication channel (if none has been selected by the recruiter already) 966.

Looking next at the variant shown in FIG. 12, it may also be contemplated to have the AI BOT act on its own without oversight, and an automatic messaging process 97 may be contemplated. According to an exemplary embodiment, once the system has proceeded past the first step of storing the natural language response and the outbound context variables in the database 971 for later reference, the system may then simply send the candidate a message via an appropriate channel 972 without further oversight being necessary.

In some other exemplary embodiments, other variants may also be contemplated. For example, in some exemplary embodiments, an AI BOT may provide a limited window for a recruiter to disapprove a message (at which point it may then be edited) before the message is sent out. Messages may also be sent to multiple parties, for record-keeping or for allowing edits; for example, it may be contemplated to have multiple recruiters collaborating on one candidate or an external recruiter and internal hiring manager collaborating on one candidate, and both may receive messages and may have the ability to exercise oversight in full or in a limited way.

Figure 13:
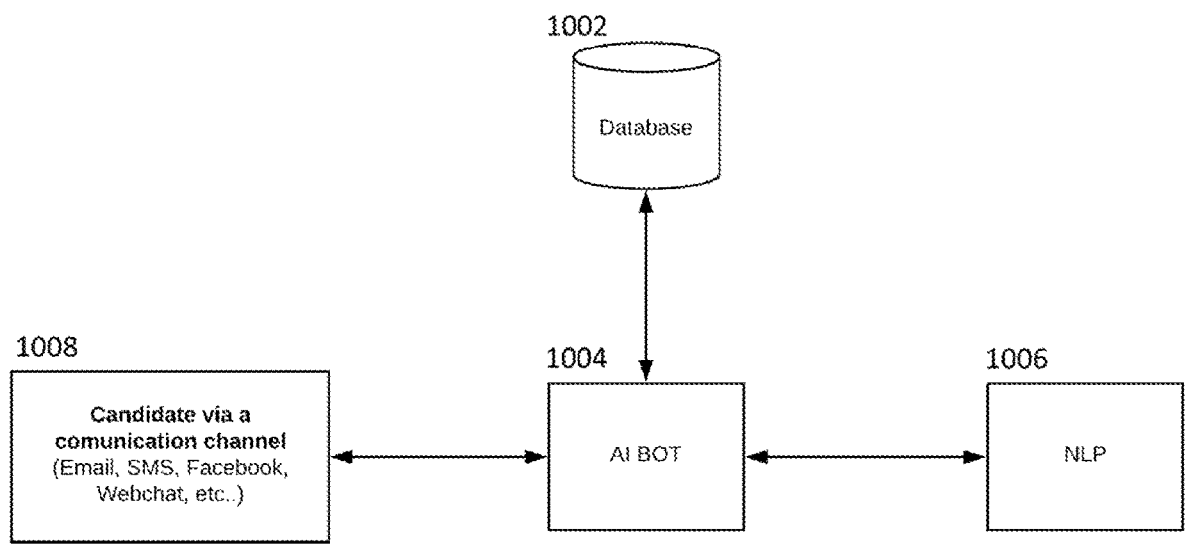
FIG. 13 is an exemplary embodiment of a component diagram of the overall structure of the system.

Looking next at exemplary FIG. 13, a component diagram of the overall structure of the system may be shown. In an exemplary embodiment, an AI BOT 1004 may be a central part of the system, and may manage the other components of the system, such as a natural language processing engine 1006 (which may be, for example, a NLP engine wholly incorporated into the AI BOT, or may be, for example, an NLP engine API or another connection to an external NLP engine). The AI BOT 1004 may also be linked to a database 1002. The AI BOT 1004 may manage communications with particular candidates via particular communication channels 1008, and in some exemplary embodiments a given AI BOT may have access to, for example, email, SMS, FACEBOOK, webchat, and other communications channels. In some exemplary embodiments, it may be contemplated that separate instances of the AI BOT may have access to certain communications channels, such that, for example, parallel instances of an AI BOT function on each communication channel or on sets of communications channels, all linked to the same database (or group of databases) and to the same NLP engine. (Different databases or even different NLP engines may also be contemplated, particularly for the system as a whole; for example, in an exemplary embodiment, a first AI BOT may be used to manage recruitment operations in California and a second AI BOT may be used to manage recruitment operations in China, with the second AI BOT having appropriate natural language processing functionalities for processing Chinese languages that the first AI BOT does not have.)

Figure 14:
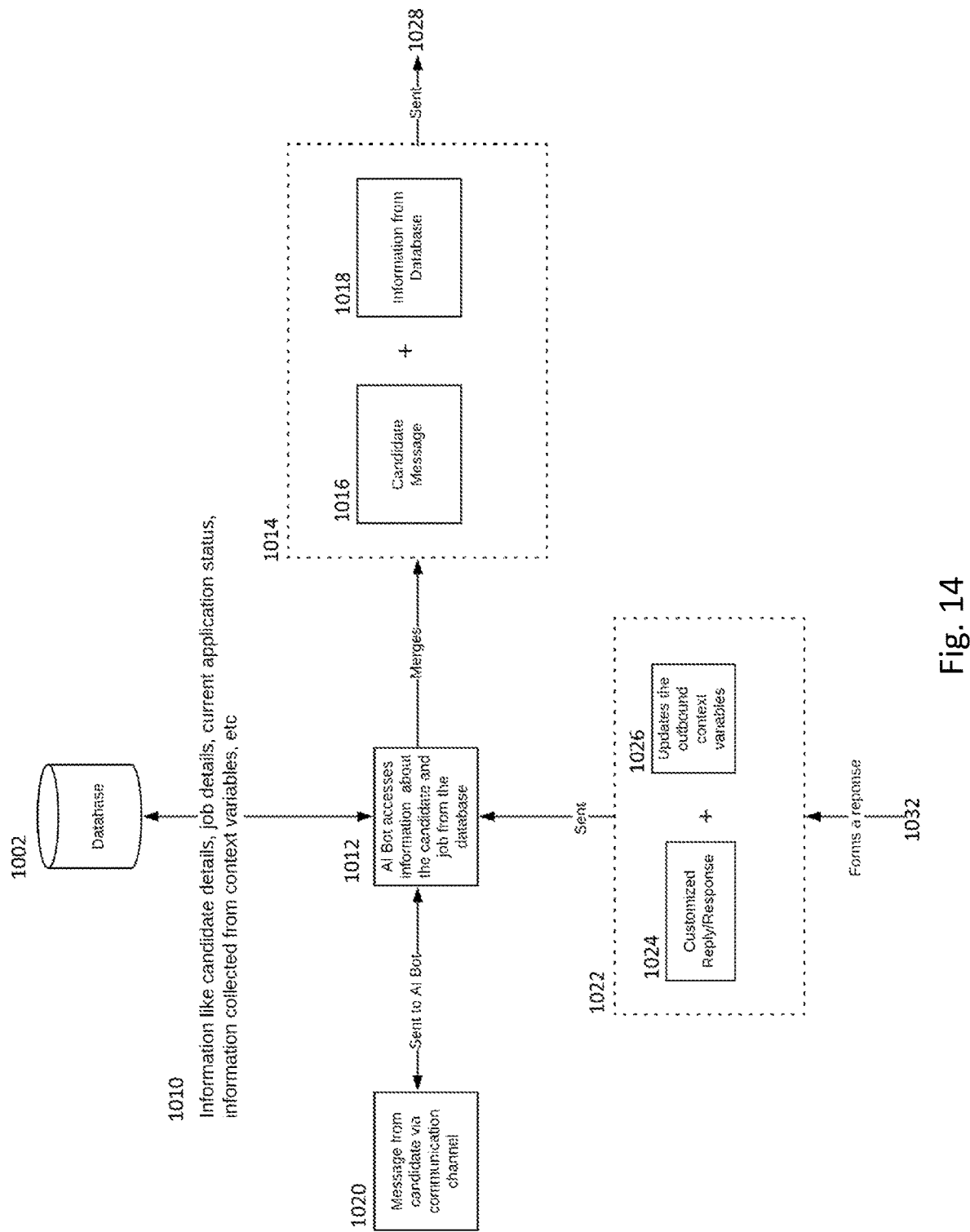
FIG. 14 is an exemplary embodiment of a process flow diagram for the AI BOT program.
Figure 15:
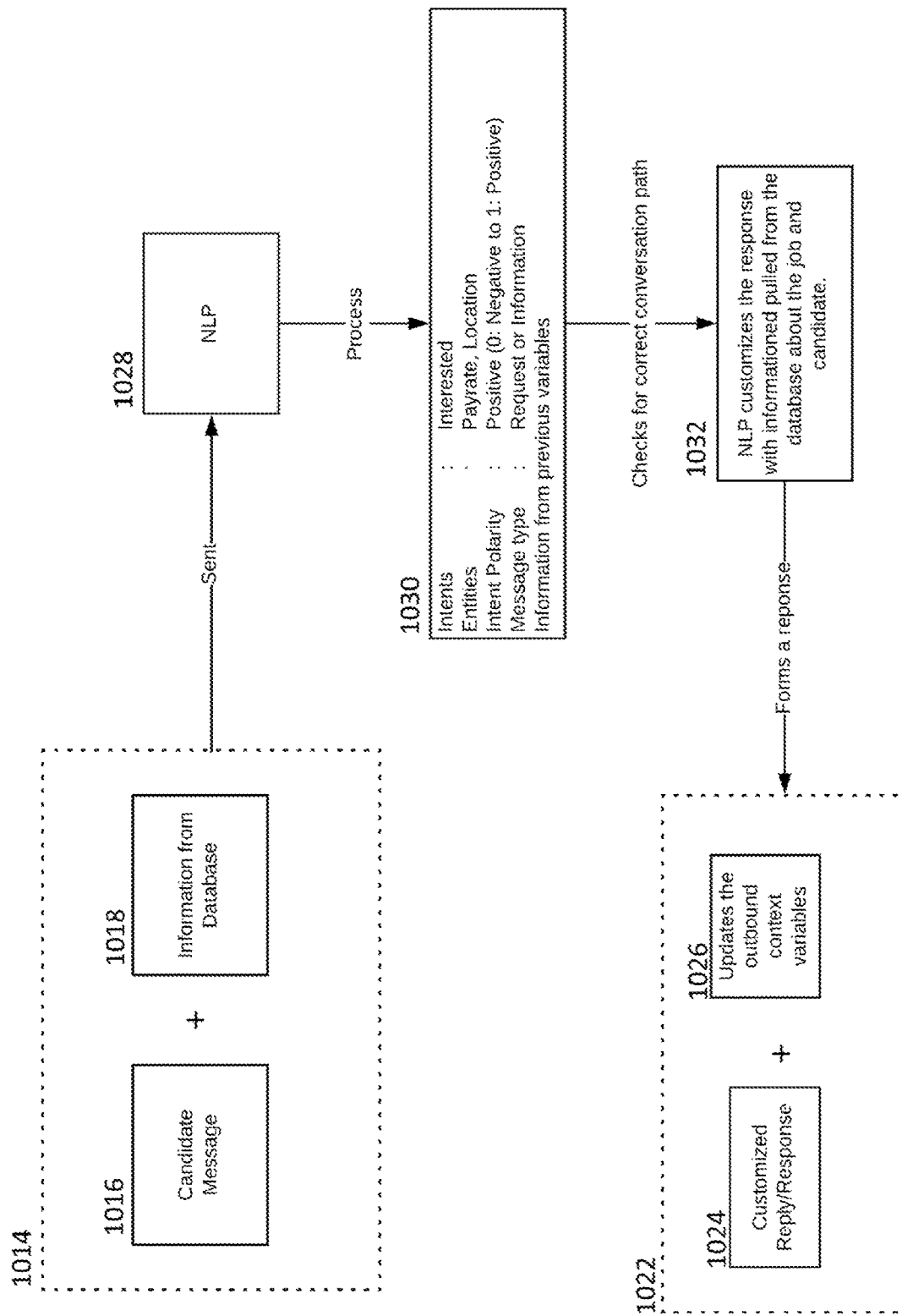
FIG. 15 is an exemplary embodiment of a process flow diagram for the AI BOT program.

Looking next at exemplary FIG. 14 and FIG. 15, the figures, together, may show a process flow diagram for the overall functionality of the AI BOT. (It is noted that element number 1014 and element number 1022 are shown in each figure, showing where the process flow diagram has been divided.)

In a first step, the AI BOT may access certain information about the candidate and the job 1012 from the database 1002. Such information may include, for example, information like candidate details, job details, current application status, any information that can be collected from context variables, and so forth 1010. The AI BOT may also handle messaging to and from a given candidate via a communication channel 1020.

The process of messaging to and from the candidate may involve initial processing of a message 1014 and determination of a response 1022 to be sent to the candidate. Once a message is received from a candidate 1020, it may be sent to the AI BOT, which may access information about the candidate and the job from the database 1012. Then, the AI BOT may merge this information with information in the candidate's message, effectively merging the candidate message 1016 and the information from the database 1018 in an initial processing step 1014. This may then be sent to the NLP engine 1028 for further processing, as shown in FIG. 15.

Looking specifically at FIG. 15, the NLP engine 1028 may then process the combined message 1030 information, including the candidate message (or a processed version of the candidate message showing only that information that is determined to be important or which is determined to be interpretable by the AI BOT or by the NLP engine) and the applicable candidate information in the database. The NLP engine 1028 may specifically process the combined message 1030 information for one or more intents (which may include, for example, an expression that the candidate is interested in the position and would like to know more about it, or an expression that the candidate is presently interested in applying for the position based on what they already do know about it), for one or more entities that are the subject of the candidate's communication (for example, the candidate may be interested in finding out more about the pay rate of the position and the location in which the job will be performed), with a particular message type (for example, a message may be classified as a request or as providing information, or may be classified as a certain type of request such as a request for information or as providing a certain type of information). The combined message 1030 may further provide an "intent polarity," which may indicate where the candidate's intent is believed to fall on a scale from negative to positive; this may in some cases be a binary score, wherein the user is indicated as having a negative intent by a polarity score of 0 or is indicated as having a positive intent by a polarity score of 1, or may be any other range of values. (For example, a quaternary score may be provided in which the user can be very negative, slightly negative, slightly positive, or very positive with a particular intent. In another example, a floating-point number may be provided, providing a whole range of possible values.) This combined message 1030 may also include information from previous variables.

Once the combined message 1030 information has been extracted, the NLP 1028 may determine, from the extracted intents and extracted entities, what the correct conversation path is most likely to be. Once a correct conversation path has been identified (or, in some exemplary embodiments, a set of most likely conversation paths, which may be interpreted by human intervention), the NLP engine may customize the response based on information that had been pulled from the database about the job and the candidate 1032. Once this information has been retrieved, the response may be formed by populating the generic response with this retrieved information.

This formed response 1024 may then be combined with an update to the outbound context variables 1026 in a step of determining a response to be provided to a candidate 1022. Once completed, this information may be provided to the AI BOT 1012 to be sent to the candidate 1020, just as is shown in FIG. 14. Alternatively, other configurations of the system may be contemplated; for example, there may be one or more additional steps in which a recruiter or hiring manager is sent a draft response before it is sent so that the AI BOT does not send out an unapproved message.

Figure 16:
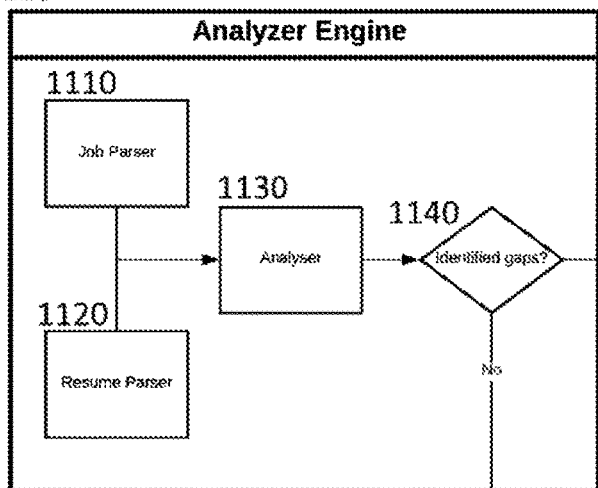
FIG. 16 is an exemplary embodiment of a system for providing resume recommendations.
Figure 16:
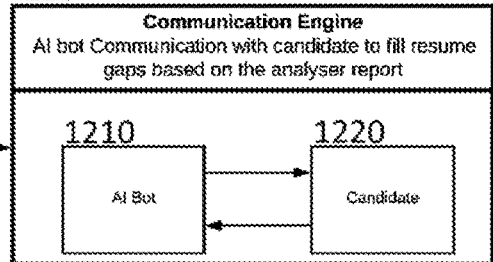
Figure 16:
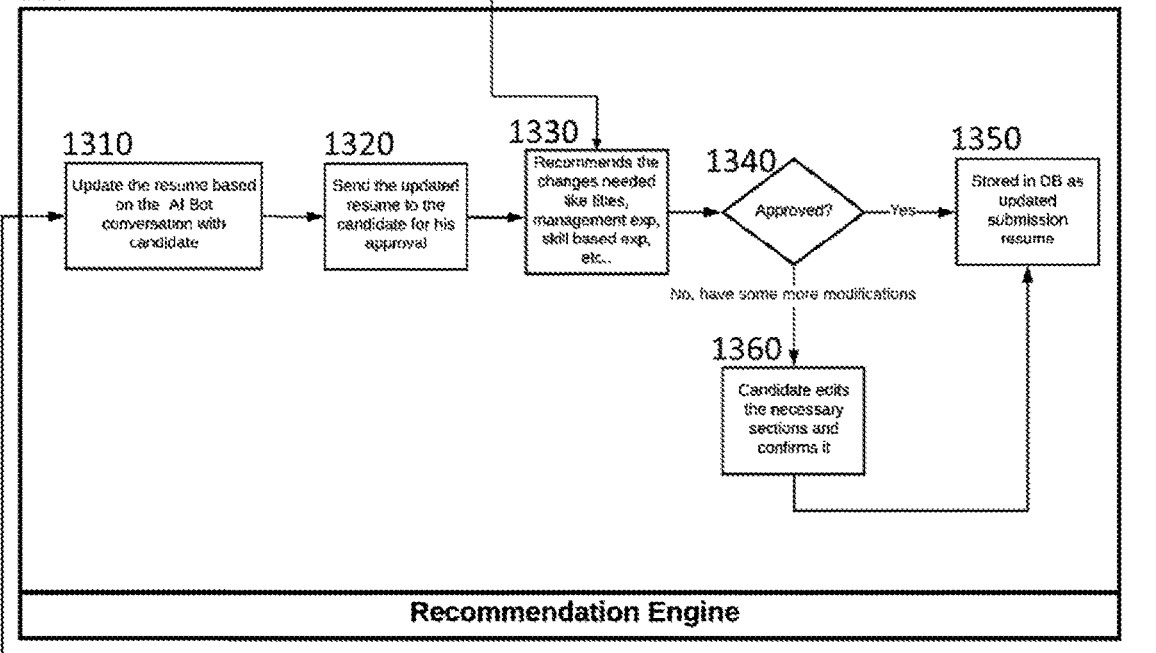
Figure 17:
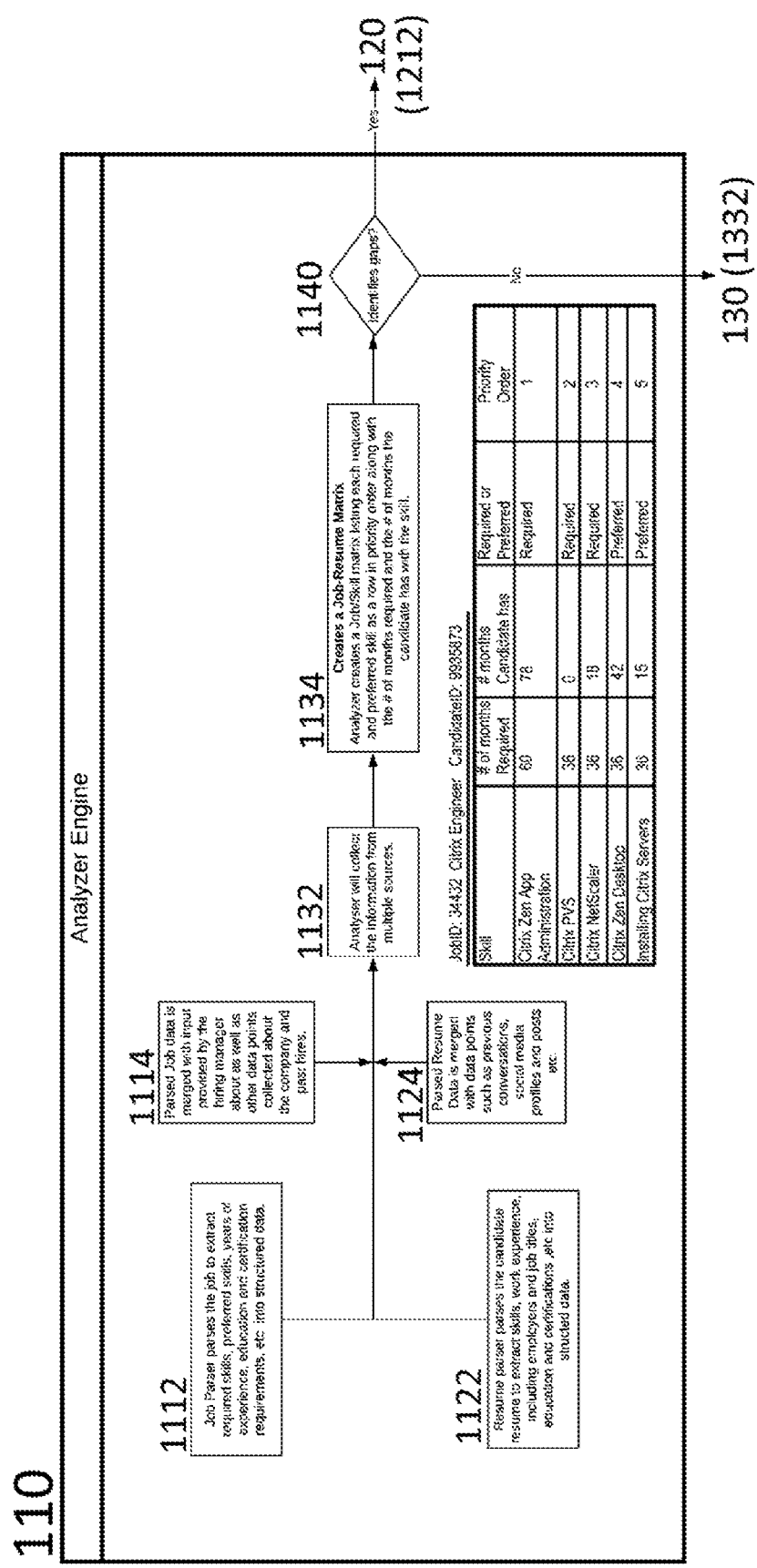
FIG. 17 is a detailed process flow diagram of an exemplary embodiment of an analyzer engine.
Figure 18:
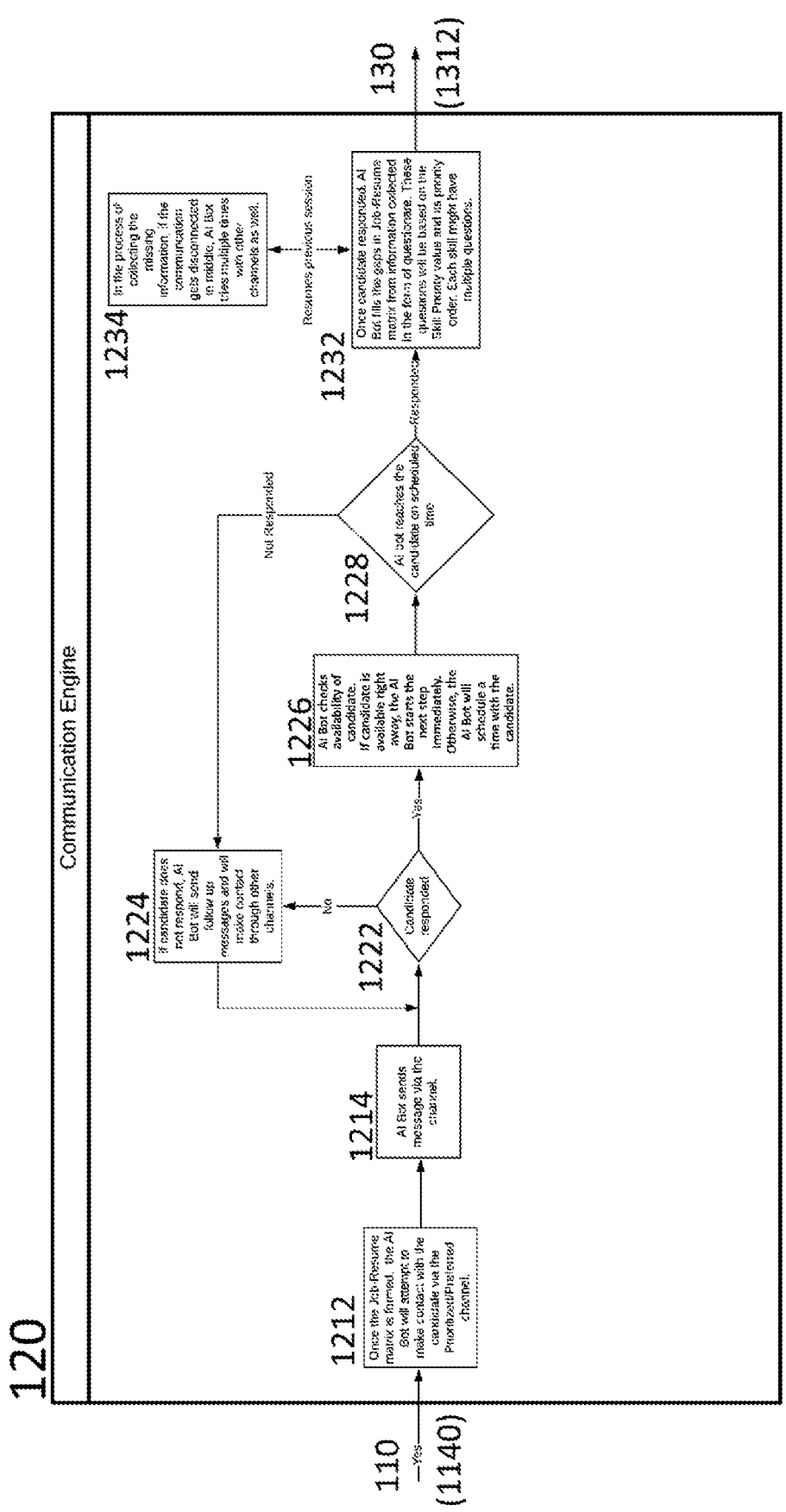
FIG. 18 is a detailed process flow diagram of an exemplary embodiment of a communications engine.
Figure 19:
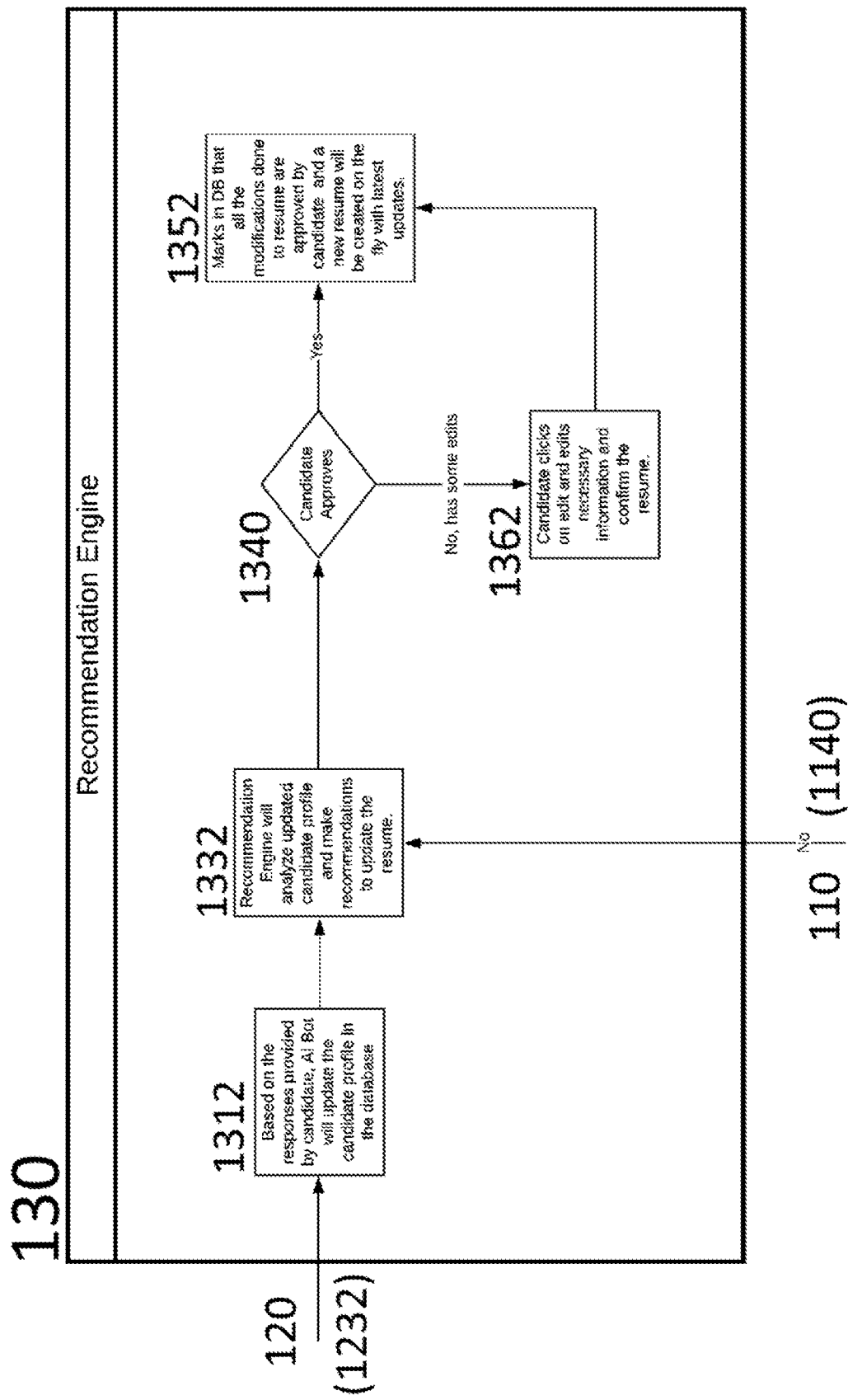
FIG. 19 is a detailed process flow diagram of an exemplary embodiment of a recommendation engine.

Turning now to exemplary FIGS. 16, 17, 18, and 19, FIG. 16 provides an overview of an exemplary embodiment of a system for providing resume recommendations to a candidate, which may be incorporated into or which may supplement the activities of an AI BOT. FIG. 17 provides a more detailed process flow diagram of an analyzer engine 110, FIG. 18 provides a more detailed process flow diagram of a communication engine 120, and FIG. 19 provides a more detailed process flow diagram of a recommendation engine 130. As may be seen in FIG. 16, each component may interact with one another; specifically, an analyzer engine 110 may potentially send inputs to a communication engine 120 (which as shown in the more detailed process flow diagrams may specifically begin operations at step 1212) and may potentially send inputs to a recommendation engine 130 (which as shown in the more detailed process flow diagrams may specifically begin operations at step 1332).

Looking first at FIG. 16, an exemplary embodiment of an analyzer engine 110 may make use of a job parser 1110 and a resume parser 1120. A job parser 1110 may be used to parse the relevant information from one or more job descriptions, such as one or more job descriptions of jobs to which a particular candidate has applied, and deliver this information to an analyzer 1130. A resume parser 1120 may be used to parse the relevant information from one or more resumes, such as a resume of the candidate, one or more variant resumes of the candidate (if the candidate has multiple resumes for applying to multiple jobs) or a combined resume of the candidate (incorporating other information that has been retrieved about the candidate in addition to the resume that the candidate has directly provided, such as, for example, social media information provided by the candidate or retrieved from the candidate, or answers to particular questions that have been answered by the candidate during the course of conversations with the candidate). This information may likewise be delivered to an analyzer 1130.

Once this information has been provided to an analyzer 1130, the analyzer 1130 may determine if there are any identified gaps 1140 in the information or between the resume information prepared by the resume parser and the job information prepared by the job parser. If there are identified gaps 1140, then the system may activate a communications engine 120. If there are no identified gaps, then the system may proceed directly to activating the recommendation engine 130.

A communication engine 120 may function to provide communications between the AI BOT and the candidate so as to help the candidate fill resume gaps based on the analyzer report 1130. The AI BOT 1210 and the candidate 1220 may correspond about the resume gaps, allowing the candidate 1220 to resolve the identified issues that cannot be as easily resolved by the recommendation engine 130, such as gaps in the actual informational content of the resume. Once the candidate 1220 has filled in these blanks, the information provided by the candidate may be provided to the recommendation engine 130.

The recommendation engine 130 may, upon receiving updated information from the AI BOT 1210 as provided by the candidate 1220, update the candidate's resume 1310 (or combined resume or one particular resume of many) based on the conversations that the AI BOT 1210 has had with the candidate 1220. The updated resume may then be prepared for sending to the candidate 1220 for their approval 1320. It may, however, also be desired to correct any spelling, grammatical, or formatting issues that may be present in the resume, and as such in some exemplary embodiments a recommendation engine 130 may generate one or more other recommendations about the changes that it may be suggested for the candidate 1220 to make. For example, in one exemplary embodiment, a recommendation engine 130 may provide suggestions to the candidate about how best to rephrase the titles of their past jobs if the candidate 1220 wants to get more attention for a particular job, such as the job initially parsed by the job parser 1110. In another example, a recommendation engine 130 may inform the candidate 1220 that the job prioritizes a certain kind of experience and that the candidate 1220 appears to be weak in that particular field; this may give the candidate an opportunity to bolster their resume in that regard, potentially at the expense of less important matters which might otherwise have been listed. For example, a recommendation engine 130 may recommend that the candidate bolster their management-based experience at the expense of other experience or other matters, or may recommend that they bolster their skill-based experience. These recommendations may then be sent to the candidate for approval 1340, such as in the form of an updated or marked-up resume/

Once the candidate has approved the changes, the candidate's modified resume may be stored in the database as an updated submission resume 1350. However, in some cases, the candidate may have edits to make to the edits 1340, and may opt to edit the necessary sections of the updated resume prepared by the recommendation engine 130 before submission. Once the candidate has edited the necessary sections and confirmed this 1360, this updated resume may be stored 1350.

Turning now to exemplary FIG. 17, FIG. 17 provides a more detailed process flow diagram that shows the operations of an exemplary embodiment of an analyzer engine 110 in further detail.

As shown in FIG. 17, a job parser 1110 may specifically parse one or more jobs to extract required skills, preferred skills, years of experience, education, certification requirements, and any other data that may be necessary or desired 1112. This extracted data may be organized into specifically structured data to be delivered to the analyzer 1130. This extracted data may then be merged with other data 1114 provided by the hiring manager (or by another party) which may concern other data points collected by the company or about past hires. (In some exemplary embodiments, a recruiter may similarly collect such data points and may thus similarly incorporate their experience.)

A resume parser 1120 may likewise parse the candidate resume to extract skills, work experience (including employers and job titles), education, certifications, and so forth into specifically structured data 1122. This extracted data may be organized into specifically structured data to be delivered to the analyzer 1130. The parsed resume data may then be merged with other data 1124, such as data that has been extracted from previous conversations with the candidate and data extracted from the candidate's social media profiles and posts, as well as any other data that may be relevant such as data found from performing one or more searches for the candidate using a public search engine.

Once the data has been assembled and collected at the analyzer 1130 from each of these multiple sources 1132, the analyzer 1130 may create a job-resume matrix which matches the candidate to the job 1134. Specifically, according to an exemplary embodiment, the job-resume matrix may compare the candidate's skills, experience, and any other applicable qualities to the requirements of the job; for example, in some exemplary embodiments, a job-resume matrix may be a job/skill matrix that lists and describes required and preferred skills. Required and preferred skills may be provided, for example, as a row in a priority order along with the number of months that may be required and the number of months the candidate has with the skill, or alternatively may be based on any other order or based on any other evaluation metric, such as may be desired.

For example, in an exemplary embodiment, a job-resume matrix may be created 1134 for the job of "Citrix engineer," JobID 34432 (Candidate ID: 9935873). This job-resume matrix may show, for example, the skills of "Citrix Zen App Administration," "Citrix PVS," "Citrix NetScaler," "Citrix Zen Desktop," and "Installing Citrix Servers." Other skills may also be contemplated, such as may be desired. This job-resume matrix may, for example, have a column for how many months are required for the candidate to meet the job requirements laid out in the job description, how many months the candidate has, whether the job requirement is required or preferred (which may, for example, affect its priority) and the estimated or defined priority of the job requirement. As mentioned, the list of requirements may be organized from a highest priority requirement to a lowest priority requirement, or may be provided in any other order such as may be desired.

The analyzer may then identify any gaps in the candidate's resume based on what the candidate has provided and based on the calculated job-resume matrix. For example, in FIG. 17, it may be seen that the job-resume matrix that has been created 1134 for the particular candidate in question may have a blank space next to "Citrix PVS," which may thus be identified as a gap in the candidate's resume. This may be prioritized for any revision, so that the candidate can provide any experience that they may have not thought was relevant and may have left off their resume, or can make a case for why their other experience should qualify them, or take any other action such as may be desired. If any gaps are identified, as discussed previously, the analyzer engine 110 may send data to a communications engine 120 for a next step, while if no gaps are identified, the analyzer engine 110 may send data to a recommendation engine 130 for a next step.

FIG. 18 may depict an exemplary process flow diagram for an exemplary embodiment of a communications engine 120. In a first step, once the job-resume matrix has been created 1134, the AI BOT may attempt to make contact with the candidate by some channel, such as a prioritized/preferred channel 1212. The AI BOT may generate and send a message via the channel 1214. The candidate may then have an opportunity to respond, and the AI BOT may then determine if the candidate has responded or not 1222.

If the candidate does not respond 1224, the AI BOT may attempt to send one or more follow-up messages through one or more other channels, such as other channels which have not previously been used. Optionally, this may set a new channel as the priority or preferred channel if the candidate consistently does not respond to communications via the priority or preferred channel. The use of other channels may happen at any stage of the process, such as in any subsequent communications where the candidate does not respond to communications via the priority or preferred channel.

If the candidate does respond, the AI BOT may check the availability of the candidate and schedule an appointment with the candidate 1226. If the candidate is available right away, the AI BOT may further be configured to start the next step immediately; however, if the candidate is not available straight away, it may contact the candidate whenever the scheduled time occurs 1228. (If the candidate does not respond, the system may once again send the candidate follow-up messages and make contact with the candidate through any other channels such as may be appropriate.)

Once the AI BOT can get in contact with the candidate for an appointment, whether this happens immediately or at the scheduled time, the AI BOT may provide the candidate with questionnaire-style questions (or any other questions) requesting that the candidate fill in the gaps in their job-resume matrix 1232. In some exemplary embodiments, questions may be sorted by the priority value of the skill (or based on the priority value of another criterion, such as education, if relevant) and the priority order in which it appears. Multiple questions may be provided for each skill. In some exemplary embodiments, more vital skills may have more questions associated with them, in order to ensure that the candidate can fully characterize any or all relevant experience that they may have with the skill, whereas less vital skills lower in the priority order may have fewer questions associated with them, in order to ensure that the candidate does not get bored or frustrated with the questionnaire and devotes an adequate amount of time to each response.

It may be contemplated that the candidate may leave the communication accidentally (such as based on a call getting disconnected) or intentionally (such as if the candidate only has a limited amount of time for an appointment and indicates a desired to resume the communication later, or if the candidate otherwise has to leave). As such, during the process of collecting the missing information, if the communication gets disconnected before the AI BOT has collected all necessary information from the candidate, the AI BOT may automatically be configured to retry to communication, by other channels as well as the current channel 1234. For example, in an exemplary embodiment, an AI BOT may send the candidate an email when a phone conversation gets disconnected, indicating that the call had been disconnected and requesting that the candidate provide their availability for a future call. Once the gaps have all been filled, the communication engine 120 may activate a recommendation engine 130, such as is depicted in more detail in FIG. 19.

Turning now to FIG. 19, an exemplary detailed process flow diagram for an exemplary embodiment of a recommendation engine 130 may be provided. According to an exemplary embodiment, a recommendation engine 130 may be accessed by either a communication engine 120, in a scenario in which a candidate is requested to fill in additional gaps in their resume, or by an analyzer engine 110, in a scenario in which the candidate does not have any gaps to fill in their resume.

A first step of the process flow for a recommendation engine 130 may be configured to take place specifically if the AI BOT has requested that the candidate fill in one or more gaps in their resume. Based on the responses provided by the candidate, the AI BOT may update the candidate profile in the database 1312, effectively merging the candidate's updated resume data into their current resume. Next, regardless of whether any changes have been made to it or not, the candidate's profile may be analyzed by the recommendation engine 130 to make one or more recommendations about how the resume can be updated 1332. (It may be understood that, if the candidate has only now provided certain important information relevant to the application process, one or more of the recommendations 1332 may be recommendations advising the candidate about how to best incorporate that information into their resume, or other information that can be removed in order to make way for that information.) Once these recommendations have been made, they may be sent to the candidate in some form, such as in an updated resume or a marked-up version of the candidate's resume, for approval by the candidate.

In a next step, the candidate may analyze the recommendations and determine whether or not they approve of them 1340. If the candidate approves the recommendations, then the recommendation engine 130 may indicate, in the database, that all of the recommendations that had been done to the resume have been approved by the candidate, which may cause the system to automatically generate a new resume for the candidate 1352. If the candidate does not approve the recommendations, then the recommendation engine 130 may provide the candidate with an interface by which they can edit the changes that have been made to their resume, and then confirm their own edits 1362. The system may then mark this information in the database 1352. Optionally, in some exemplary embodiments, the system may analyze the candidate's resume again after they have made their own edits, which may result in the system providing additional edits and recommendations based on the candidate's new edits. (For example, it may be that the candidate has made a typographical error or made a formatting error with a certain addition to the resume, which may be caught by the system. The system may then provide its own recommendations 1332 again and give the candidate a chance to approve them or edit them.)

A variety of recommendations may be contemplated. For example, as discussed previously, the system may recommend updates to the candidate's job titles so that the job titles are as close a match as possible to the position for which the candidate is applying. (For example, where possible and where justifiable, the system may try to match the language in the job description, if desired.) The system may further recommend that the candidate tailor their resume to the position in other ways. For example, if the candidate has an "objective" or "summary" portion, it may be suggested that the candidate tailor this objective or summary in certain specific ways to the job, or otherwise generate an alternative objective or summary such that the candidate can easily replace their current one (or so that they can easily add an "objective" or "summary" portion if one does not currently exist in their resume). The system may also be configured to highlight those things that the candidate did well; for example, the system may highlight the key areas in the resume that match with the job description. (This may also show the candidate which information is seen as superfluous by the system, which may help the candidate to make certain amendments reducing these sections in size or eliminating them in order to ensure that the most valuable skills and experience stand out more properly.) Finally, as discussed, the system may review the candidate's resume for mistakes in spelling, grammar, formatting, and the like.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

For example, in some exemplary embodiments, it may be desired to structure the above invention as a Software as a Service (SaaS) platform, which may be accessible through a public API. According to such an exemplary embodiment, one or more clients, who may for example be hiring managers at outside companies, may make use of the public API to send jobs to the SaaS platform. The SaaS platform will then operate to generate a curated list of candidates for submission back to the client, which may be, for example, delivered directly into the application tracking system of the client. In some exemplary embodiments, some or all (or none) of the above processes may be made accessible by a public API, as may be desired.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A computer-implemented method for performing automated recruitment to a position, the method comprising:
    receiving, on an automated recruitment system comprising a natural language processing engine and a database comprising a plurality of natural language processing intents and a plurality of natural language processing entities, the database further comprising a plurality of conversation paths, each of the plurality of conversation paths comprising an expression of at least one intent about at least one entity, a candidate message from a candidate;
    retrieving, from the database, a candidate data record;
    generating, from the candidate message and the candidate data record, a combined message, wherein generating the combined message comprises modifying at least one aspect of the candidate message based on the candidate data record and providing a result as the combined message, and further comprises updating the candidate data record based on the candidate message;
    extracting, from the combined message, one or more candidate intents associated with one or more entities, and mapping the one or more candidate intents and the one or more candidate entities to a conversation path in the plurality of conversation paths;
    processing instructions associated with the conversation path in the plurality of conversation paths, and generating a recruiter message based on the instructions;
    providing a time delay after generating the recruiter message based on the instructions, retaining, during the time delay, the recruiter message in editable form, and receiving, during the time delay, at least one edit to the recruiter message; and
    providing the recruiter message to the candidate after providing the time delay;
    wherein the recruiter message comprises at least one of a question for the candidate generated based on the combined message and a provision of further information to the candidate based on an expression of candidate interest in the one or more candidate intents.

2. The method of claim 1, wherein a step of mapping the one or more candidate intents to the conversation path in the plurality of conversation paths comprises:
    classifying the one or more candidate intents as one or more of the set of: casual intents, business intents, and other intents, the other intents being intents not classified as casual intents or business intents; and,
    when an intent in the one or more candidate intents is classified as including at least one other intent, sending a notification message to a non-candidate party regarding the other intent.

3. The method of claim 2, wherein at least one of the candidate intents is classified as a casual intent comprising a conversation opener in a first language, and wherein the method further comprises:
    generating and providing to the candidate a verification message provided in the first language;
    receiving a further message from the candidate, and identifying a response language of the further message;
    continuing to use the first language when the response language of the further message is in the first language, and changing to a second language when the response language of the further message is in the second language.

4. The method of claim 1, wherein generating the combined message further comprises identifying an interpretable portion of the candidate message, and preprocessing the candidate message to extract the interpretable portion of the candidate message.

5. The method of claim 1, wherein the combined message further comprises an intent polarity, wherein the intent polarity is one of the set of: a binary value, a quaternary value, or a floating point value.

6. The method of claim 1, wherein the method further comprises:
    identifying candidate information relating to a first topic in the candidate message;
    identifying contradictory candidate information relating to the first topic in the candidate data record; and
    sending a notification message to a non-candidate party regarding the contradictory candidate information.

7. The method of claim 6, wherein the method further comprises:
    after a step of mapping the one or more candidate intents and the one or more candidate entities to a conversation path in the plurality of conversation paths, reevaluating the step of mapping the one or more candidate intents and the one or more candidate entities based on the candidate information;
    mapping the one or more candidate intents and the one or more candidate entities to a different conversation path in the plurality of conversation paths; and
    providing a message to the candidate based on the different conversation path.

8. The method of claim 1, wherein the method further comprises identifying a social media presence of the candidate, extracting at least one posting from the social media presence of the candidate, and populating the candidate data record with the extracted at least one posting.

9. The method of claim 1, wherein the method further comprises:
defining a follow-up rule based on the combined message;
once the recruiter message has been provided to the candidate, waiting for a predetermined time period defined by a follow-up rule, and, when the predetermined time period has passed and no candidate reply has been received, generating and providing to the candidate a follow-up recruiter message.

10. The method of claim 9, wherein the follow-up rule is defined based on the candidate data record, and is defined based on at least one of: a candidate employment schedule, a candidate cultural background, a candidate historical response time, a candidate placement priority, a candidate placement priority of an alternative candidate, and a communications medium in which the recruiter message was sent.

11. The method of claim 9, wherein the automated recruitment system is provided with at least two communications media, each of the at least two communications media associated with an expected response time, and wherein the method comprises:
providing the recruiter message to the candidate using a first communications medium in the at least two communications media; and
providing the follow-up recruiter message to the candidate using a second communications medium in the at least two communications media;
wherein the second communications medium is a higher-priority channel having a lower expected response time.

12. The method of claim 1, wherein the method further comprises:
identifying a candidate by generating, on the automated recruitment system, a first data point matrix based on the one or more job requirements, receiving, on the automated system, a sourced résumé of a candidate, generating, on the automated recruitment system, a second data point matrix based on the sourced résumé, and comparing the first data point matrix and second data point matrix;
generating a third data point matrix based on an interview transcript;
comparing the third data point matrix to a data point matrix associated with a second candidate; and
evaluating whether the third data point matrix is above a threshold.

13. The method of claim 12, wherein the method further comprises:
automatically generating and transmitting a candidate recommendation message.

14. The method of claim 1, wherein the method further comprises:
providing a plurality of instances of the automated recruitment system, each instance of the automated recruitment system being paired with a different recruiter and having separately customizable settings;
wherein each instance of the automated recruitment system is associated with a different geographical area, and wherein each instance of the automated recruitment system is configured to have a different instance of the natural language processing engine.

15. An automated recruitment system, comprising a natural language processing engine and a database comprising a database comprising a plurality of natural language processing intents and a plurality of natural language processing entities, the database further comprising a plurality of conversation paths, each of the plurality of conversation paths comprising an expression of at least one intent about at least one entity;
wherein the automated recruitment system is configured to:
receive, on the automated recruitment system, a candidate message from a candidate;
generate, from the candidate message and the candidate data record, a combined message, wherein generating the combined message comprises modifying at least one aspect of the candidate message based on the candidate data record and providing a result as the combined message, and further comprises updating the candidate data record based on the candidate message;
extract, from the combined message, one or more candidate intents associated with one or more entities, and map the one or more candidate intents and the one or more candidate entities to a conversation path in the plurality of conversation paths;
process instructions associated with the conversation path in the plurality of conversation paths;
generate a recruiter message based on the instructions;
provide a time delay after generating the recruiter message based on the instructions, and retain the recruiter message in editable form during the time delay;
receive, during the time delay, at least one edit to the recruiter message; and
provide, to the candidate, the recruiter message after the time delay;
wherein the recruiter message comprises at least one of a question for the candidate generated based on the combined message and a provision of further information to the candidate based on an expression of candidate interest in the one or more candidate intents.

16. The automated recruitment system of claim 15, wherein the system is further configured to:
classify the one or more candidate intents as one or more of the set of: casual intents, business intents, and other intents, the other intents being intents not classified as casual intents or business intents; and,
when an intent in the one or more candidate intents is classified as including at least one other intent, send a notification message to a non-candidate party regarding the other intent.

17. The automated recruitment system of claim 15, wherein the combined message further comprises an intent polarity, wherein the intent polarity is one of the set of: a binary value, a quaternary value, or a floating point value.

18. The automated recruitment system of claim 15, wherein the system is further configured to:
identify candidate information relating to a first topic in the candidate message;
identify contradictory candidate information relating to the first topic in the candidate data record; and
send a notification message to a non-candidate party regarding the contradictory candidate information.

19. The automated recruitment system of claim 15, wherein the automated recruitment system comprises at least two communications media, each of the at least two communications media associated with an expected response time, and wherein the automated recruitment system is configured to:

provide the recruiter message to the candidate using a first communications medium in the at least two communications media; and provide a follow-up recruiter message to the candidate using a second communications medium in the at least two communications media;

wherein the second communications medium is a higher-priority channel having a lower expected response time.

\* \* \* \* \*